(12) United States Patent
Rossato et al.

(10) Patent No.: US 9,961,345 B2
(45) Date of Patent: May 1, 2018

(54) ENCODING AND RECONSTRUCTION OF RESIDUAL DATA BASED ON SUPPORT INFORMATION

(71) Applicants: Luca Rossato, Milan (IT); Guido Meardi, Milan (IT)

(72) Inventors: Luca Rossato, Milan (IT); Guido Meardi, Milan (IT)

(73) Assignee: V-Nova International Limited, London (GB)

( * ) Notice: Subject to any disclaimer, the term of this patent is extended or adjusted under 35 U.S.C. 154(b) by 299 days.

(21) Appl. No.: 13/894,417

(22) Filed: May 14, 2013

(65) Prior Publication Data

US 2013/0322530 A1   Dec. 5, 2013

Related U.S. Application Data

(60) Provisional application No. 61/646,797, filed on May 14, 2012, provisional application No. 61/647,426, filed on May 15, 2012.

(51) Int. Cl.
*H04N 19/23* (2014.01)
*H04N 19/59* (2014.01)
(Continued)

(52) U.S. Cl.
CPC ........... *H04N 19/126* (2014.11); *G06T 7/248* (2017.01); *H04N 19/136* (2014.11); *H04N 19/23* (2014.11);
(Continued)

(58) Field of Classification Search
CPC ........ H04N 19/23; H04N 19/33; H04N 19/62; H04N 19/63; H04N 19/87; H04N 19/126;
(Continued)

(56) References Cited

U.S. PATENT DOCUMENTS

| | | | | |
|---|---|---|---|---|
| 5,991,444 A | * | 11/1999 | Burt | G06K 9/32 375/E7.04 |
| 6,173,013 B1 | * | 1/2001 | Suzuki | H04N 19/563 375/240.16 |

(Continued)

OTHER PUBLICATIONS

Hartung, Frank, et al., "Digital Rights Management and Watermarking of Multimedia Content for M-Commerce Applications", Nov. 1, 2000, vol. 38, No. 11, Total pp. 7 (pp. 78-84), IEEE Communications Magazine.

(Continued)

*Primary Examiner* — Christopher S Kelley
*Assistant Examiner* — Kathleen Walsh
(74) *Attorney, Agent, or Firm* — Chapin IP Law, LLC

(57) ABSTRACT

Decoder processor hardware reproduces a support plane including a set of support values. The set of support values is derived from combining a sequence of multiple original sets of values. The decoder processor hardware receives compensation information. The decoder processor hardware utilizes the compensation information to produce preliminary renditions of the multiple original sets of values based on the set of support values. Encoder processor hardware processes a sequence of original sets of values. The encoder processor hardware utilizes the values of the original sets in the sequence to produce a set of support values, the set of support values representing a baseline to reproduce a rendition of each of the original sets of values. The encoder processor hardware generates reconstruction data to include data corresponding to the set of support values, the reconstruction data indicates how to reconstruct the original sets of values using the set of support values.

34 Claims, 26 Drawing Sheets

(51) Int. Cl.
H04N 19/126 (2014.01)
H04N 19/63 (2014.01)
H04N 19/62 (2014.01)
H04N 19/33 (2014.01)
H04N 19/87 (2014.01)
H04N 19/94 (2014.01)
H04N 19/50 (2014.01)
G06T 7/246 (2017.01)
H04N 19/136 (2014.01)
G06T 7/20 (2017.01)
H04N 19/635 (2014.01)

(52) U.S. Cl.
CPC ............. *H04N 19/33* (2014.11); *H04N 19/50* (2014.11); *H04N 19/59* (2014.11); *H04N 19/62* (2014.11); *H04N 19/63* (2014.11); *H04N 19/87* (2014.11); *H04N 19/94* (2014.11); *H04N 19/635* (2014.11)

(58) Field of Classification Search
CPC ...... H04N 19/59; H04N 19/635; H04N 19/94; H04N 19/00569; G06T 7/204
USPC ................................................. 375/240.12
See application file for complete search history.

(56) References Cited

U.S. PATENT DOCUMENTS

| | | | | |
|---|---|---|---|---|
| 6,233,356 | B1* | 5/2001 | Haskell | H04N 5/4401 348/408.1 |
| 6,414,991 | B1* | 7/2002 | Yagasaki | H04N 19/00 375/240.12 |
| 6,535,558 | B1* | 3/2003 | Suzuki | H04N 19/105 375/240.12 |
| 6,782,132 | B1* | 8/2004 | Fogg | G06T 1/20 348/716 |
| 6,993,201 | B1* | 1/2006 | Haskell | H04N 19/187 375/240.08 |
| 7,583,730 | B2* | 9/2009 | Wu | H04N 19/34 348/412.1 |
| 8,351,502 | B2* | 1/2013 | Lee | H04N 19/70 375/240.12 |
| 8,442,108 | B2* | 5/2013 | Song | H04N 19/63 348/426.1 |
| 8,559,519 | B2* | 10/2013 | Shi | H04N 19/52 375/240.12 |
| 8,594,196 | B2* | 11/2013 | Lakus-Becker | H03M 7/30 375/240.01 |
| 8,731,054 | B2* | 5/2014 | Walker | H04N 19/105 375/240.12 |
| 8,873,622 | B2* | 10/2014 | Schwarz | H04N 19/0003 375/240.08 |
| 2003/0133500 | A1* | 7/2003 | Auwera | H04N 19/63 375/240.11 |
| 2005/0053155 | A1* | 3/2005 | Holcomb | H04N 19/70 375/240.23 |
| 2005/0195900 | A1* | 9/2005 | Han | H04N 21/234327 375/240.21 |
| 2006/0013309 | A1* | 1/2006 | Ha | H04N 19/147 375/240.16 |
| 2006/0088096 | A1* | 4/2006 | Han | H04N 19/00 375/240.03 |
| 2006/0215762 | A1 | 9/2006 | Han et al. | |
| 2007/0160153 | A1* | 7/2007 | Sullivan | G06T 3/4007 375/240.29 |
| 2009/0141809 | A1* | 6/2009 | Visharam | H04N 19/61 375/240.25 |
| 2009/0141810 | A1* | 6/2009 | Tabatabai | H04N 19/70 375/240.25 |
| 2010/0033617 | A1* | 2/2010 | Forutanpour | G06T 7/564 348/345 |
| 2012/0063512 | A1* | 3/2012 | Han | H04N 19/105 375/240.12 |
| 2013/0034157 | A1* | 2/2013 | Helle | H04N 19/52 375/240.12 |
| 2013/0208792 | A1* | 8/2013 | He | H04N 19/00569 375/240.12 |
| 2014/0010294 | A1* | 1/2014 | Ye | H04N 19/00424 375/240.12 |
| 2014/0286409 | A1* | 9/2014 | Zhang | H04N 19/00793 375/240.12 |

OTHER PUBLICATIONS

Kim, Beong-Jo et al., "Low Bit-Rate Scalable Video Coding with 3-D Set Partitioning in Hierarchical Trees (3-D SPIHT)", IEEE Transactions on Circuits and Systems for Video Technology, Dec. 2000, Total pp. 14 (pp. 1374-1387), IEEE, New York.

Hsu, Wei-Lien et al., "3D Adaptive Wavelet Packet for Video Compression", International Conference on Image Processing, Oct. 1995, Total pp. 4 (pp. 602-605), IEEE, New York.

Ebrahimi, Touradj et al., "MPEG-4 Natural Video Coding—An Overview", Signal Processing: Image Communication, Jan. 2000, Total pp. 21 (pp. 365-385), vol. 15, Elsevier Science, USA.

Dasu, Aravind et al., "A Wavelet-Based Sprite Codec", IEEE Transactions on Circuits and Systems for Video Technology, Feb. 2004, Total pp. 12 (pp. 244-255), vol. 14 No. 2, IEEE, New York.

Watanabe, Hiroshi et al., "Sprite Coding in Object-Based Video Coding Standard: MPEG-4", Multiconference on Systemics, Cybernetics and Informatics, Jul. 2001, Total pp. 6 (pp. 420-425), Japan.

Santa-Cruz, Diego et al. "Opening the Laplacian Pyramid for Video Coding" IEEE International Conference on Image Processing, Sep. 2005, Total pp. 4 (pp. 672-675), IEEE, New York.

Hsu, Chiou-Ting et al., "Mosaics of Video Sequences with Moving Objects", Signal Processing: Image Communication, Jan. 2004, Total pp. 18 (pp. 81-98), vol. 19 No. 1, Elsevier, USA.

International Search Report from corresponding PCT application No. PCT/EP2013/059853, dated Oct. 24, 2013, total pp. 10.

Examination Report, Austrialia No. 2013261845, dated Nov. 28, 2016, pp. 1-5.

* cited by examiner

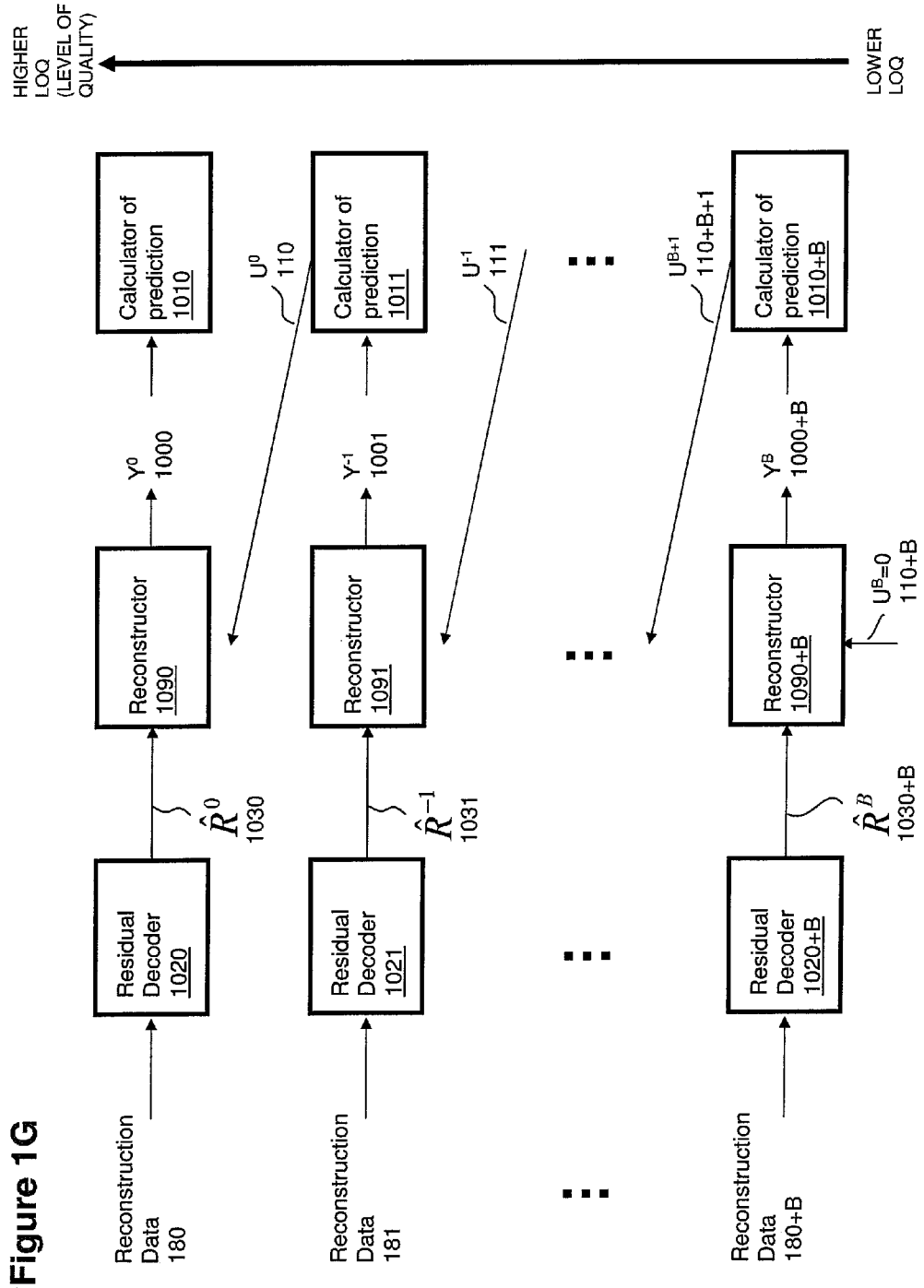

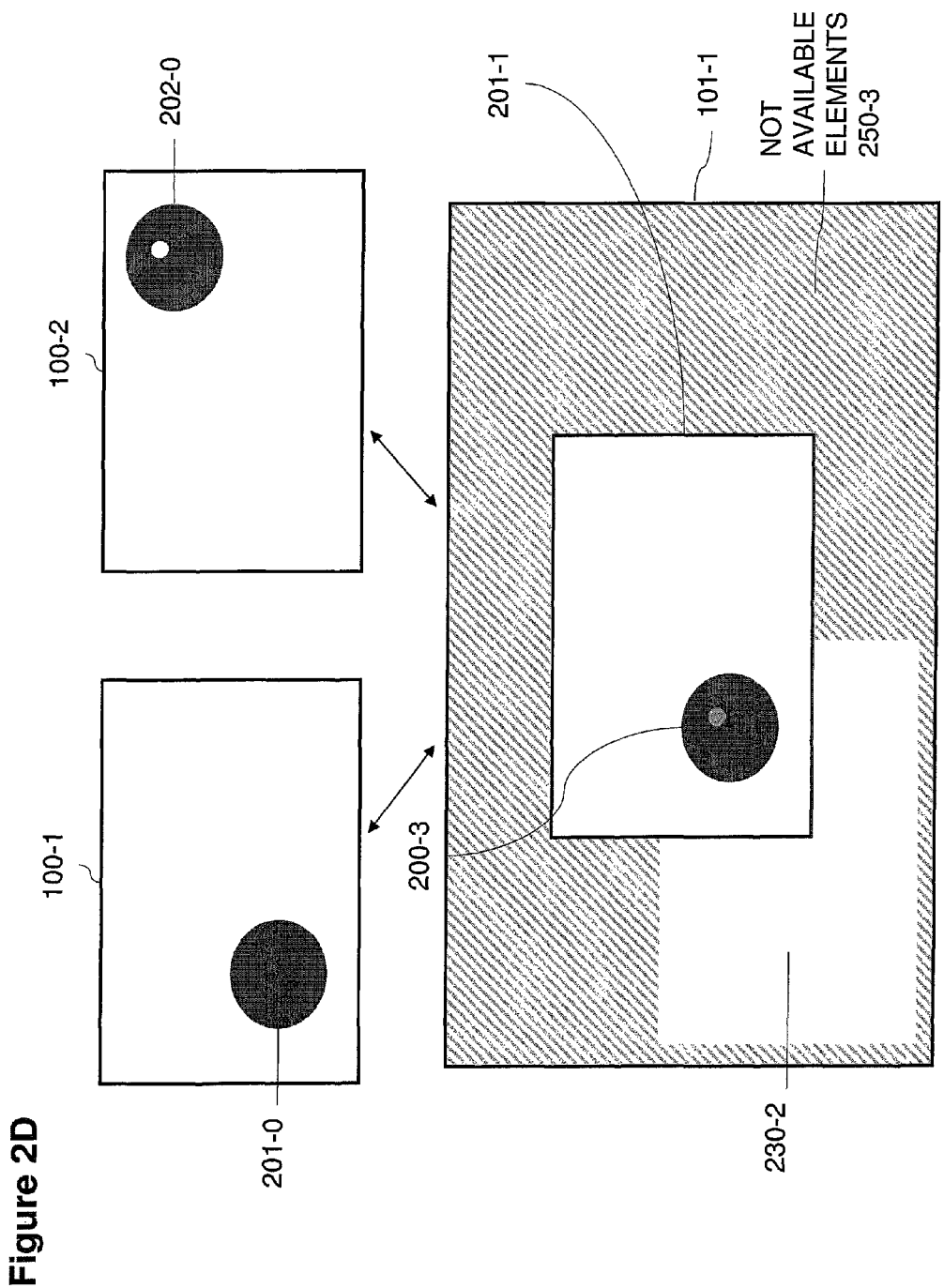

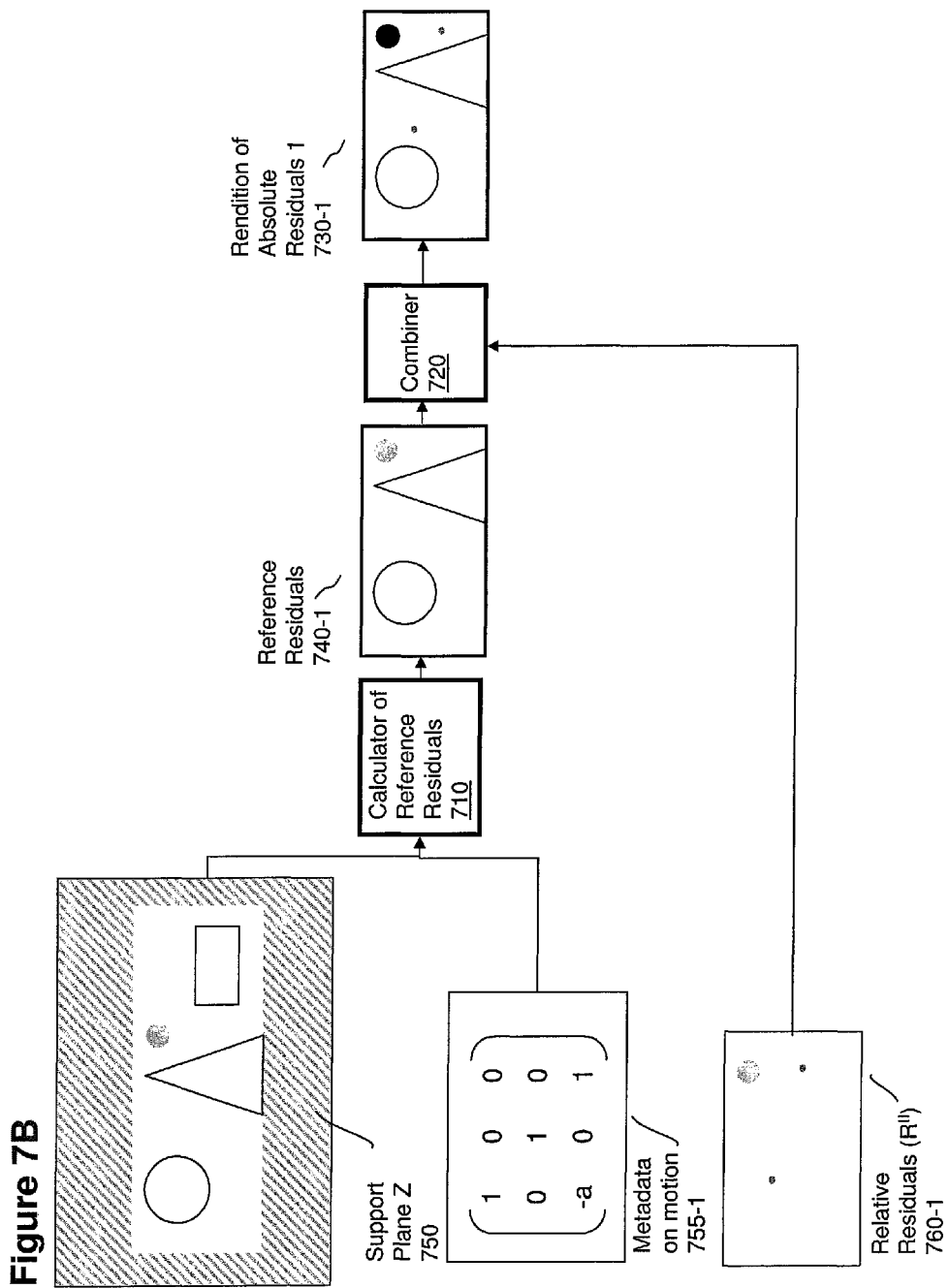

ENCODING AND RECONSTRUCTION OF RESIDUAL DATA BASED ON SUPPORT INFORMATION

RELATED APPLICATIONS

This application is related and claims the benefit of U.S. Provisional Patent Application Ser. No. 61/646,797 entitled "SIGNAL ENCODING, DECODING AND RECONSTRUCTION OF TIME-BASED AND/OR MULTIDIMENSIONAL SIGNALS BASED ON MULTIDIMENSIONAL TIER-BASED INHERITANCE", filed on May 14, 2012, the entire teachings of which are incorporated herein by this reference.

This application is related to and claims the benefit of U.S. Provisional Patent Application Ser. No. 61/647,426 entitled "ESTIMATION, ENCODING, DECODING AND USAGE OF MOTION INFORMATION IN MULTIDIMENSIONAL SIGNALS THROUGH MOTION ZONES, MOTION MATRIXES, WARP MAPS AND MOTION TRANSFORMS", filed on May 15, 2012, the entire teachings of which are incorporated herein by this reference.

This application is also related to U.S. patent application Ser. No. 13/188,188 entitled "INHERITANCE IN A TIERED SIGNAL QUALITY HIERARCHY,", filed on Jul. 21, 2011, the entire teachings of which are incorporated herein by this reference.

This application is related to U.S. patent application Ser. No. 13/188,201 entitled "TIERED SIGNAL DECODING AND SIGNAL RECONSTRUCTION,", filed on Jul. 21, 2011, the entire teachings of which are incorporated herein by this reference.

This application is related to U.S. patent application Ser. No. 13/188,207 entitled "SIGNAL PROCESSING AND TIERED SIGNAL ENCODING,", filed on Jul. 21, 2011, the entire teachings of which are incorporated herein by this reference.

This application is related to U.S. patent application Ser. No. 13/188,220 entitled "UPSAMPLING IN A TIERED SIGNAL QUALITY HIERARCHY,", filed on Jul. 21, 2011, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY,", filed on Jul. 21, 2011, the entire teachings of which are incorporated herein by this reference.

This application is related to U.S. patent application Ser. No. 13/352,944 entitled "SIGNAL ANALYSIS AND GENERATION OF TRANSIENT INFORMATION,", filed on Jan. 18, 2012, the entire teachings of which are incorporated herein by this reference.

This application is related to U.S. Provisional Patent Application Ser. No. 61/563,169 entitled "TIER-BASED SYSTEM TO SEPARATE A MULTIDIMENSIONAL SIGNAL INTO STABLE/PREDICTABLE INFORMATION AND TRANSIENT INFORMATION,", filed on Nov. 23, 2011, the entire teachings of which are incorporated herein by this reference.

This application is related to U.S. patent application Ser. No. 13/188,237 entitled "TRANSMISSION OF RECONSTRUCTION DATA IN A TIERED SIGNAL HIERARCHY,", filed on Jul. 21, 2011, the entire teachings of which are incorporated herein by this reference.

This application is related to U.S. Provisional Patent Application Ser. No. 61/558,302 entitled "UPSAMPLING AND DOWNSAMPLING OF MOTION MAPS AND OTHER AUXILIARY MAPS IN A TIERED SIGNAL QUALITY HIERARCHY,", filed on Nov. 10, 2011, the entire teachings of which are incorporated herein by this reference.

This application is related to U.S. patent application Ser. No. 13/303,554 entitled "UPSAMPLING AND DOWNSAMPLING OF MOTION MAPS AND OTHER AUXILIARY MAPS IN A TIERED SIGNAL QUALITY HIERARCHY,", filed on Nov. 23, 2011, the entire teachings of which are incorporated herein by this reference.

This application is related to U.S. Provisional Patent Application Ser. No. 61/587,989 entitled "DISTINCT ENCODING/DECODING OF STABLE/PREDICTABLE INFORMATION AND TRANSIENT/STOCHASTIC INFORMATION,", filed on Jan. 18, 2012, the entire teachings of which are incorporated herein by this reference.

This application is related to U.S. patent application Ser. No. 13/744,808 entitled "DISTINCT ENCODING AND DECODING OF STABLE INFORMATION AND TRANSIENT/STOCHASTIC INFORMATION", filed on Jan. 18, 2013, the entire teachings of which are incorporated herein by this reference.

BACKGROUND

Many techniques are known in the art to deal with encoding and decoding of digital signals. This is the case of audio signals, pictures, video signals and other multidimensional signals like volumetric signals used in scientific and medical areas. In order to achieve high compression ratios, those techniques exploit the spatial and time correlation inside the signal. Conventional methods identify a reference and try to determine the difference of the signal between a current location and the given reference. This is done both in the spatial domain, where the reference is a portion of already received and decoded spatial plane, and in the time domain, where a single instance in time of the signal (e.g., a video frame in a sequence of frames) is taken as a reference for a certain duration. This is the case, for example, of MPEG-family compression algorithms, where previously-decoded macro blocks are taken as reference in the spatial domain and I-frames and P-frames are used as reference in the time domain.

Known techniques exploit spatial correlation and time correlation in many ways, adopting several different techniques in order to identify, simplify, encode and transmit differences ("residual data"). In conventional methods, in order to leverage on spatial correlation a domain transformation is performed (for example into a frequency domain) and then lossy deletion and quantization of information is performed. In the time domain, instead, conventional methods transmit the quantized difference between the current sample and a reference sample. In order to maximize the similarity between samples, encoders try to estimate the modifications along time occurred vs. the reference signal. This is called, in conventional encoding methods (e.g., MPEG family technologies, VP8, etc.), motion estimation. Motion information is transmitted to the decoder in order to enable reconstruction of the current sample by leveraging information already available at the decoder for the reference sample (in MPEG this is done using motion vectors on a macro block basis).

A drawback of conventional reference-based encoding techniques is that errors in a sample cumulate with errors in the following samples that are each reconstructed based on a precedent sample, creating visible artifacts after very few sequentially predicted samples as soon as lossy compression techniques are adopted.

A common approach is to partition the signal to reduce the complexity of the encoding and decoding operations. This is done both in the spatial domain, for example using the concept of macro blocks or slices, and in the time domain, where the current state of the art approach is to use a Group of Pictures (GOP) division along time.

The partition process is usually abrupt and prone to artefacts. An example is the macro block segmentation performed in MPEG methods. While compression efficiency is indeed achieved, it is also true that visible artifacts are introduced. These artifacts are, in many conditions, very evident to human observers due to the fact that they are unrelated to the original signal (e.g., two notable examples are blockiness artifacts and ringing artifacts). Many attempts to reduce the visibility of such artefacts have been implemented (e.g., de-blocking and de-ringing filters both on the encoder and the decoder side) although with disadvantages such as a reduced global perceived quality and an increased complexity.

Along the time dimension, conventional methods divide the samples in chunks (e.g., GOP for video signals, where each sample along time is a picture). A reference sample is chosen (the reference image), normally on the basis of sequential order, and the samples in the chunk are transmitted differentially with respect to the reference (or to two references, in the case of bi-predicted frames). This introduces artefacts in the time evolution of the signal (e.g., for significant movements the quality perceived often suffers from evident discontinuities along the edges of the GOP).

One requirement addressed by methods in the known art is compression efficiency. Computational complexity has always been considered as a second priority: essentially, algorithms just had to be computationally feasible, rather than being designed for low computation complexity. This forced hardware manufacturers to continuously adapt to evolving techniques, designing specific processors and dedicated hardware solutions capable to implement the chosen algorithms. An example is the evolution of hardware support for MPEG2, MPEG4, H.264/AVC, H.265/HEVC, etc. No encoding technology so far was designed so as to be optimally executed on massively parallel hardware, with computational performance that scales automatically based on the number of computing cores available (i.e., without having to adapt the code, or without even knowing in advance how many computing cores will be available). This feature, unfeasible with current methods, is especially important since nowadays hardware technology is reaching the asymptotic limit of silicon in terms of computing clock rates and transfer rate speed: the current trend to increase the available computing power is moving in the direction of increasing the number of distinct processing units ("computing cores") hosted in a single chip or system.

Another aspect neglected in the known art, aside from few attempts, is the quality scalability requirement. A scalable encoding method would encode a single version of the compressed signal and enable the delivery to different levels of quality, for instance according to bandwidth availability, display resolution and decoder complexity. Scalability has been taken into consideration in known methods like MPEG-SVC and JPEG2000, with relatively poor adoption so far due to computational complexity and, generally speaking, their use of approaches essentially designed for non-scalable techniques.

Another aspect not addressed by known methods is symmetry. With conventional methods compression efficiency can be achieved at the expense of renouncing to useful functionalities like bidirectional (e.g., time reverse) play back and more in general random access to any sample in the signal (e.g., frame-by-frame editing for video signals). Prediction techniques, especially along the time dimension, prevent the decoder to receive, decode and present the signal in time reversal order. Prediction techniques adopted also affect the behaviour in very compressed or error-prone transmissions, due to accumulation of artifacts. Artifacts introduced by errors are visible, especially due to their duration in time.

The prediction-driven techniques adopted in the known art also introduce strong constraints for random access into a compressed stream. Operations like "seek" towards a sample in an arbitrary point, random access when "zapping" to a different signal bitstream (without having to wait for the start of the next time-chunk/GOP) are currently unfeasible. The time that a user has to wait when trying to access an arbitrary point is currently in strict trade off with compression efficiency. An example of this phenomenon is the GOP constraint in MPEG family methods: in order to allow for minimum time delay and for random access along time, a GOP of one sample (i.e., intra-only encoding) must be used. Lastly, current methods are unsuitable for very high sample rates (e.g., very high frame rates for video signals), due to the amount of computational power and bandwidth that would be required. Several studies, for instance, demonstrated that all humans can easily appreciate quality differences of video signals up to 300 frames per second, but computational and bandwidth constraints currently make it extremely expensive to encode and transmit high quality video signals at more than 25-60 frames per second.

BRIEF DESCRIPTION

Innovative methods described herein focus on improvements in techniques for encoding, transmitting and decoding residual data related to multiple samples of a signal, especially along dimensions of significant correlation for the signal.

According to its broadest aspect, non-limiting embodiments of the invention described herein include a method for encoding and reconstructing multiple sets of residual data based on a support buffer (e.g., without limitation, a set of support elements). Some non-limiting embodiments also implement the method by generating a tiered hierarchy of support buffers. This method comprises an encoding step—during which sets of residual data are processed, generating support element information and relative residual data—and a decoding step, during which support element information is processed to generate predictions for residual data, which, combined with relative residual data, allow to reconstruct residual data.

Particular attention will be given to non-limiting embodiments in which said methods are used within the encoding and decoding loop of tiered hierarchical encoding methods, wherein a signal is encoded in a tiered hierarchy of samples that comprises two or more tiers, and wherein each of the tiers has a distinct level of quality (e.g., corresponding to the level of fidelity of the signal rendition). Such methods comprise a decoding step during which samples at a given level of quality are computed through reconstruction operations by starting from the samples of the tier that has the lowest level of quality. Embodiments illustrated herein are especially focused on non-limiting cases wherein a lower level of quality is a lower resolution (i.e., a coarser sampling grid) across one or more of the dimensions of the signal, although people skilled in the art can easily adapt the same methods to cases wherein a signal at a lower level of quality is a signal with the same resolution and a lower level of detail (e.g., without limitation, a coarser quantization of element values). In some cases, we will refer to a lower level of quality as a higher "level of aggregation" ("LOA") wherein the only subsampled dimension vs. a higher level of quality was the time dimension. The terms "tier" will be used interchangeably in the rest of the application with either "level of quality" ("LOQ") or "level of aggregation" ("LOA"), depending on the context.

For simplicity, the non-limiting embodiments illustrated herein usually refer to the signal as a sequence of multi-dimensional samples (i.e., sets of one or more elements organized as arrays with one or more dimensions) occurring at a given sample rate along the time dimension. In the description the terms "image" and/or "plane" (intended with the broadest meaning of "hyperplane", i.e., array of elements with any number of dimensions) will be often interchangeably used to identify the digital rendition of a sample of the signal along the sequence of samples, each plane having a given resolution for each of its dimension, and each suitable set of coordinates in the plane identifying a plane element (or "element", or "pel", for two-dimensional images often called "pixel", for volumetric images often called "voxel", etc.) characterized by one or more values or "settings" (e.g., by ways of non-limiting examples, color settings in a suitable color space, settings indicating density level, settings indicating temperature levels, settings indicating audio pitch, settings indicating amplitude, etc.). As non-limiting examples, a signal can be an image, an audio signal, a multi-channel audio signal, a video signal, a multi-view video signal (e.g., 3D video), a plenoptic signal, a multi-spectral signal, a volumetric signal (e.g., medical imaging, scientific imaging, holographic imaging, etc.), a volumetric video signal, or even signals with more than four dimensions.

Embodiments illustrated herein will be particularly focused on signals evolving over time, especially due to lack of prior art. For instance, also very high sample rates (e.g., also over 1,000 frames per second, currently requiring inordinate amounts of computing and storage resources for encoding and decoding) are easily addressed by the described embodiments.

For simplicity, non-limiting embodiments illustrated herein often refer to signals that are displayed as sequences of 2D planes of settings (e.g., 2D images in a suitable color space), such as for instance a video signal. However, the same concepts and methods are also applicable to any other types of time-based signal, and also to non-time-based multi-dimensional signals (e.g., two-dimensional pictures, volumetric/holographic images, plenoptic images, etc.). As a non-limiting example of a non-time-based signal, a series of two-dimensional slices of a CAT-scan or an MRI (i.e., a non-time-based three-dimensional signal) can be suitably represented as a series of two-dimensional samples along a dimension (i.e., the axis along which the slices were taken), and encoded/decoded according to methods illustrated herein, as if the axis along which the slices were taken was a time dimension (by assuming either a constant sample rate or even a variable sample rate, according to innovative methods illustrated herein).

Non-limiting embodiments of tiered hierarchies illustrated herein are characterized by tiers with different resolutions, wherein the downsampling scale factor from a higher tier to a lower tier may vary for each tier and for each dimension (both spatial and temporal).

Samples encoded in a tiered temporal hierarchy may have different durations. For example, a sample of a given tier resulting from the temporal downsampling ("blending", or "downblending" in case of combination of spatial downsampling and temporal downsampling) of two different samples of a higher tier represents a portion of the signal with a duration ("time span") that is the sum of the durations of the portions of the signal represented by each of the samples of the higher tier. No literature was founded on tiered temporal hierarchies. In this document the term "span of the signal" or "span" will be used interchangeably with the term "sample" (although more properly we may say that each given sample has a corresponding time span, indicating that it corresponds to a "sample and hold" for a duration equal to its time span). A "span" of a signal at a given level of quality represents "a portion of the signal with a given sampling position and a given time duration, to be played back/displayed starting from a given moment in time". A span of a lower level of quality resulting from the combination (blending or downblending) of a plurality of spans of a higher level of quality will have a sampling position that is a linear or non-linear combination of the sampling positions of said multiple spans. In a non-limiting preferred embodiment, such sampling position is the round-down of the average of the sampling positions of the spans that were blended into the given span, i.e., the integer sampling position of the highest level of quality that is equal or immediately lower than the mathematical average of the sampling positions of the spans of a higher level that were downsampled into the given span. Said resulting span will also have a duration that is the sum of the time durations of said multiple spans. Essentially, the term "span" reflects the fact that, especially when going down the hierarchy also with temporal downsampling, each span represents information that is better modelled as a "sample and hold"—representing values of the signal along a given time interval, i.e. a "span" of signal—rather than a simple "sample" in a very specific time position. Also, different spans of a same tier might have different durations, effectively representing variable sample rates.

Non-limiting embodiments of innovative methods illustrated herein often leverage some form of motion estimation and compensation techniques. In conventional methods, motion compensation is utilized as an alternative to predicting a portion of the image based on space correlation: i.e., these encoding techniques, for each portion of a reconstructed span (e.g., an image), choose between predicting by leveraging space correlation (i.e., neighboring portions of the same sample, e.g. intra-prediction in MPEG methods) or predicting by leveraging time correlation (i.e., portions of one or more reference samples, e.g., P-prediction or B-prediction in MPEG methods).

For the innovative embodiments described herein, space and time are not wholly independent dimensions to consider in isolation: space and time are just distinct dimensions of a broader multidimensional space called space-time. By representing a sequence of N-dimensional samples as a single (N+1)-dimensional signal, and by encoding said (N+1)-dimensional signal with a tiered hierarchical method, embodiments described herein can effectively encode-decode a signal in its space-time (through suitable space-time encoding-decoding operations), effectively leveraging at the same time space and time correlation (i.e., without having to choose between the two), and effectively leveraging correlation also across multiple samples (i.e., not just from one sample to another). In addition, by predicting samples based on samples of a lower level of quality (and/or higher level of aggregation) instead of based on neighboring samples at the same level of quality, lossy decisions taken in selected portions of the (N+1)-dimensional signal do not necessarily propagate themselves to other portions of the signal (i.e., to other samples/spans in the sequence). In short, embodiments described herein manipulate the signal in its entirety, leveraging correlation across the whole signal and considering the time dimension at the same level as the other dimensions. We often refer to this very innovative property of the methods described herein as "symmetry".

The invention relates to ways to encode, transmit and/or decode a plurality of sets of values based on a single set of values (equivalently called "support information", "support buffer" or "support plane") common to all sets in said plurality of sets of values, and on additional reconstruction data specific to each set in said plurality of sets of values.

In some non-limiting embodiments described herein, for each given set of values in said plurality of sets, said additional reconstruction data comprises a set of adjustments ("relative residuals") to combine with values based on the support plane in order to produce said given set of values.

In other non-limiting embodiments described herein, for each given set of values in said plurality of sets, said additional reconstruction data comprises a set of parameters ("compensation data") indicating operations to perform on the support plane in order to produce a first set of values ("reference residuals") and a set of adjustments ("relative residuals") to combine with reference residuals in order to produce said given set of values.

According to non-limiting embodiments described herein, a signal processor is configured to process a plurality of sets of values ("absolute residuals"), each of said sets of absolute residuals corresponding to a difference between a set of elements of a signal at a given level of quality, each of said set of elements being called a span, and a corresponding predicted span, the method comprising, implemented within a coder:

producing a support plane (i.e., a set of support elements) by performing calculations on information corresponding to said absolute residuals and/or on information corresponding to said spans;

producing support plane reconstruction data corresponding to said support plane;

for each given set of absolute residuals, producing a set of values ("relative residuals"), said relative residuals corresponding to differences between the given set of absolute residuals and a set of values ("reference residuals") based at least in part on said support plane;

producing relative residual reconstruction data corresponding to said sets of relative residuals; and transmitting to a decoder said support plane reconstruction data and said relative residual reconstruction data.

In some non-limiting embodiments described herein, the method includes producing for each given set of absolute residuals additional information ("compensation data") corresponding to operations to perform on the support plane in order to produce the set of reference residuals corresponding to said given set of absolute residuals.

Other non-limiting embodiments illustrated herein include an encoder configured for transmitting a set of absolute residuals, said set of absolute residuals corresponding to a difference between a set of elements of a signal at a given level of quality, said set of elements being called a given span, and a corresponding predicted span, the encoder comprising:

a generator of a support plane configured for performing calculations on said absolute residuals and on information corresponding to one or more spans belonging to a sequence of spans that includes said given span;

a generator of support plane reconstruction data corresponding to said support plane;

a generator of a set of values ("relative residuals"), said relative residuals corresponding to differences between the set of absolute residuals and a set of values ("reference residuals") based at least in part on said support plane;

a generator of relative residual reconstruction data corresponding to said sets of relative residuals; and a transmitter configured for transmitting to a decoder said support plane reconstruction data and said relative residual reconstruction data.

Other non-limiting embodiments described herein include a signal processor configured to produce a set of values ("reconstructed absolute residuals"), said set of reconstructed absolute residuals corresponding to a difference between a set of elements of a signal at a given level of quality, said set of elements being called a span, and a corresponding predicted span, the method comprising, implemented within a decoder:

receiving support plane reconstruction data and relative residual reconstruction data;

producing a reconstructed rendition of the support plane by decoding said support plane reconstruction data;

processing relative residual reconstruction data, producing a set of values ("reconstructed relative residuals"), said reconstructed relative residuals corresponding to adjustments to perform on a set of values based at least in part on said reconstructed rendition of the support plane;

producing the set of reconstructed absolute residuals based at least in part on said reconstructed rendition of the support plane and on said set of reconstructed relative residuals.

In some non-limiting embodiments described herein, producing the set of reconstructed absolute residuals includes:

receiving data ("compensation data") corresponding to operations to perform on the reconstructed rendition of the support plane in order to produce that given set of reconstructed absolute residuals;

producing a set of values ("compensated support plane", or "reconstructed reference residuals") based at least in part on the reconstructed rendition of the support plane and said compensation data; and producing the set of reconstructed absolute residuals by combining said compensated support plane with said set of reconstructed relative residuals.

In some non-limiting embodiments described herein, a plurality of support planes corresponding to neighboring subsequences of samples in a sequence of samples is also decoded according to common support information ("higher-order support plane"), the method comprising:

receiving higher-order support plane reconstruction data;

for a given support plane in said plurality of support planes, receiving support plane relative residual reconstruction data;

producing a reconstructed rendition of the higher-order support plane by decoding said higher-order support plane reconstruction data;

processing support plane relative residual reconstruction data, producing a set of values ("reconstructed support plane relative residuals"), said reconstructed support plane relative residuals corresponding to adjustments to perform on a set of values based at least in part on said reconstructed rendition of the higher-order support plane;

producing the given support plane in the plurality of support planes based at least in part on said reconstructed rendition of the higher-order support plane and on said set of reconstructed support plane relative residuals.

These and other embodiment variations are discussed in more detail below.

Note that embodiments herein may be implemented in software or hardware, or may be implemented using a combination of software and hardware, and can include a configuration of one or more computerized devices, routers, network, workstations, handheld or laptop computers, tablets, mobile phones, game consoles, set-top boxes, etc., to carry out and/or support any or all of the method operations disclosed herein. In other words, one or more computerized devices or processors can be programmed and/or configured to operate as explained herein to carry out different embodiments.

In addition to the techniques as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM, DVD-ROM or BLU-RAY), flash memory card, floppy or hard disk or any other medium capable of storing computer readable instructions such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals and produce bitstreams of encoded data, or that process bitstreams of encoded data and produce renditions of signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 1G is an example diagram illustrating the structure of a decoder;

FIGS. 2A, 2B, 2C and 2D illustrate various steps of operations used to process two images;

FIGS. 7A and 7B are example diagrams illustrating encoding and decoding of residual data based on support information;

DETAILED DESCRIPTION AND FURTHER SUMMARY OF EMBODIMENTS

Figure 1A:
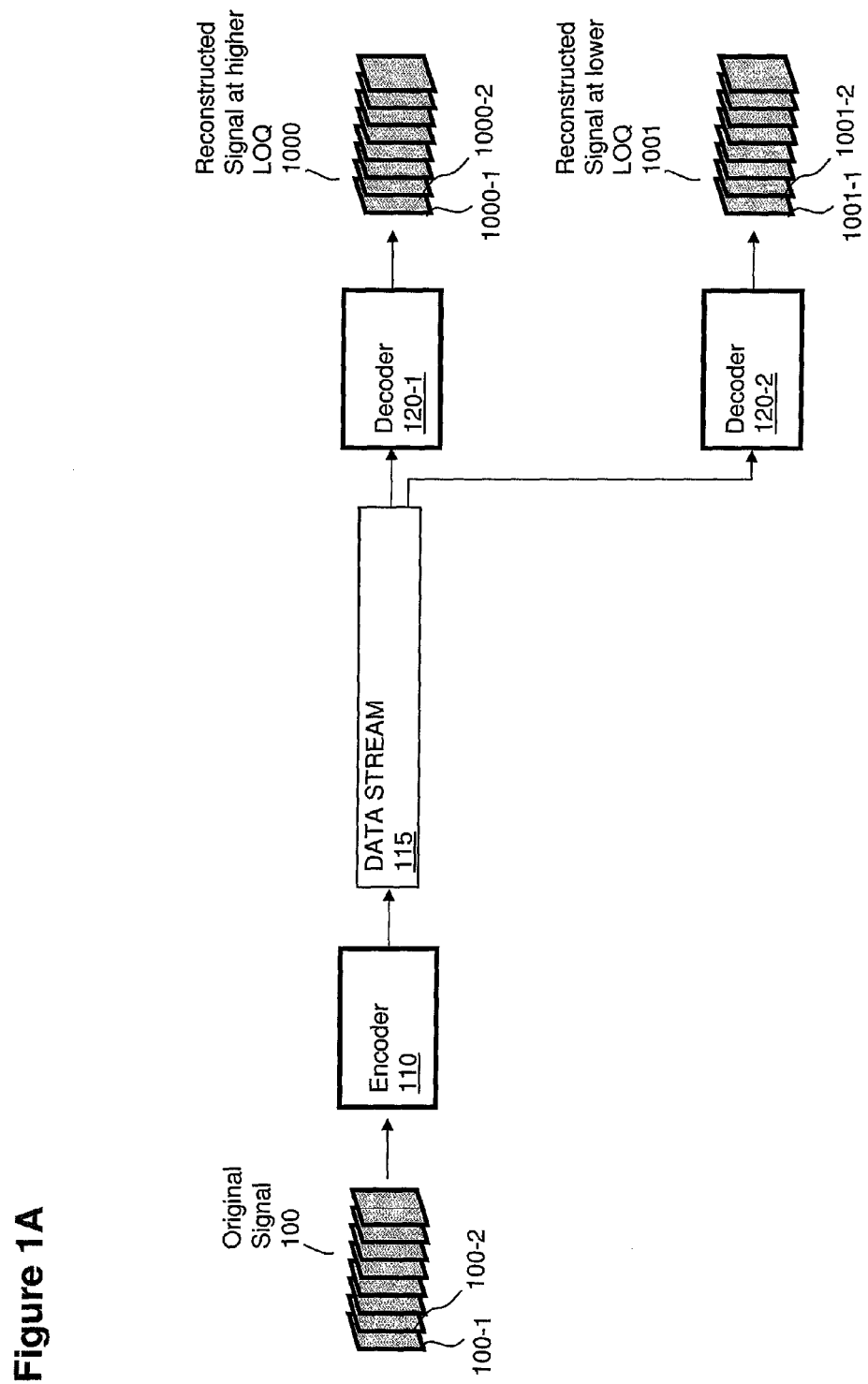
FIG. 1A is an example diagram illustrating a multiscale encoding and decoding system.

Methods illustrated herein are suitable for any type of multi-dimensional signals, including without limitation sound signals, multichannel sound signals, pictures, two-dimensional images, video signals, multi-view video signals, 3D video signals, volumetric signals, volumetric video signals, medical imaging signals, signals with more than four dimensions, etc. For simplicity, along the description the illustrated embodiments usually adopt the use case of video sequences, i.e., a time-based signal consisting of a sequence of 2D images (commonly called "frames", or "fields" in the case of interlaced video signals), with each element (in such non-limiting example case typically referred to as "pixel") being characterized by a set of color settings in a suitable color space (e.g., YUV, RGB, HSV, etc.). Different color planes (e.g., the luminance-Y plane and the two chrominance—U and V—planes) are often encoded separately, and often with different resolutions (due to the lower sensitivity of human eyes to chrominance information).

In other cases we will represent the signal as a sequence of N-dimensional samples or "spans" as defined before in this document, and refer to the fact that the full representation of the signal is an (N+1)-dimensional signal (e.g., if one of the dimensions is time, this corresponds to representing a sequence of spatial renditions with a single time-space rendition). These are to be considered non-limiting examples of the possible kinds of signals that can be filtered and/or compressed using innovative methods described herein. For signals other than videos, people skilled in the art can easily apply methods described herein by suitably adapting the approaches described for the use case of video signal. In a non-limiting example, spans can also be hyperplanes of elements with a different number of dimensions other than 2 (e.g., one-dimensional spans, three-dimensional spans, etc.) and/or it is possible to apply to dimensions different than time approaches that correspond to the ones described herein for the time dimension.

Every span in time of a signal is represented with a hyperplane (or more simply "plane", intended in its broadest meaning as "set of elements organized as an array with one or more dimensions"): for example a multichannel sound signal, a 2D HD video frame, or a 3D volumetric medical image can be all represented with arrays of plane elements (specifically, a 1D plane of elements for the multichannel sound signal, a 2D plane of elements for the HD video frame and a three-dimensional hyperplane of elements for the volumetric medical image).

Along time, spans occur at a given (local) sample rate. In conventional methods, the sample rate is always constant. On the contrary, innovative methods illustrated herein allow for a variable sample rate. In particular for levels of quality lower than the topmost level, the duration of spans of a given level of quality (i.e., the sample rate for that given level of quality) can be variable, effectively representing variable sample rates. In order to allow for suitable signal playback with spans that have different time durations, each of the spans is also characterized by a "picture number" or "picture identifier", representing the time when the span should start being displayed.

Methods and embodiments illustrated herein can be used in conjunction with one another and/or with other methods. Many of the preferred embodiments illustrated herein describe techniques and algorithms with the goal of achieving compression, i.e., encoding and/or decoding a suitable rendition of the signal with a minimum quantity of bits. This also is a non-limiting example: other embodiments can achieve different purposes, such as multiscale encoding and decoding, adaptive streaming, robust and efficient filtering, signal denoising (e.g., image denoising, video denoising, etc.), signal enhancements (e.g., signal supersampling, de-interlacing, etc.), generation of signal quality metrics, content identification, machine vision, signal encryption (e.g., secure communication), etc.

FIG. 1A is a non-limiting example diagram describing a multiscale encoding and decoding system.

In one embodiment, encoder 110 receives original signal 100 (e.g., signal 100-1, signal 100-2, signal 100-3, . . . such as a sequence of video images sampled over time) and encodes it into a multiscale data stream 115. In this example embodiment, decoder 120-2 receives data stream 115 and produces reconstructed signal at Lower LOQ 1001 (e.g., including images or frames 1001-1, 1001-2, and so on) of at a first (lower) level of quality than original signal and/or signal 1000.

Further in this example embodiment, decoder 120-1 receives data stream 115 and produces reconstructed signal at higher LOQ 1000 (e.g., at a second level of quality). In this example embodiment, the second level of quality 100 is higher than the first level of quality 1001.

In a non-limiting embodiment, the second level of quality has a higher resolution (spatial and/or temporal) than the first level of quality.

In another non-limiting embodiment, decoder 120-2 leverages MPEG-based decoding techniques (e.g., MPEG2, MPEG4, h.264, etc.) in order to decode data stream 115. In yet another non-limiting embodiment, decoder 120-1 produces reconstructed signal at lower LOQ 1001 and then reconstructs or derives the reconstructed signal at the higher LOQ 1000 based at least in part on first reproducing the reconstructed signal at lower LOQ 1001. In other words, the decoder 120-1 uses a first portion of reconstruction data encoded in data stream 115 to reproduce renditions of signal 1001 (e.g., 1001-1, 1001-2, and so on). Thereafter, the decoder 120-1 uses a second portion of data in the data stream 115 to upsample and modify renditions of signal 1001 into renditions of signal 1000.

In a non-limiting embodiment, the second level of quality has a resolution obtained by upsampling with a scale factor of two every spatial dimension of the first level of quality. For example, the data stream 115 can be configured to include a first portion of reconstruction data indicating how to reproduce an original element of the rendition of the signal at a first level of quality. Additional reconstruction data in the data stream 115 can indicate how to convert the element at the first level of quality into multiple elements at a second level of quality. By way of a non-limiting example, the multiple elements at the second level of quality provide a higher resolution of the original element at the first level of quality. Repeating these steps, a low resolution of an image (at a lower level of quality) can be converted into a higher resolution of the image. The higher image resolution provides more image details (because it includes many more image elements) and thus is likely to be more appealing to the viewer. Each of the images at the lower level of quality can be upsampled in a similar manner.

In other non-limiting embodiments, the second level of quality has a resolution obtained by upsampling with a specific scale factor (including non-integer scale factors and/or scale factors equal to 1) each of the dimensions of the signal. As an example, In a non-limiting example embodiment, a decoding signal processor of a TV decoder (e.g., without limitation, a set top box) is programmed so as to implement a method as illustrated in FIG. 1A, wherein Data Stream 115 corresponds to the received broadcast signal. In this way, legacy decoders receive the same Data Stream 115, but just ignore the additional data that allows to reconstruct a rendition of the signal at the higher level of quality. As mentioned, the higher level of quality can be a rendition of the signal at a higher resolution.

In other non-limiting embodiments, a streaming server processes encoded data stream 115 and, in response to characteristics of the decoder and/or to bandwidth congestion, generates a version of the data stream that only includes the encoded data necessary to decode the signal up to a given level of quality (as opposed to the maximum possible level of quality). In such an instance, bandwidth is not wasted on transmission of data that will not be used to reconstruct a rendition of the original signal.

Figure 1B:
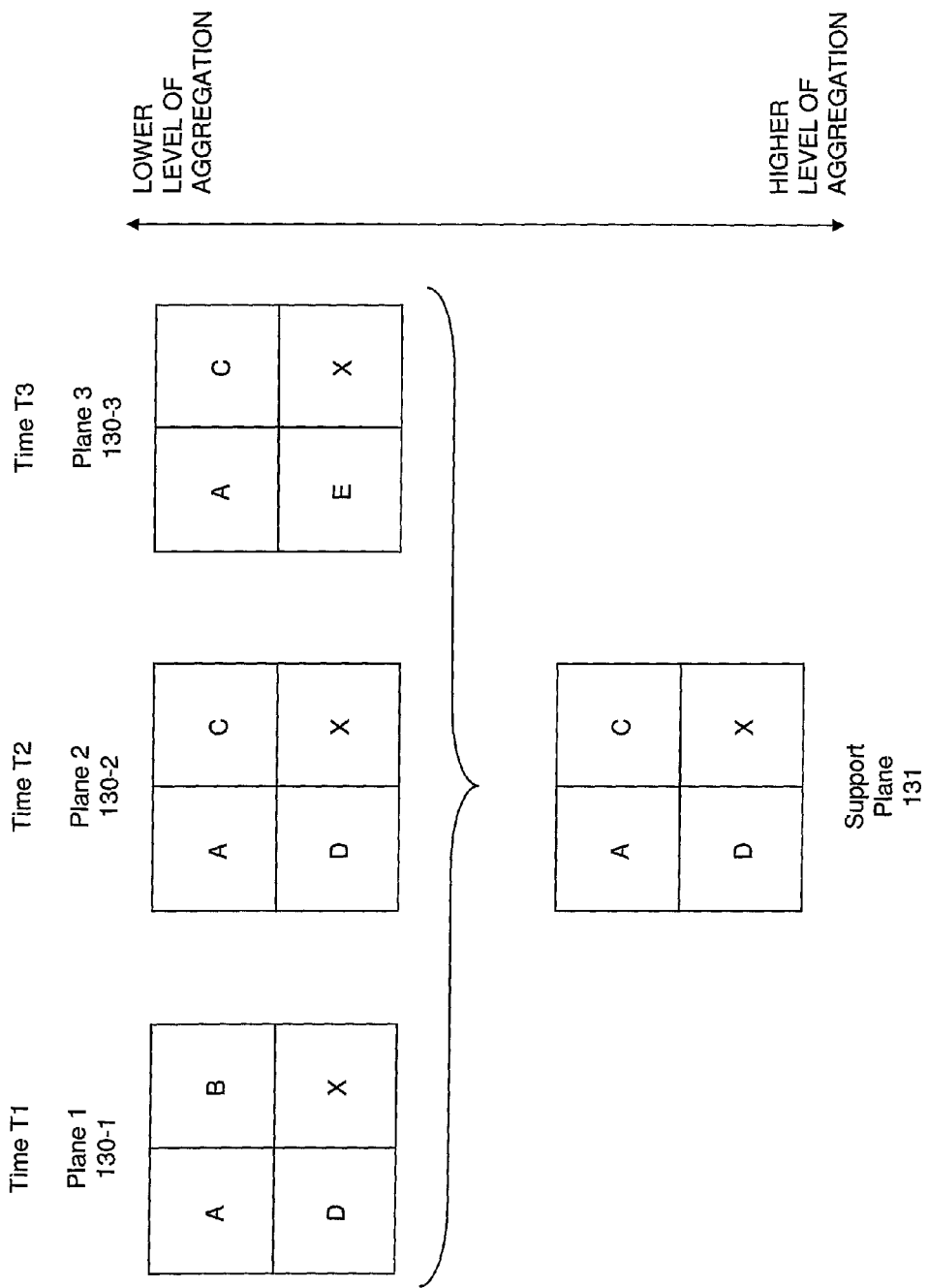
FIG. 1B is an example diagram illustrating an example of aggregation along the time dimension.

FIG. 1B is a diagram illustrating a non-limiting example of aggregation along the temporal dimension.

The three planes 130-1, 130-2, 130-3, each consisting of four elements organized as a 2×2 plane, are aggregated into Support Plane 150, with the same resolution as the original planes. Elements of Support Plane 150 are calculated based on corresponding elements of Planes 130-1, 130-2 and 130-3. The number of planes aggregated into a same Support Plane should be considered as non-limiting, since in principle any number of planes can be aggregated in a support plane. Support Plane 150 is said to be at a "higher level of aggregation" (LOA) than Planes 130-1, 130-2 and 130-3.

In some non-limiting embodiments, Support Plane 150 is processed in order to reconstruct, based on specific reconstruction data for each of Planes 130-1, 130-2 and 130-3, renditions of Plane 130-1, 130-2 and 130-3.

In some non-limiting embodiments, Planes 130-1, 130-2 and 130-3

In other non-limiting embodiments, Planes 130-1, 130-2 and 130-3 are residual planes, specifying adjustments to be made to preliminary renditions of corresponding samples in order to produce a reconstructed rendition of a signal.

In other non-limiting embodiments, Planes 130-1, 130-2 and 130-3 are support planes for other planes at a lower level of aggregation.

Figure 1C:
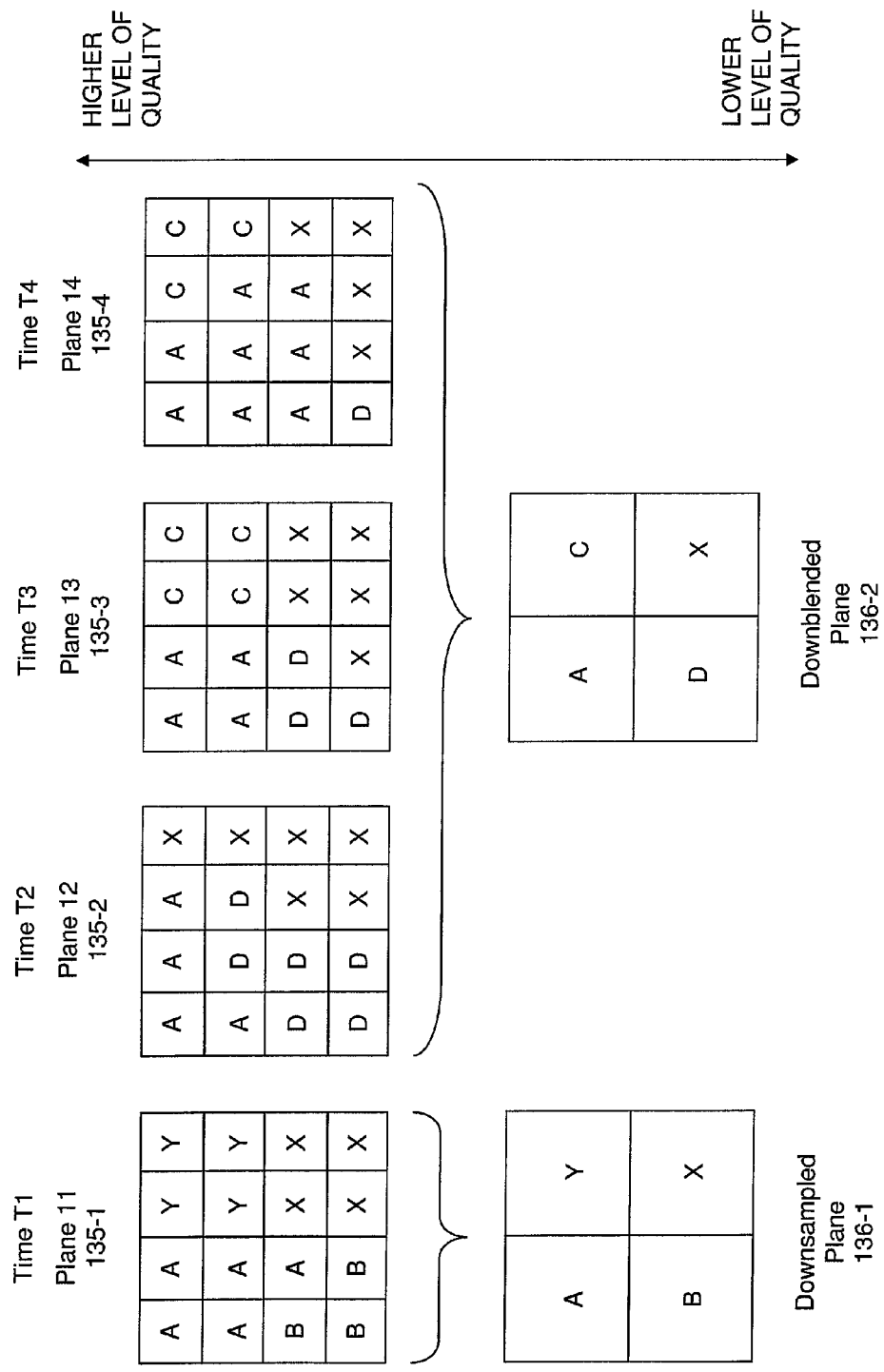
FIG. 1C is an example diagram illustrating examples of spatial downsampling and space-time downblending.

FIG. 1C is an example diagram illustrating non-limiting examples of spatial downsampling and space-time downblending. The diagram illustrates a sequence of planes at a first (higher) level of quality) and a corresponding sequence of planes at a second level of quality, the second level of quality being lower than the first.

In particular, the sequence at the second level of quality has been obtained as follows:

Plane 11 135-1, a two-dimensional plane made of sixteen elements, is downsampled with a scale factor of two along both of its spatial dimensions, producing Downsampled Plane 136-1;

Planes 135-2, 135-3 and 135-4, three two-dimensional planes each made of sixteen elements, are downsampled with a scale factor of two along their spatial dimensions and with a scale factor of three along the time dimension, producing Downblended Plane 136-2.

The operation of space-time downsampling (i.e., downsampling also along the time dimension) is also referred to in this application as "downblending". The number of planes downblended into a same Downblended Plane should be considered as non-limiting, since in principle any number of planes can be downblended into a downblended plane.

Figure 1D:
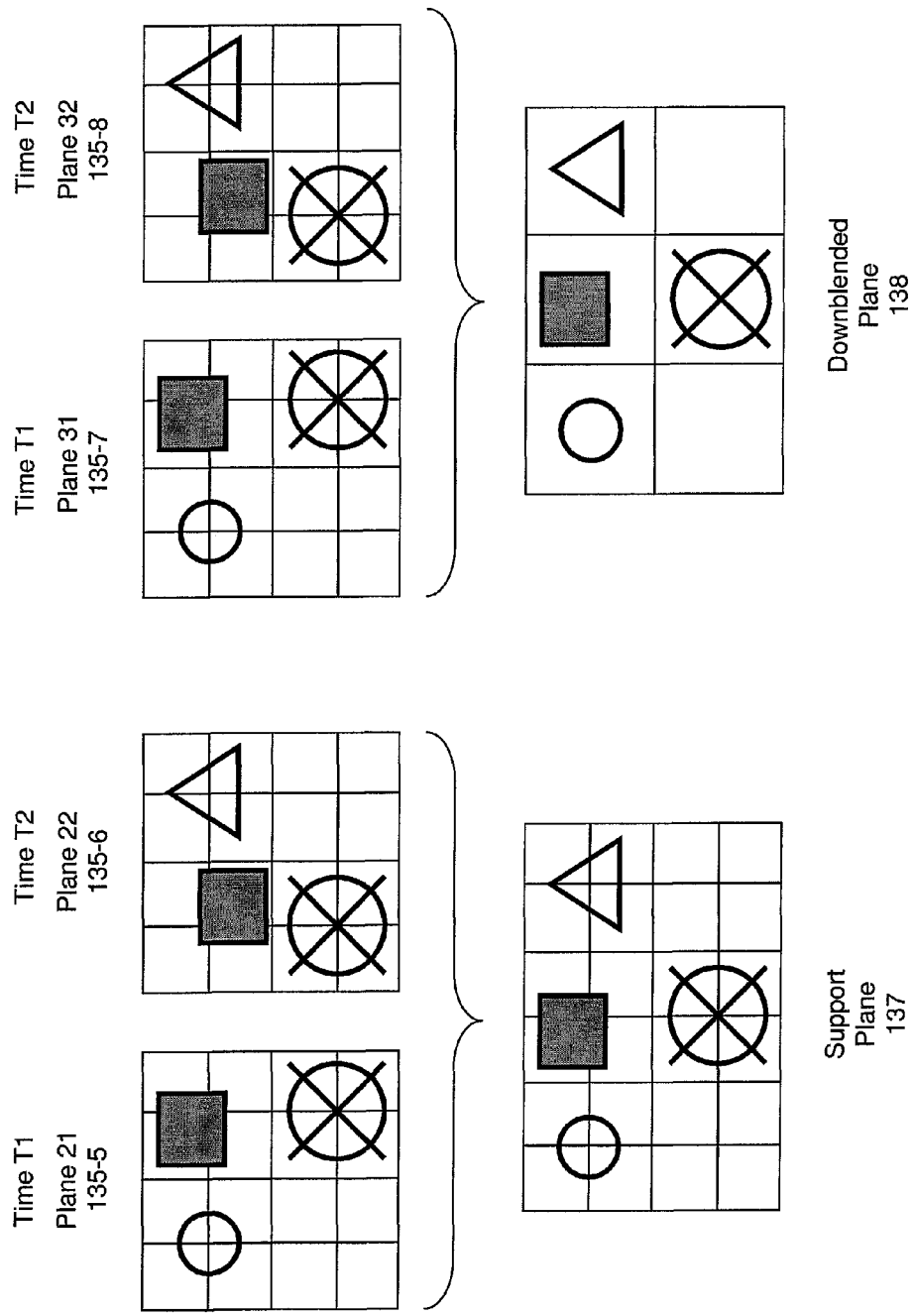
FIG. 1D is an example diagram illustrating examples of aggregation along time and space-time downblending.

FIG. 1D is an example diagram illustrating non-limiting examples of aggregation and space-time downblending performed together with motion compensation.

Plane 21 135-5 and Plane 22 135-6 are aggregated into Support Plane 137, wherein Support Plane 137 has a higher number of elements than the original planes. Elements of Support Plane 137 are calculated based on corresponding elements of Planes 135-5 and 135-6. It is important to specify that Support Plane 137 doesn't have a sampling grid with a higher resolution than that of the original planes, but just a sampling grid that extends for a larger portion of the "scene" captured by the signal (i.e., with a larger field of view): this allows to "stitch" onto Support Plane 137 information that is partly represented in all of the planes aggregated into Support Plane 137 (e.g., the information visually illustrated as a dark square in the diagram) and partly represented only in some of the planes aggregated into Support Plane 137 (e.g., the information visually illustrated as a triangle in the diagram).

Plane 31 135-7 and Plane 32 135-8 are downblended into Downblended Plane 138, wherein Downblended Plane 138 has more elements than the sampling grid resulting from spatial downsampling operations. Like Support Plane 137, also Downblended Plane 138 comprises information that is partly represented in all of the planes downblended into it, and partly represented only in some of the planes.

Figure 1E:
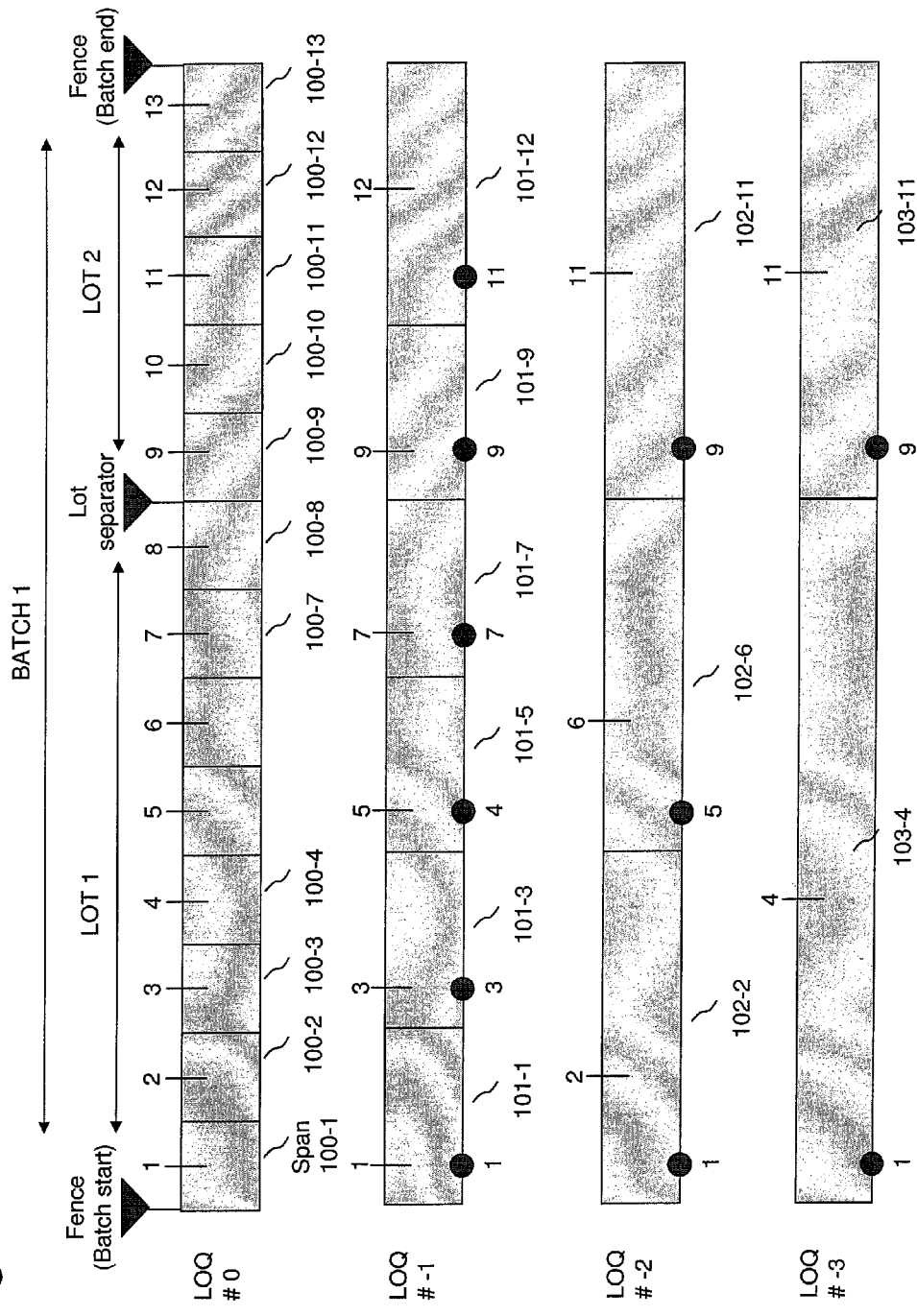
FIG. 1E is an example diagram illustrating the structure of a signal encoded in a tiered temporal hierarchy.

FIG. 1E is a diagram illustrating an (N+1)-dimensional signal that is, in this example, a sequence of N-dimensional spans representing a sequence of two-dimensional video frames. Spans of the highest (original) level of quality (LOQ #0, or equivalently tier #0) are organized in a "batch" (i.e., time chunk) consisting of two "lots" LOT 1 and LOT 2 or in other words two subsequences of spans.

In this example, at LOQ #0, LOT 1 consists of 8 spans of equal duration (span 100-1 at sampling position 1, span 100-2 at sampling position 2, . . . , span 100-8 at sampling position 8) and LOT 2 consists of 5 spans of equal duration (span 100-9 at sampling position 9, span 100-10 at sampling position 10, . . . , span 100-13 at sampling position 13). Each span represents a sample time for obtaining settings for respective display elements.

The signal illustrated in FIG. 1E is encoded in a tiered hierarchy, with the four topmost levels of quality LOQ #0, LOQ #4, LOQ #-2 and LOQ #-3 shown in the figure. This is intended as non-limiting, since a signal could be encoded with a higher number of levels of quality and in principle the lowest level has a single span consisting of a single element.

Level of quality LOQ #-1 consists of four spans for LOT 1 (spans 101-1, 101-3, 101-5, 101-7) and two spans for LOT 2 (spans 101-9 and 101-12). In this non-limiting embodiment, spans of LOQ #-1 have a lower number of elements than spans of LOQ #0, i.e. spans of LOQ #-1 were obtained by means of temporal downsampling.

In one embodiment, an encoder processing hardware combines attributes of the sample image captured in time span 100-1 and the image at time span 100-2 at level of quality #0 to produce a single representative image for time span 101-1 at level of quality #-1. The encoder processing hardware combines attributes of the sample image in time span 100-3 and the image at time span 100-4 at level of quality #0 to produce a single representative image for time span 101-3 at level of quality #-1. The encoder processor hardware repeats this temporal downsampling for each grouping at level of quality #0 to produce the image data at the next lower level of quality #-1.

Further in this example embodiment, the encoder processing hardware combines attributes of the sample image captured in time span 101-1 and the image at time span 101-3 at level of quality #-1 to produce a single representative image for time span 102-2 at level of quality #-2. The encoder processing hardware combines attributes of the sample image in time span 101-5 and the image at time span 101-7 at level of quality #-1 to produce a single representative image for time span 102-2 at level of quality #-2. The encoder processor hardware repeats this temporal downsampling for each grouping at level of quality #-1 to produce the image data at the next lower level of quality #-2.

Further in this example embodiment, the encoder processing hardware combines attributes of the sample image captured in time span 102-2 and the image at time span 102-6 at level of quality #-2 to produce a single representative image for time span 103-4 at level of quality #-3. The encoder processing hardware combines attributes of the sample image in time span 102-2 and the image at time span 102-6 at level of quality #-2 to produce a single representative image for time span 103-4 at level of quality #-3. The encoder processor hardware repeats this temporal downsampling for each grouping at level of quality #-2 to produce the image data at the next lower level of quality #-3.

Accordingly, the span 103-4 is a combined representation of images in spans 100-1, 100-2, 100-3, and 100-4, . . . , 100-7, and 100-8. The span 102-2 is a combined representation of images in time spans 100-1, 100-2, 100-3, and 100-4.

As discussed herein, generation of the representative plane of elements or image at the next lower level of quality for time span 101-1 can include detecting motion associated with an object present in the image at time span 100-1 and time span 100-2. The object may be located in one position in time span 100-1 and move to a second position in a region of display elements at time span 100-2. In one embodiment, the encoder processor hardware selects the position of the object in the first time span 100-1 as the location of the object in the image for time span 101-1. Assume that the object happens to change shape from time span 100-1 and time span 100-2. In such an instance, the encoder processor hardware creates a representation of the object based on a combination of the object in both time spans 100-1 and 100-2, but uses the location of the object in the first time span as a location of the object in the representative plane of elements for time span 101-1 (or, in other words, uses for the object the same sampling position as span 100-1). Thus, in this example, the representative image for time span 101-1 indicates to use the location of the object as in time span 100-1 but use a combined rendition of the detected object from both time spans 100-1 and 100-2 for the object presented in time span 101-1. In this way, the location of the object for each of time spans 101-1, 102-2, and 103-4 is the same location of the object as in time span 100-1. Assuming that the rendition of the object (e.g., the object gets bigger) changes in each time span over time spans 100-1 to time span 100-8, independent of location, the rendition of the object in the specified location is different for each of the time spans 101-1, time span 102-2, time span 103-4, etc.

In one embodiment, the hyperplanes of elements (i.e., in the example of video frames, the two dimensional planes of pixels) corresponding to spans of LOQ #-1 are also downsampled, with suitable scale factors for each spatial dimension, with respect to hyperplanes of elements corresponding to spans of LOQ #0: in this non-limiting example, hyperplanes have two dimensions (e.g., representing a two-dimensional image), and each dimension is downsampled by a factor of 2 for every level of quality of the hierarchy to the next, introducing lines or columns of padding when it is necessary in order to guarantee divisibility by two.

Notice that different numbers of spans of LOQ #0 correspond to different spans of LOQ #-1: for instance, downblended span 101-1 at LOQ #-1 corresponds (i.e., represents the same portion of the signal at a different level of quality) to spans 100-1 and 100-2 at LOQ #0 (i.e., temporal upsampling from span 101-1 to spans 100-1 and 100-2 has a scale factor of two), while downblended span 101-12 at LOQ #-1 corresponds to spans 100-11, 100-12 and 100-13 at LOQ #0 (i.e., temporal upsampling for span 101-12 has a scale factor of three). Accordingly, the time span of information upsampled during decoding or downsampled during encoding can vary.

Spans are characterized by a sampling position (represented in FIG. 1E by the number on top of each span, above a tick mark), a time duration (represented in FIG. 1E by the horizontal length of the span) and a picture number (represented in FIG. 1E by the number at the bottom of each span, below a solid circular mark). For instance, span 103-11 of LOQ #-3 is characterized by sampling position 11 (i.e., it is "centered" in position 11), time duration of 5 units of time (i.e., it corresponds to five spans of LOQ #0) and picture number of 9 (i.e., if the span had to be displayed, it would stay on the screen—at the picture rate of LOQ #0—starting from picture 9 up until picture 13, i.e. for its duration of 5 pictures).

In this non-limiting embodiment, sampling positions for spans of levels of quality lower than LOQ #0 are computed according to the sample rate of LOQ #0 (in this example a constant sample rate). In particular, the sampling position of a span that corresponds to a plurality of spans of LOQ #0 is calculated as the integer sampling position lower or equal to (i.e., rounding down) the average of the sampling positions of the corresponding spans at LOQ #0. For instance, span 102-2 of LOQ#-2 (corresponding to spans 100-1, 100-2, 100-3 and 100-4 of LOQ #0) has a sampling position of 2, since 2 is the closest integer sampling position lower than the average (which would be 2.5) of the sampling positions of 100-1, 100-2, 100-3 and 100-4. Similarly, span 103-11 of LOQ #-3 has a sampling position of 11 because 11 is the average (in this case directly an integer number) of the sampling positions of spans 100-9, 100-10, 100-11, 100-12 and 100-13.

In this non-limiting embodiment, picture numbers for spans of levels of quality lower than LOQ #0 are computed again according to the sample rate of LOQ #0, and the picture number of a given span is computed as the lowest sampling position of the spans of LOQ #0 that correspond to the given span.

Example Description of an Encoder Embodiment

In a compression oriented environment, a signal processor configured as an encoder (from now on "the encoder") processes the signal generating sets of encoded reconstruction data that essentially compress the signal to a given quality. A signal processor configured as a decoder (from now on "the decoder") receives the sets of reconstruction data and reconstructs a rendition of the original signal.

In order to generate suitable sets of encoded reconstruction data, the encoder first identifies the time portion of the signal that will be included in a batch, and its subdivision in lots. Batches are necessary due to the practical problem that the time dimension is often unbounded (at least for all practical purposes), while spatial dimensions have clear and fixed native boundaries (e.g., the horizontal and vertical resolution of a video frame, the number of values representing a sound sample, the x-y-z resolution of a volumetric image, etc.). Thus, it is often practically unfeasible, even if ideally the best option, to analyse the signal along its whole duration in time. However, a signal—in practical non-limiting examples such as motion pictures and shootings—is often natively a concatenated chain of unrelated chunks:

e.g., typically motion pictures contents are divided in "scenes", i.e., time-limited amounts of correlated spans separated by very evident scene changes. In certain instances, these "scene batches" can serve as a valid reference to partition, in time, the signal before encoding. When these batches are very long, however, it is necessary to further segment the sequence of spans. Without appropriate countermeasures, partitioning a scene into "independent portions for computation" can lead to evident artifacts: noise patterns suddenly change, smooth movements show discontinuities, etc. The novel methodology used by the preferred non-limiting embodiment described herein comprises the use of "lots" (i.e., downsampling the hierarchy lot by lot, independently) and a "decoding wave" approach (i.e., upsampling the hierarchy across lots). By means of such novel methods, the scene is indeed partitioned in order to make computation practical with current architectures. Such partitions are "bridged" during decoding, avoiding rigid separations, and consequently avoiding discontinuities in the reconstructed rendition of the signal.

In one example embodiment, if the batch consists of just a few spans, there is no need to partition it further. Assuming instead a batch lasting for many spans (i.e., above a given threshold), the encoder slices the batch in "lots". As indicated above, a lot is a consecutive number of spans. Lot lengths in the range from 1 to 128 spans and batches made of 1 to 5 lots are non-limiting examples for durations of lots and batches. From a practical point of view, such lengths are adjusted to the hardware, memory, and processing units used in a given embodiment. The decision on lot dimension is the result of a global optimization process performed at the encoder side. A non-limiting criterion is to maximize the lot length within a highly time-correlated batch, given any requirements on the decoder resource (in particular memory requirements), at the given profile produced by the encoder. Another non-limiting criterion is to keep as much as possible a fixed lot size and in particular setting it to either a fixed number of images or to one image (e.g., before or after very uncorrelated images), so as to simplify computations.

The encoder performs motion estimation across the signal, generating suitable descriptive information comprising number of parameters such as auxiliary maps, motion vectors, motion zone maps, motion matrixes, etc. and representing motion of the objects represented in the signal spans. Depending on motion estimation results, the encoder may modify the number of spans included in batches and lots, for example taking into account scene changes in the case of a video signal. Lot length is shortened by the encoder whenever the time correlation of spans along time decreases below given thresholds. Based on suitable metrics corresponding to the activity of the signal during the batch in terms of motion, lot lengths are thus assigned essentially on an inverse proportionality basis. In a non-limiting embodiment, lot length is defined based on said metrics by leveraging pre-set experimental parameters as well as suitable heuristics.

Within a batch, the encoder thus groups spans into one or more "lots".

Once identified what spans of LOQ #0 belong to what lot, the encoder calculates the tiered hierarchy of spans as shown in FIG. 1E, generating each span at a lower LOQ by downsampling the corresponding plurality of spans at the immediately higher LOQ. The span at the lower LOQ resulting from the downsampling of a plurality of spans at the higher LOQ is also defined as the "controlling" (or "parent") span for those spans.

Mathematically, let's call $X_L^K(t)$ the span of LOQ K, lot L and sampling position t. In the non-limiting embodiment illustrated in FIG. 1E, span 101-1 is obtained by downsampling the combination of spans 100-1 and 100-2. More specifically, in one embodiment, spans of the higher level of quality are combined by performing a weighted average of their motion-compensated renditions, wherein motion compensation is performed based on (i.e., relatively to) the sampling position of the resulting span at the lower level of quality. Mathematically, this can be expressed as follows:

$$X_1^{-1}(1)=\text{Down}(a \cdot \text{MC}(X_1^0(1))+b \cdot \text{MC}(X_1^0(2)))$$

Motion compensation function MC is a function that takes, as input, descriptive information on motion (generated via a suitable method of motion estimation) and transforms an original image (i.e., a span centered in a given sampling position) into a motion-compensated image, centered in the destination sampling position. In this non-limiting example embodiment, via an enlarged region of display elements, motion-compensated images are bigger (i.e., have more rows and columns of plane elements or display elements) than original images, in order to allow for combination of a plurality of motion-compensated images while limiting loss of information, as previously illustrated in FIG. 1D. In one embodiment, we defined the additional rows and columns (additional vs. the original resolution of a span at the same level of quality) "framing". Some elements of framing are assigned a default value ("Not Available" value) by the motion compensation function, in order to avoid that those elements influence weighted averages during the combination of multiple images into one image. As a simple non-limiting example case, applying motion compensation with respect to a given sampling position t to a span $X^K(t)$ with the same sampling position t, essentially corresponds to an identity function plus the addition of framing, wherein all of the elements of framing are assigned the default "Not Available" value. Relatively to the size of original combined spans, framing becomes larger going down the hierarchy, due to the fact that spans have a longer duration in time, and hence they might include a "higher amount" of the overall scene (especially due to motion).

In this simple non-limiting example embodiment, the downsampling function is a bilinear downsampling filter with a scale factor of 2 along both dimensions, and weight parameters a and b just depend on the relative time durations of the spans of the higher level of quality that are downsampled into the span of the lower level of quality. Other non-limiting embodiments weigh spans based on distance from the sampling position and/or more sophisticated parameters, but a simple average corresponds to the fact that the "relative amount of information" carried by a span is essentially proportional to the time portion of the signal that it represents. In the specific example of FIG. 1E:

$$X_1^{-1}(1)=\text{Down}(0.5 \cdot \text{MC}(X_1^0(1))+0.5 \cdot \text{MC}(X_1^0(2)))$$

$$X_1^{-2}(11)=\text{Down}(\tfrac{2}{5} \cdot \text{MC}(X_1^{-1}(9))+\tfrac{3}{5} \cdot \text{MC}(X_1^{-1}(12)))$$

When a motion compensation operation generates a plane of elements that includes one or more elements with a default value (e.g., "Not Available" value), elements with the default value are not included in the weighted average and the weights of the remaining values (i.e., different from "Not Available") are normalized, so as to guarantee that the sum of the weights of the remaining values in the weighted average is always equal to 1. In this non-limiting embodiment, normalization is calculated by adding a same constant to each of the weights, so as to make their sum equal to one.

Once the encoder generated LOQs at a given LOQ, the encoder starts generating encoded data that can allow a decoder to reconstruct suitable renditions of the tiered hierarchy. In particular, at a decoder side, once a given LOQ N−1 is available, the reconstruction of the actual value of each element of each span at the higher LOQ N requires to receive and to decode one or more sets of residuals, processed by the decoder in order to amend the predicted renditions generated based on information on lower levels of quality that was already available.

Mathematically, we will call $Y_L^K(t)$ the reconstructed renditions of each span $X_L^K(t)$. The reason why a given (reconstructed) Y might be different from its corresponding (original) X is that in a compression-oriented environment the encoder might be configured so as to allow a degree of quantization artifacts and/or other lossy artifacts in the reconstructed spans, so as to reduce a metric of information entropy of the signal.

For the one or more spans of the lower LOQ or bottom level, and only for those ones, the encoder generates each span $Y^B$ as the result of dequantizing the quantized rendition of $X^B$. This is expressed mathematically as follows:

$$Y_L^{Bottom}(t) = DQ(Q(X_L^{Bottom}(t))) = \hat{X}_L^{Bottom}(t)$$

(the symbol "^" indicating "reconstructed estimate of")

For the spans of subsequent (higher) levels of quality in the hierarchy, for each span the encoder generates a prediction U by performing suitable upsampling operations, leveraging one or more spans of the lower level of quality as "predictors". The objective of such upsampling operations at the encoder side is that the encoder simulates the operations that will be done at the decoder side. In particular, by simulating prediction operations, the encoder is subsequently able to generate the reconstruction data that will be needed by the decoder in order to amend predictions and reconstruct a suitable rendition of the signal.

Predictions and reconstruction data are generated by the encoder LOQ by LOQ, starting from the lowest level. Based on the position in the hierarchy (e.g., level of quality, distance from the beginning or the end of the batch, etc.), the encoder processes different numbers of spans at the lower level of quality as predictors. For instance, in the specific non-limiting example of FIG. 1E, prediction $U_1^{-2}(6)$ for span 102-6 is generated by processing as predictors spans 103-4 and 103-11, prediction $U_1^0(8)$ for span 100-8 is generated by processing as predictors spans 101-5, 101-7, 101-9 and 101-12, and prediction $U_1^0(1)$ for span 100-1 is generated by processing as predictors spans 101-1 and 101-3. In particular, in this non-limiting embodiment and with the exception of spans close to an edge of the batch ("fence"), predictors up to level of quality LOQ #-1 are chosen as the two spans of the lower level with the closest sampling positions (one lower or equal, one greater or equal) as the span to predict, and from LOQ #-1 to LOQ #0 as the four spans of the lower level with the closest sampling positions as the span to predict (two with lower or equal sampling positions and two with greater or equal sampling positions). Predictors do sometimes belong to different (neighboring) lots, a characteristic that allows our novel method to reduce or even eliminate the artifacts consequent from having partitioned a batch into different lots, essentially "fixing" the artificial partitions that were created during downsampling. For spans that are close to "fences" (i.e., the beginning and the end of the batch), fewer predictors are used, due to the fact that one or more predictors would have had to come from the precedent or subsequent batch, which however is likely not correlated with the current batch.

The encoder, in order to generate predicted spans U, also leverages spans that belong to neighboring lots: this is effectively a non-limiting embodiment of the reconstruction method that, again for lack of literature, is defined herein as "decoding wave" (based on the visual look of possible decoding patterns of a long batch encoded as a tiered hierarchy). An advantage of such novel method is that it addresses partition artifacts precisely when it matters, i.e., during the upsampling process: in fact, partition artifacts resulting from the need of downsampling the signal lot by lot would not be introduced during downsampling and/or downblending, but during upsampling. Let us consider LOT 1 and LOT 2 in FIG. 1E: for example, focusing on the time domain, the encoder downblends spans 100-7 and 100-8 of lot 1 to produce span 101-7; it also downblends spans 100-9 and 100-10 of lot 2 to produce span 101-9. Any time-related phenomenon (e.g., acceleration in the speed of an object, a small object appearing/disappearing, etc.) occurring between spans 100-8 and 100-9 is "ill-captured" by such downsampling processing. This would become evident during the generation of predictions if also temporal upsampling operations (i.e., span prediction operations) were performed—like downsampling operations—within the rigid limits of a lot. For instance, if the upsampling operations that generate span 100-8 at the decoder side took into consideration only span 101-7 and maybe also earlier spans (e.g., 101-5), prediction operations would not properly take into account the movements/phenomena occurred after span 100-8. One consequence would be a less precise prediction, and consequently a higher amount of information entropy of the residual data necessary to amend the prediction and generate a suitable rendition for 100-8 (and/or more evident artifacts). This problem, however, is solved if during space—time upsampling operations the encoder adopts a kernel spanning beyond the boundaries used in downsampling. As a non-limiting example, upsampling performed to produce the prediction for 101-7 leverages as predictors 102-6 and 102-11; upsampling performed to produce the prediction for 100-8 leverages as predictors 101-5, 101-7, 101-9 and 101-12. Essentially, upsampling is performed by also leveraging information from different lots, effectively generating—when decoding subsequent spans at a high level of quality—an upsampling "wave" (wherein the decoding of lower LOQs "anticipates" the decoding of higher LOQs): in order to reconstruct a predicted rendition for a span at a given sampling position and a given LOQ, the decoder (or the simulated decoder used during the encoding process) must process spans at progressively greater sampling positions for progressively lower LOQs. In the non-limiting embodiment illustrated in FIG. 1E, predictor spans can at most belong to a neighbouring lot, hence limiting the maximum "extension" of the lower part of the "decoding wave". Several non-limiting example embodiments of possible temporal kernels and upsampling sequences are possible, influencing the trade-offs between encoding/decoding latency, memory requirements and compression efficiency.

Since predictions U are generated by processing one or more lower-LOQ spans selected from the current lot, the precedent lot and the subsequent lot, mathematically we can say that (for the non-limiting embodiment illustrated in FIG. 1E):

$$U_L^K = f(Y_{L-1}^{K-1}, Y_L^{K-1}, Y_{L+1}^{K-1})$$

wherein f is the upsampling function.

In particular, this non-limiting embodiment generates predictions U by performing an upsampling of a weighted average of planes of elements generated by motion compensating each predictor span with respect to the sampling position of the predicted span. Mathematically, for the non-limiting example case of span 102-6:

$$U_1^{-2}(6) = \text{Up}(c \cdot \text{MC}(Y_1^{-3}(4)) + d \cdot \text{MC}(Y_2^{-3}(11)))$$

In the non-limiting embodiment illustrated in FIG. 1E, the weights used for the weighted average of predictors are based on the distance of sampling positions of each predictor from the sampling position of the predicted span (according to linear filtering—for the case of two predictors—and cubic filtering—for the case of four predictors—weights). For the cases in which one or more predictors are missing (e.g., due to vicinity to a fence) or one or more elements in the weighted average is assigned a default value (i.e., "Not Available" element, as a result of a motion compensation operation), weights of the remaining values are normalized to 1, in this non-limiting example case according to an additive normalization method (i.e., by summing to each remaining weight a same constant). Upsampling operations—in this embodiment performed jointly with motion compensation operations—leverage linear filtering up to LOQ #-2 and custom filtering (i.e., with kernels specified to the decoder by the encoder with suitable encoded parameters) for upward levels, combined with deblending filtering and unsharp masking. The use of larger kernels for higher levels of quality, both in time and space (i.e., more predictors and/or larger upsampling kernels), is calibrated in order to correspond to the higher amount of correlation that can be found at higher levels of quality among neighboring spans and/or within neighboring elements of a same spans vs. the amount that can be found at lower levels of quality among neighboring spans and/or within neighboring elements of a same span.

Once predictions U for a given level of quality are available, the encoder calculates "absolute residuals" R corresponding to a difference between any given span and a corresponding predicted span. This is expressed by the following equation:

$$R = X - U$$

For the bottom LOQ (and only for the bottom LOQ):

$$U^B = 0$$

$$R^B = X^B$$

absolute residuals are suitably transformed and quantized by the encoder into transformed residuals Tr(R), in order to reduce a metric of information entropy before a lossless entropy encoding step (in the embodiment performed by partitioning the data into suitable groupings—called "tiles"—and by applying an arithmetic encoder, according to parameters calibrated based on the specific histogram of the data in each tile). The computation of actual residual data to encode ("transformed residuals") is not limited to a set of arithmetical operations on total residuals, but it comprises specific functions aimed at improving the overall compression/decompression efficiency of the encoding/decoding algorithm (e.g., in this non-limiting embodiment, directional decomposition based on lower LOQ).

As a consequence, if h(•) is the function that corresponds to "inverting" (to the extent possible) all of the operations performed on absolute residuals, we can say that, for each span of each LOQ:

$$Y = U + h(Tr(R)) = U + \hat{R}$$

In particular, for the bottom LOQ $Y^B = \hat{R}^B$.

In this non-limiting embodiment, for higher levels of quality in the hierarchy, absolute residuals are computed and transmitted in a plurality of sets of absolute residuals, so as to enable, even for a same LOQ, different levels of compression and precision ("Level of Detail", or "LOD") of a rendition Y reconstructed at the decoder side.

Once having computed and suitably transformed residual data, the encoder generates sets of encoded reconstruction data corresponding to said residual data and to descriptive information on operations to be performed at the decoder side. In a non-limiting embodiment, said descriptive information comprise information corresponding to motion (leveraged at the decoder side during motion compensation operations), information corresponding to characteristics of the spans of the tiered hierarchy (in particular, id numbers and key parameters for each span of each LOQ of each lot) and information corresponding to upsampling operations (in particular, id numbers of the spans to be processed to generate the predicted span for a span of a higher tier, parameters corresponding to weights to be used, parameters corresponding to upsampling operations—such as, without limitation, upsampling kernels—to be used).

Additional Non-Limiting Example Embodiments

The encoder embodiment illustrated in FIG. 1E and described above is just one of the many possible implementations of our novel tiered hierarchical methods, and should be considered as non-limiting.

Essentially, during encoding the signal is converted by the signal processor into tiers with different levels of quality (LOQ #0, LOQ #4, LOQ #-2, . . . ), starting from an original level of quality (LOQ #0). The number of tiers is arbitrary, and it can depend on the application and on the specific embodiment. A non-limiting embodiment computes all of the possible LOQs, for example when compression efficiency is the goal of the embodiment. In principle, the lowest LOQ achievable is reached when all of the dimensions of the signal (e.g., number of spans, number of elements per each dimension of a span) reach a resolution equal to 1 element. In a non-limiting embodiment, when the time resolution of a lot reaches a resolution of 1 (i.e., at that LOQ and for that lot of the signal, there is only one span), downsampling continues by downsampling only along the spatial dimensions; the bottom level of quality (LOQ) is reached when the first of the spatial dimensions reaches a resolution equal to 1. To move from one tier to another an arbitrary downsampling ratio can be applied to each of the dimensions of the signal. The non-limiting embodiment illustrated above downsamples the time dimension with arbitrary scale factors and all of the spatial dimensions of the spans by a factor of 2 (after having applied framing rows and columns) However, other applications and embodiments use different settings as well for the generation of tiers of LOQs, including different scale factors for each dimension and for each LOQ. In a non-limiting embodiment, such scale factors are known to both the encoder and the decoder. In another non-limiting embodiment, the encoder sends to the decoder information corresponding to the specific scale factors and to the upsampling operations to be used in each case. In another non-limiting embodiment, said information is encoded according to an inheritance-based method, i.e. a default value for said information at a given LOQ is calculated by the decoder based on information reconstructed for a lower LOQ through suitable inheritance operations.

Other non-limiting embodiments implement a similar tiered-hierarchy method, wherein sampling positions of spans of lower LOQs are calculated according to different mathematical operations. In a non-limiting embodiment, sampling positions of spans of lower LOQs include non-integer numbers.

In other non-limiting embodiments, the encoder selects lot lengths and temporal downsampling operations so as to maintain sample rate constant also for lower LOQs (e.g., a non-limiting embodiment leverages a method of "time padding", by adding padding information when the number of spans in a lot at a given LOQ is not a multiple of the scale factor for temporal downsampling). In other non-limiting embodiments, instead, sample rate is variable also for the highest LOQs of the signal. In other non-limiting embodiments, temporal downsampling is performed only below a given LOQ, while all LOQs above that given LOQ have a same sample rate.

In other non-limiting embodiments, combination of a plurality of spans of a given LOQ in order to generate a span of a lower LOQ comprise operations that are different from the ones described above, and that are selected from other suitable downsampling and motion compensation methods in the known art.

In the non-limiting embodiment described above downsampling operations leverage motion estimation information in order to suitably account for motion between two or more spans along the time dimension. The reason why this can be useful for certain time-based signals is that, from a signal theory point of view, temporal sampling may be below the Nyquist limit. In the example of video signals, 25/30 fps is an example of typical sample rates as of today, while several experiments demonstrated that human observers can easily perceive up to 300 fps for the type of movements that are typically portrayed in videos. This means that video signals commonly sample the time dimension below the Nyquist limit. In such cases, a specific approach adopted only along the time dimension (such as motion estimation) reduces the damages introduced by insufficient sampling, essentially "realigning" spans in order to better exploit their correlation. Descriptive information on motion is used to guide the temporal downsampling along the tiered levels of quality. Motion estimation is an optional phase adopted by the encoder: slow movements, high sample rates or very complex movements are non-limiting examples of when adopting motion estimation and compensation can be less efficient or even worse than just generating the tiered LOQs without giving any "preferential treatment" to the time dimension. For the portions of the signal where suitable conditions indicate that motion estimation is not helpful, the encoder discards motion information and proceeds with symmetric downsampling (e.g., in a non-limiting embodiment, simple tri-linear subsampling).

Another non-limiting embodiment does not introduce framing rows and columns in spans of lower LOQs. In another non-limiting embodiment, the amount of framing introduced is correlated with motion information.

Other non-limiting embodiments use different operations for the downsampling itself. In a non-limiting embodiment, the encoder applies different downsampling operations (including non-linear operations) to generate spans of a lower LOQ and applies different upsampling operations, identifying a set of downsampling operations and upsampling operations that minimizes a metric of information entropy of residual data. In one of such embodiments, the encoder leverages a tweaked filtering method, selectively modifying ("tweaking") the results of a linear downsampling operation and optimizing tweaks based on the resulting entropy of residual data.

In another non-limiting embodiment, the encoder downsamples each span of the higher level of quality before combining them into a span of the lower level of quality. In another non-limiting embodiment, the encoder downsamples each span of the higher level of quality, applies motion compensation (introducing framing) and combines results into a span of the lower level of quality. In another non-limiting embodiment, downsampling operations are performed jointly with motion compensation operations (i.e., during the downsampling process, motion compensation operations produce downsampled renditions of motion compensated spans).

In another non-limiting embodiment, when weights in a weighted average need to be normalized so as to make their sum equal to 1 (e.g., during weighted averages including "Not Available" values, and/or when generating predicted spans close to the beginning or the end of a batch), the encoder applies a multiplicative normalization (e.g., multiplying all weights by a same constant) rather than an additive normalization (e.g., adding a same constant to all weights).

In another non-limiting embodiment, when calculating predicted spans, the encoder first upsamples each of the predictor spans of the lower level of quality, then motion compensates them, and then combines the results. In another non-limiting embodiment, the encoder first motion compensates each span, then combines them and finally upsamples the results. In another non-limiting embodiment, upsampling operations are performed jointly with motion compensation operations (i.e., during the upsampling process, motion compensation operations produce upsampled renditions of motion compensated spans).

In another non-limiting embodiment, upsample operations are selected from a set including without limitation linear filters, cubic filters, Lanczos filters, bilateral filters, nearest neighbour filters.

More broadly, different embodiments use different operations and filtering in upsampling operations. Upsampling operations produce a prediction for the settings of the elements of the spans of the signal at the higher LOQ. In a set of non-limiting embodiments, after upsampling (i.e., the operation that increases the resolution), a further step of filtering operations is performed (both at the encoder and at the decoder side) in order to enhance the quality of the prediction (e.g., by way of non-limiting examples, enhancing sharp edges that have been smoothed during downsampling, or retrieving details that have been blurred during downsampling). A non-limiting example embodiment for this step is described in a previous patent application of the same authors (13/188,220) and is referred to as "deblending" operation. Another non-limiting example is to leverage an unsharp masking operation. In other non-limiting embodiments, upsampling operations include cascaded non-linear operations (e.g., suitable sequences of operations selected from a list including without limitation linear filters, cubic filters, deblending filters, unsharp masking filters, bilateral filters, fractal filters, nearest neighbour filters, etc.), either as specified by suitable parameters or according to a predetermined default sequence known to both encoder and decoder. In another non-limiting embodiment, the encoder sends upsampling parameters to the decoder, wherein such parameters correspond to the specific upsampling operations to be used.

In another non-limiting embodiment, motion compensation operations are performed jointly with upsampling operations. In other non-limiting embodiments, motion compensation operations leverage floating point operations, including transformations accounting for complex movements such as zoom, rotation, offset and/or perspective change. In one of such embodiments, motion compensation operations include transforming a set of coordinates into homogeneous coordinates, performing a floating point multiplication of said homogenous coordinates by a suitable matrix and renormalizing the resulting vector in homogenous coordinates. In another non-limiting embodiment, when combining different spans of a lower level of quality into a span of a higher level of quality, the encoder combines them through weighted average operations where the weights depend on the distance of sampling positions, based on a linear kernel. In another non-limiting embodiment, such weights depend on the distance of sampling positions, based on a cubic kernel. In other non-limiting embodiments, yet other kernels are adopted. In another non-limiting embodiment, said weights are generated at least in part on motion information (accounting for the fact that if substantial motion has taken place, the amount of correlated information in a different span will be relatively lower). In another non-limiting embodiment, said weight parameters are generated at least in part on parameters corresponding to the characteristics of each of the spans (e.g., so as to suitably account for spans that are relatively out of focus, etc.). In another non-limiting embodiment, said weights are calculated by the encoder in order to reduce an amount of entropy of residual data, and are sent to the decoder via corresponding descriptive information.

In other non-limiting embodiments, the number of predictors that are processed in order to generate a predicted span at a higher level of quality are arbitrary and sent to the decoder with descriptive information. In one of such non-limiting embodiments, the encoder optimizes the number of predictors and weight parameters leveraged to generate each predicted spans through an iterative method aimed at optimizing suitable information entropy metric for reconstruction data and/or a suitable quality metric for reconstructed renditions.

In another non-limiting embodiment, default values for the number of predictors that are processed include linear temporal filtering (i.e., one or two predictor spans) up to a given LOQ and cubic temporal filtering (i.e., up to four predictor spans) from a given LOQ up to the topmost LOQ. In another non-limiting embodiment, for one or more spans of a given LOQ of a given lot, predictor spans of the lower LOQ belong not just to the given lot and a neighbouring lot, but also to the lot subsequent to the neighbouring lot (i.e., the set of predictors for a given span can also come from three lots, not just from two like in the non-limiting embodiment described above).

In other non-limiting embodiments, the encoder assigns suitable synch markers to sets of encoded reconstruction data, allowing a signal processor to create a data stream and/or a file comprising only specific sets of encoded reconstruction data in a specific sequence, allowing the reconstruction of specific spans in a specific decoding sequence.

In other non-limiting embodiments, when generating encoded data the encoder introduces random bits of padding before one or more synch markers; subsequently, the encoder encrypts header information and/or synch marker information according to a suitable encryption method.

In other non-limiting embodiments, the encoder processes residuals of each of the LOQs and generates transformed residuals according to "directional decomposition" methods along the spatial dimension (substantially by grouping sets of neighbouring residuals for a same span and encoding a parameter corresponding to the difference between their average value and their predicted average value, a parameter corresponding to their horizontal tilt, a parameter corresponding to their vertical tilt, a parameter corresponding to their diagonal tilt, and quantizing each parameter by means of suitable quantization methods) and/or "temporal decomposition" methods along the temporal dimension (essentially grouping corresponding sets of residuals belonging to different subsequent spans of a same LOQ controlled by a same span at a lower LOQ and encoding a parameter corresponding to their average and parameters corresponding to temporal tilts). In other non-limiting embodiments, for each of the lots the encoder processes absolute residuals of each of the LOQs, generating a set of support element residuals (for lack of literature defined as "support plane" for a given LOQ of a given lot); the encoder then generates sets of relative residuals, corresponding to a difference between absolute residuals and support element residuals. This is described in more details with reference to FIG. 3.

In other non-limiting embodiments, the encoder proceeds to quantization and encoding of absolute residuals without transforming residuals.

In another non-limiting embodiment, the encoder quantizes residuals according to quantization schemes that are specific to each set of residuals, and sends to the decoder descriptive information corresponding to the dequantization methods that must be used. In a non-limiting embodiment, available quantization schemes comprise without limitation schemes with different dead zones and constant quantization step (for which the encoder specifies parameters corresponding to the dead zone and/or the length of the quantization step), schemes with different dead zones and variable quantization steps (for which the encoder specifies parameters corresponding to the dead zone and/or a function that allows to calculate all the quantization steps), schemes with quantization in different color spaces (e.g., by way of non-limiting example, non-linear spaces such as gamma space), etc. In another non-limiting embodiment, dequantization for specific levels of quality (e.g., topmost level of quality) also comprises statistical reconstruction methods (e.g., dithering, statistical dequantization, reconstruction and combination of a transient layer, etc.), so as to better represent that original residuals before quantization were distributed along the quantization ranges.

In other non-limiting embodiments, since quantization decisions affect previously-taken decisions in terms of global bitrate optimization (including the decision of lot length within a batch), the encoder perform loops, in order to essentially achieve global optimization. In a non-limiting embodiment, changes in quantization thresholds also affect residual computation and transforms (e.g., generation of support elements/supporting chains).

In other non-limiting embodiments, the encoder generates different sets of residuals, and assigns a descriptive parameter to each set, said parameter corresponding to a level of importance of the corresponding set of residuals in order to reconstruct a rendition of the signal with perceived high quality (e.g., a non-limiting embodiment assigns higher numbers of bits—e.g., finer quantization steps—to more important residuals and lower number of bits—e.g., coarser quantization steps—to less important residuals).

In other non-limiting embodiments, residuals are encoded according to an inheritance-based method, e.g., by predicting ("inheriting") them based on residual data at a lower level of quality, allowing for "finalization" of controlled residuals at a higher LOQ by means of suitable residual information at a lower LOQ (e.g., portions of the reconstructed signal where the encoder defines at a lower LOQ that residual data for that portion of the signal at all subsequent LOQs will be equal to zero, i.e. that predictions will be sufficiently accurate without requiring to transmit amendments).

In other non-limiting embodiments, entropy encoding of residuals leverages a combination of methods comprising at least one of the following methods: Huffman encoding, Run length encoding, arithmetic encoding.

In other non-limiting embodiments, lower LOQs of the signal and/or synch marker information are encrypted by means of suitable encryption methods. In this way, despite a relatively limited processing power necessary at a decoder to encrypt/decrypt a relatively small portion of the data stream, and yet data transmission of the signal is very secure, since there is no evident correlation between specific portions of the data stream and specific portions of the signal.

In other non-limiting embodiment, lower LOQs are protected by leveraging suitable redundancy techniques, so as to guarantee that, even in the presence of a very noisy communication channel, the decoder will be able to suitably reconstruct a rendition of the signal at least at a low level of quality.

Methods described herein can also be applied in a low-latency environment, such as for instance video conferencing. In a non-limiting embodiment, the encoder generates a "rolling hierarchy" of spans, predicting new spans at a given LOQ to be reconstructed based only on spans of lower LOQs with lower sampling positions (i.e., precedent in time). In another non-limiting low-latency embodiment, residuals for a given span are transformed based on information of residuals of precedent spans of the same level of quality.

Example Description of a Decoder Embodiment

A signal processor configured as a decoder (from now on "the decoder") receives the sets of reconstruction data and reconstructs a rendition of the original signal.

Since, as we mentioned, the encoder simulates the operations performed at the decoder side in order to generate suitable reconstruction data, FIG. 1E also illustrates the sequence of interim products and end products generated by a decoder.

The sequence of reconstruction operations performed by a decoder leveraging a tiered hierarchical method can follow several different patterns, based on the number of predictors of a lower LOQ that are leveraged to produce a prediction of a span at a higher LOQ.

For the non-limiting embodiment described herein, the decoder receives encoded data for an entire lot (i.e., at least one lot of delay is necessary at the decoder side in order to start the reconstruction process). Said encoded data comprises data corresponding to descriptive information and data corresponding to sets of reconstruction data.

The decoder starts by receiving/fetching a data stream and searching/parsing synch marker metadata in order to identify what spans (potentially also from a precedent lot, if the received lot is not the first of its batch) can be reconstructed by means of the available encoded data, as well as the right span at the right LOQ in order to start the decoding process.

Then the decoder performs entropy decoding in order to generate information corresponding to a rendition of the lowest LOQ of the lot.

Starting from the spans of the lowest LOQ, the decoder performs the same operations that were simulated by the encoder in order to generate the reconstruction data. In particular, the decoder—LOQ by LOQ—processes spans of a lower LOQ in order to generate predicted spans for a higher LOQ, decodes reconstruction data (dequantizing and detransforming the received transformed residuals) so as to generate renditions of absolute residuals, and finally combines predicted spans and corresponding absolute residuals, reconstructing renditions Y for the spans that can be reconstructed based on the available predictor spans at a lower LOQ and the available encoded data. As we described above, predictions for spans of a given lot can also leverage predictor spans of neighboring lots, effectively implementing a "decoding wave" method.

Mathematically:

$$Y^B = \hat{R}^B$$

$$Y = U + h(Tr(R)) = U + \hat{R}$$

$$U_L^K = f(Y_{L-1}^{K-1}, Y_L^{K-1}, Y_{L+1}^{K-1})$$

In particular, consistently with what we described for the encoder embodiment, also the decoder embodiment generates predictions U by performing an upsampling of a weighted average of planes of elements generated by motion compensating each predictor span with respect to the sampling position of the predicted span. The same peculiarities of such operations described for an encoder embodiment (e.g., normalization of weights, "Not Available" default value, etc.) also apply to a decoder embodiment.

Mathematically, for the non-limiting example case of span 102-6:

$$U_1^{-2}(6) = \text{Up}(c \cdot \text{MC}(Y_1^{-3}(4)) + d \cdot \text{MC}(Y_2^{-3}(11)))$$

$$Y_1^{-2}(6) = U_1^{-2}(6) + \hat{R}_1^{-2}(6)$$

As shown in the formula, the decoder must for instance wait to receive encoded data relative to lot 2 before being able to reconstruct span 102-6, since, as shown by the formulas above, prediction for span 102-6 is also based on the reconstructed rendition of span 103-11.

Once spans of a suitable LOQ are reconstructed, the decoder generates the data to present to a display device, and transmits said data to a display device. In a non-limiting embodiment, when the decoder needs to display a LOQ lower than the topmost LOQ, in order to account for the potentially different durations of each span, it creates a signal with the same sample rate as the original (i.e., topmost LOQ), by creating for each span as many replicas as its time duration, starting from the time position indicated by its picture number.

In a non-limiting embodiment, the decoder receives descriptive information on the structure of the lot, including the ID numbers of the spans that are present in each level of quality, the time duration of each span, the ID numbers of the predictor span(s) at the lower level of quality to be used to generate each prediction and parameters to be used during the operations performed to generate each prediction. In another non-limiting embodiment, one or more predictor spans of a lower level of quality—said spans being processed to generate the prediction for a given span at a higher level of quality of a given lot—can also belong to a neighbouring lot.

In a non-limiting embodiment, the decoder can stop decoding operations at different LOQs for different spans, e.g., depending on encoded data that was received (e.g., due to bandwidth congestions) and/or on real-time decoding constraints and/or on other constraints (e.g., minimizing processing power consumption, minimizing power consumption, minimizing absorbed bandwidth, maximizing playback speed, etc.).

In other non-limiting embodiment, based on suitable parameters and/or user interface commands the decoder can decode only selected portions of each span, effectively implementing a zoom functionality. In a non-limiting embodiment, sets of residual data for a given LOQ are partitioned in groupings ("tiles"), each of the tiles substantially corresponding to residual data processed by a decoder in order to reconstruct a given portion (e.g., a spatial portion) of the signal at a given LOQ. From a level of quality upward, the decoder receives only specific tiles for a sequence of one or more spans, and consequently reconstructs at the given level of quality only specific spatial portions of said spans, sending only a spatial portion of the signal to the display device. It must be noted that reconstruction operations (e.g., prediction operations, etc.) are still leveraging elements of the signal at a lower LOQ beyond the boundaries of the reconstructed portions. In other words, in such non-limiting embodiments the decoder receives reconstruction data corresponding only to specific spatial portions ("tiles") of the reconstructed sets of residuals that would be necessary to reconstruct the whole signal at the given LOQ. Consequently, the decoder reconstructs only a sequence of portions of the reconstructed sets of residuals, and thus reconstructs a rendition of the signal at the given LOQ only for a portion of the signal.

In an embodiment, a high resolution signal is stored according to a tiered based method. A decoder connected to a display device with relatively low display resolution requests to a signal processor a rendition of the signal, and receives a data stream consisting of encoded data allowing the decoder to reconstruct the signal up to a first level of quality, said first level of quality lower than the highest available level of quality for the signal. Responding to an input (e.g., a user interface input), the decoder requests to the signal processor a higher quality rendition of a specific spatial portion of the signal. The decoder receives a data stream consisting of encoded data allowing the decoder to reconstruct only a specific spatial portion ("tile") of the signal according to a second level of quality, wherein said second level of quality is higher than the first level of quality. In this way, the decoder implements efficient zoom functionalities, receiving and decoding substantially only the portions of the signal that are to be displayed (and hence minimizing consumed bandwidth and necessary processing power to decode the signal).

Additional Non-Limiting Example Embodiments

We want to stress again that the sequence of decoding operations illustrated for the example embodiment of FIG. 1E, as well as the specific operations that are used, must be intended as non-limiting. People skilled in the art will understand that all of the different example embodiments illustrated when describing non-limiting variations on the encoder embodiment directly correspond to variations on the decoder embodiment.

Lastly, non-limiting embodiments illustrated in FIG. 1E focused on the example case of video signals, but the same approaches are easily applicable to very different domains as well as to very different types of signals. In particular, methods illustrated herein are suitable for any type of multi-dimensional signals (including without limitation sound signals, multichannel sound signals, pictures, two-dimensional images, video signals, multi-view video signals, 3D video signals, plenoptic signals, multi-spectral signals, volumetric signals, volumetric video signals, medical imaging signals, signals with more than four dimensions, etc.).

For instance, a non-limiting embodiment encodes and decodes 3D video signals according to a tiered hierarchical method, wherein the encoder generates corresponding tiered hierarchies for the two video channels. Sets of descriptive information on motion for corresponding spans of the two video channels are also encoded according to support element data and residual data for corresponding spans of the two video channels are encoded according to a set of support element residual data (essentially applying the "support plane" method also across channels, motion compensating support element residual data across the two channels according to suitable descriptive information).

Another non-limiting embodiment encodes and decodes multichannel audio signals according to a tiered hierarchical method, wherein spans for each of the channels are represented as sets of elements (in a non-limiting embodiment, an average amplitude value and an average pitch value for the span), and residual data for corresponding spans of the different audio channels are encoded according to a set of support element residual data, "motion compensating" (i.e., applying operations essentially corresponding to realigning correlated spans) support element residual data across audio channels according to suitable descriptive information (hence accounting for different time positions of a same sound in different channels—essentially based on the 3D position of the sound source vs. the microphone).

Another non-limiting embodiment encodes and decodes vast volumetric data, applying the same methods that we illustrated for the time dimension of video signals (e.g., partition in lots, decoding wave, tiles of residual data, support planes, etc.) to one or more of the dimensions of the signal.

Another non-limiting embodiment encodes and decodes volumetric video, applying the same methods that we illustrated for sequences of two-dimensional spans to sequences of three-dimensional spans.

Other non-limiting embodiments apply methods described herein also to non-time-based signals. In a non-limiting example embodiment operating on non-time-based input signals, a sequence of two-dimensional slices (e.g., coming from a CAT-scan) are processed by the encoder, which reconstructs and encodes a volumetric hierarchical rendition of the signal.

The tiered hierarchy methods described so far are per se either lossless or lossy. Non-limiting example embodiments can be used in order to efficiently encode, transmit and decode digital signals. In other non-limiting embodiments, however, the objectives of the encoder are different from compression efficiency, and comprise without limitation multiscale decoding, adaptive streaming, signal processing objectives such as denoising, signal enhancement, artefact reduction, de-interlacing, resolution increase ("super-resolution"), measurement of quality of a rendition, content identification, machine vision, signal encryption (e.g., secure communications), etc. For instance, the joint space-time hierarchical approach is capable to separate from the core components of the signal most of the annoying artefacts coming from time-related phenomena ("transient information", including noise, film grain, actual transient information of a scene—which might be highly entropic but relatively unimportant to a human observer—, etc.). Also ringing artefacts and block artifacts can be identified and eliminated (or separated from the core signal) by means of non-limiting embodiments leveraging methods described herein. In a non-limiting embodiment, reconstructed Y at a suitable level of quality is further encoded with other methods, in specific configurations also along with suitable metadata (e.g., parameters statistical properties of transient information).

Figure 1F:
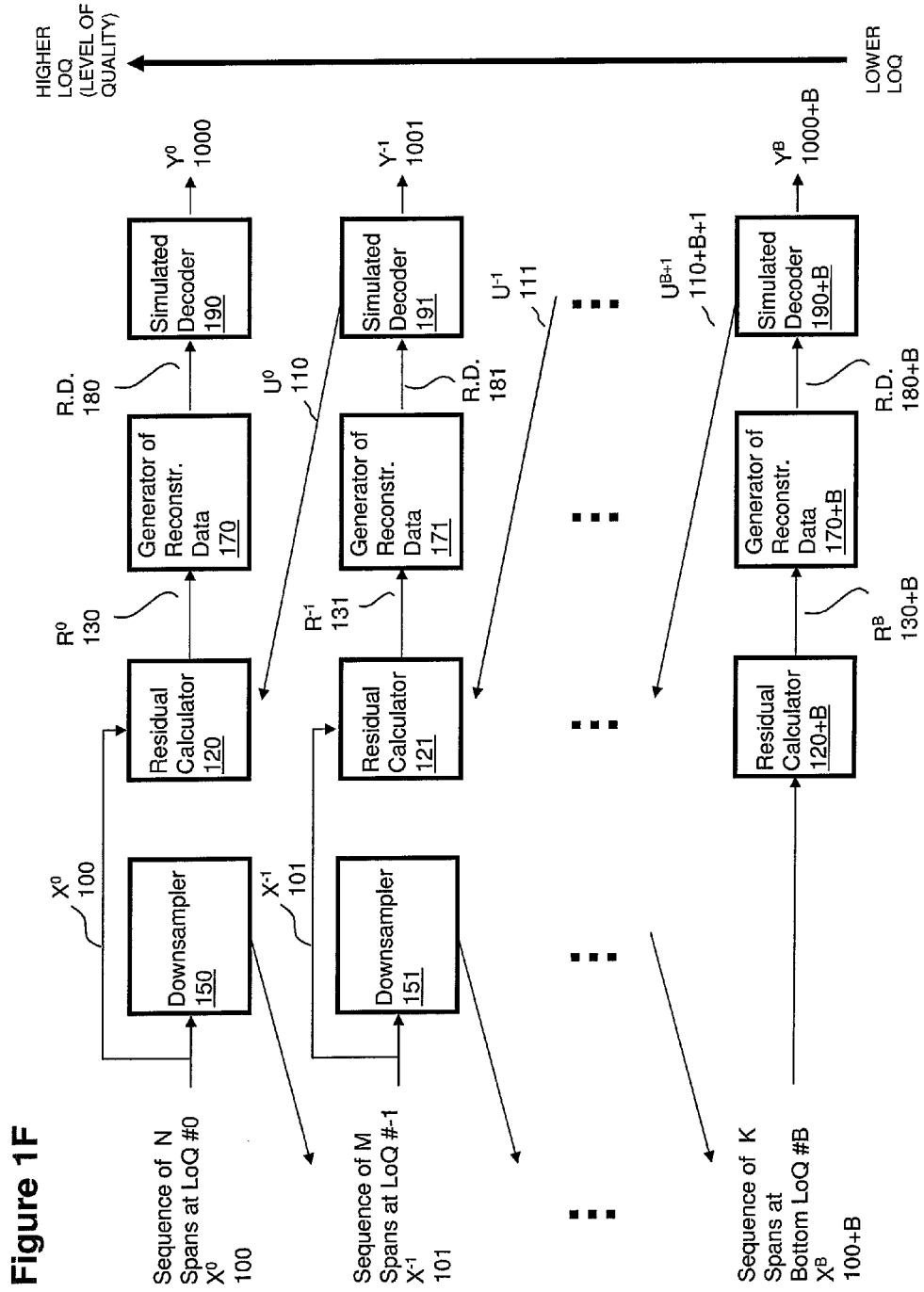
FIG. 1F is an example diagram illustrating the structure of an encoder.

FIG. 1F is an example diagram further illustrating the encoder embodiment described in FIG. 1E.

The signal processor implementing the encoder receives sequence 100 ($X^0$) of N spans at LOQ #0. In the particular example case of batch 1 of FIG. 1A, the encoder receives the sequence of 13 spans 100-1, 100-2, 100-3, . . . , 100-13.

The encoder also receives descriptive information on motion of objects across the spans of the signal (not illustrated in the figure in order to preserve readability; in this embodiment, said descriptive information on motion is received and processed by all of the blocks aside from the Residual Calculator blocks).

Downsampler 110-0 downsamples sequence 100, generating sequence 101 ($X^{-1}$) at LOQ #-1. Mathematically, again let's call $X_L^K(t)$ the span of LOQ K, lot L and sampling position t. In the non-limiting embodiment, each of the spans 101-$t$ is obtained by downsampling the combination of a plurality of corresponding spans of the higher level of quality. More specifically, spans of the higher level of quality are combined by performing a weighted average of their motion-compensated renditions, wherein motion compensation is performed based on (i.e., relatively to) the sampling position of the resulting span at the lower level of quality. For example:

$$X_1^{-1}(1) = \text{Down}(a \cdot \text{MC}(X_1^0(1)) + b \cdot \text{MC}(X_1^0(2)))$$

Such downsampling process is repeated by the encoder until span(s) 100+B of the bottom level of quality LOQ #B are generated.

Once the encoder has generated the rendition $X^B$ at the lowest LOQ #B, the encoder starts generating encoded data that can allow a decoder to reconstruct suitable renditions $Y_L^K(t)$ of the tiered hierarchy, wherein $Y_L^K(t)$ is the reconstructed rendition of each span $X_L^K(t)$.

While for the downsampling phase of the process the encoder could have operated by processing only the sequence of spans at LOQ #0 of a single lot (e.g., lot 1), for the "simulated decoding and reconstruction data calculation" phase the encoder requires all of the data that is necessary to generate predictions, and consequently also data belonging to the subsequent lot. Since in principle this could generate long encoding delays and/or computational complexity, the illustrated non-limiting embodiment limits the possibility of having predictors from neighboring lots only to the immediately subsequent lot. In this way, in order to successfully encode lot 1 of the signal, the encoder "only" needs to receive the original sequence of spans at LOQ #0 for lot 1 and lot 2.

For the one or more spans at the bottom level, and only for those ones, the encoder directly calculates residual via Residual Calculator 120+B assuming U=0, and generates Reconstruction Data 180+B.

The encoder then simulates the decoding operations that will be performed at the decoder side through Simulated Decoder 190+B, generating rendition 1000-B ($Y^B$). This is expressed mathematically as follows:

$$Y_L^{Bottom}(t) = h(Tr(X_L^{Bottom}(t))) = \hat{X}_L^{Bottom}(t)$$

where h( ) is the function that "inverts" (at least to the extent possible) the operations Tr( ) performed by the encoder on $X^B$ (e.g., by way of non-limiting example, decomposition transform followed by quantization). Based on the suitability of rendition $Y^B$ (according to a suitable quality metric) and on the information entropy of Reconstruction Data 180+B (according to a suitable information entropy metric), the encoder decides whether to proceed with the next level of quality or to iterate the generation of Reconstruction Data 180+B according to different operations and parameters.

For the spans of subsequent (higher) levels of quality in the hierarchy, for each span the encoder generates (through Simulated Decoders 190+B, . . . , 191, 190) predictions U. In particular, the Simulated Decoder blocks perform suitable upsampling operations, leveraging one or more spans of the lower level of quality as "predictors".

By simulating prediction operations, the encoder is subsequently able to generate the residual data that will be needed by the decoder in order to amend predictions and reconstruct a suitable rendition of the signal. For instance, by comparing rendition 101 ($X^{-1}$) with prediction 111 ($U^{-1}$), Residual Calculator 121 generates absolute residuals 131 ($R^{-1}$). Absolute residuals 131 are further processed by Generator of Reconstruction Data 171, calculating Residual Data 181. Simulated Decoder 181 processes Reconstruction Data 181, generating rendition 1001 ($Y^{-1}$). Again, based on suitability of rendition 1001 according to a quality metric and based on suitability of information entropy of Reconstruction Data 181 according to an information entropy metric, the decoder decides whether to proceed with the next (higher) level of quality, calculating predictions 110 ($U^0$), or to iterate the generation of Reconstruction Data 181 according to different operations and parameters.

When all of the reconstruction data has been generated, the encoder proceeds with the entropy encoding step, generating sets of encoded data and suitable metadata (e.g., headers, synch markers, etc.).

FIG. 1G is an example diagram further illustrating the decoder embodiment described in FIG. 1E.

The signal processor configured as a decoder receives reconstruction data and descriptive information allowing reconstructing a set of spans 1000 at the highest level of quality. Again, in order to facilitate readability, the figure does not explicitly show the received descriptive information on motion, which in this non-limiting embodiment is received and processed by all blocks aside from the Reconstructor blocks 1090, 1091, . . . , 1090+B.

Starting from the bottom level of quality and proceeding LOQ by LOQ, the decoder performs the same operations that were simulated by the encoder in order to generate reconstruction data. In particular, the decoder processes Reconstruction Data 180+B (i.e., the Reconstruction Data for the bottom level) through Residual Decoder 1020+B, generating estimated residuals 1030+B. Said estimated residuals 1030+B are combined with default prediction 110+B ($U^B$=0), generating one or more spans 1000+B ($Y^B$) at the bottom level of quality. Rendition 1000+B ($Y^B$) is then processed by Calculator of prediction 1010+B, generating prediction 110+B+1 ($U^{B+1}$). The decoder then proceeds—LOQ by LOQ, up to the spans of the topmost level of quality that can be reconstructed based on available data—in the process of generating predicted spans of a higher LOQ, decoding reconstruction data so as to generate renditions of absolute residuals and combining predicted spans and corresponding absolute residuals, thus reconstructing renditions Y at the higher level of quality.

In other non-limiting embodiments, in order to cope with specific circumstances (e.g., decoding latency, available decoding memory, etc.), the decoder, instead of performing the reconstruction process LOQ by LOQ, reconstructs a given span of a higher level of quality as soon as it receives the necessary encoded data and as soon as it finishes reconstructing the spans of the lower level of quality that are necessary to generate the prediction for the given span. In this way, instead of proceeding "tier by tier", the reconstruction process keeps moving up and down across the various levels of quality.

In a non-limiting embodiment, Residual Decoders 1020+B, 1021, 1020 generate estimated absolute residuals 1030+B, ..., 1031, 1030 by also decoding suitable support information for residuals ("support planes"), wherein a same support plane is leveraged to generate absolute residuals for a plurality of spans of a given LOQ. In other non-limiting embodiments, absolute residuals are calculated by also applying inverse decomposition transforms (e.g., comprising without limitation inverse directional decomposition and/or inverse temporal decomposition).

In other non-limiting embodiments, the decoder dequantizes residuals according to quantization schemes that are specific to each set of residuals, based at least in part on received descriptive information corresponding to the dequantization methods that must be used. In a non-limiting embodiment, available quantization schemes comprise without limitation schemes with different dead zones and constant quantization step (for which the encoder specifies parameters corresponding to the dead zone and/or the length of the quantization step), schemes with different dead zones and variable quantization steps (for which the encoder specifies parameters corresponding to the dead zone and/or a function that allows to calculate all the quantization steps), schemes with quantization in different color spaces (e.g., by way of non-limiting example, non-linear spaces such as gamma space), In other non-limiting embodiments, dequantization of residuals for specific levels of quality (e.g., topmost level of quality) also comprises statistical reconstruction methods (e.g., dithering, statistical dequantization, reconstruction and combination of a transient layer, etc.), so as to better represent that original residuals before quantization were distributed along the quantization ranges.

In a non-limiting embodiment, the decoder receives descriptive information corresponding to the structure of the hierarchy (e.g., characteristics of each span of each LOQ, etc.), allowing it to calculate what spans can be generated given the available reconstruction data.

In a non-limiting embodiment, Calculators of Prediction 1010+B, ..., 1011, and 1010 select predictor spans for a given span and apply upsampling operations according to default parameters known to both encoder and decoder. In a non-limiting embodiment, default upsampling operations include without limitation linear filtering up to a given LOQ and cubic filtering for the topmost LOQs. In another non-limiting embodiment, the decoder receives descriptive information corresponding to operations and parameters to use during upsampling operations (e.g., without limitations, upsampling kernels, parameters for image processing operations, etc.).

Figure 1H:
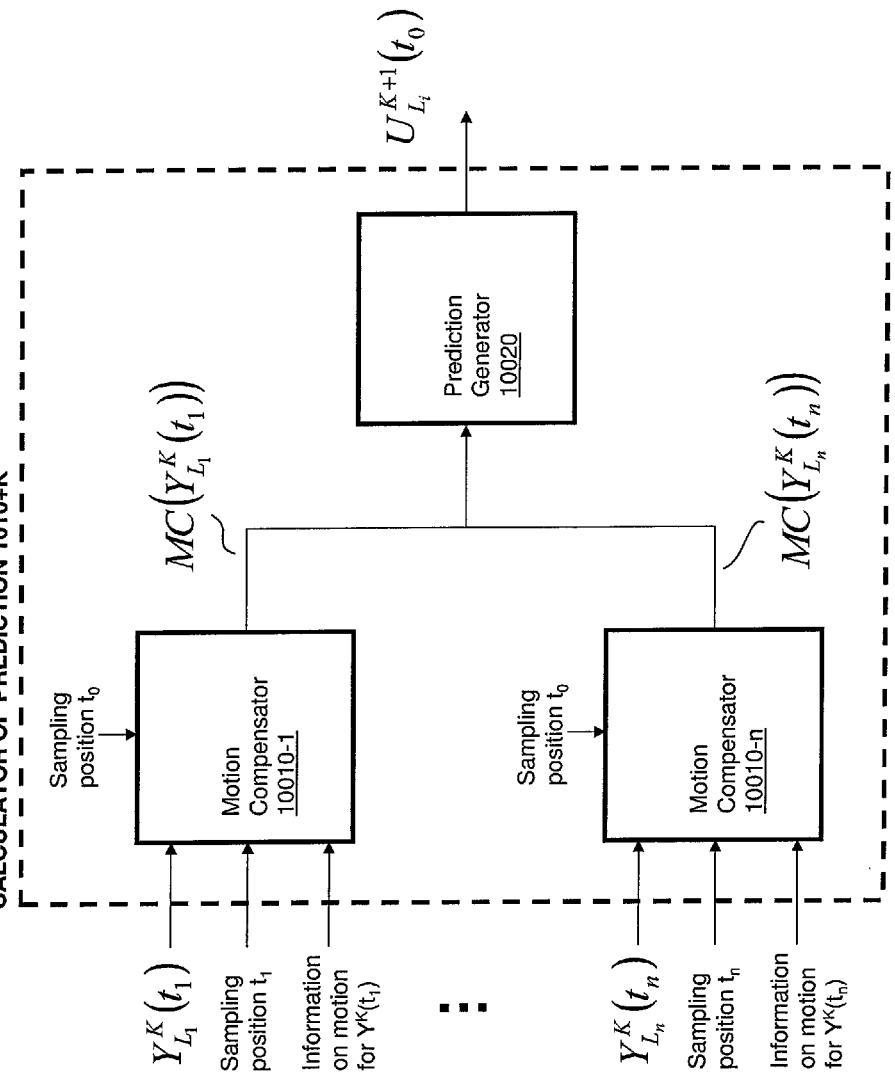
FIG. 1H is an example diagram illustrating in more details the structure of an encoder.

FIG. 1H is an example diagram further illustrating a non-limiting embodiment of prediction calculation method. Calculator of Prediction 1010+K receives renditions of predictor spans $Y^K(t_1)$, ..., $Y^K(t_n)$, belonging to lots $L_1, \ldots, L_n$. Calculator of Prediction 1010+K also receives information on motion for each predictor span, as well as their sampling positions.

Motion Compensators 10010-1, ..., 10010-n generate a set of motion compensated renditions $MC(Y^K)$, by performing motion compensation operations with respect to sampling position $t_0$. Finally, Prediction Generator 10020 combines motion compensated renditions of predictor spans, generating an upsampled prediction $U^{K+1}(t_0)$ at a higher level of quality.

In other non-limiting embodiments, upsampling operations are performed jointly with motion compensation operations, so that Prediction Generator 10020 combines upsampled motion compensated renditions at level of quality K+1. In yet other non-limiting embodiments, renditions of predictor spans $Y^K(t_1), \ldots, Y^K(t_n)$ are upsampled along spatial dimensions before being motion compensated.

FIGS. 2A, 2B, 2C and 2D are example diagrams illustrating different non-limiting embodiments implementing the combination (i.e., according to what illustrated in FIGS. 1B, 1C and 1D, either aggregation or downblending) of two bidimensional planes of elements. For simplicity, all of the four figures visually illustrate just downsampling in the time domain, while in fact they show downblending of two spans 100-1 and 100-2 of a higher LOQ into a single span of a lower LOQ. The same considerations illustrated for downblending, however, are also valid for aggregation within a same LOQ.

The four Figures, focusing on the example case of downblending span 100-1 and 100-2 so as to generate a downsampled span of LOQ #-1 (e.g., 101-1), also illustrate the effects of applying different motion compensation approaches (and in particular, also the novel methods that, for lack of literature, we defined as "non-symmetric balanced motion compensation"). Mathematically, all of the three example embodiments apply the following formula, although with different motion compensation operations:

$$X_1^{-1}(t) = \text{Down}(0.5 \cdot MC(X_1^0(1)) + 0.5 \cdot MC(X_1^0(2)))$$

Motion compensation operations are performed relatively to the sampling position of the downblended span. If descriptive information on motion is encoded in a suitable format (e.g., our novel methods of floating point motion compensation with motion zones and motion matrixes), motion compensation operations relatively to different sampling positions can be expressed and calculated in a very efficient way.

In a set of non-limiting embodiments described herein, for portions of the signal that are assigned descriptive information on motion, motion is estimated with a plurality of parameters and is calculated as "balanced motion" (or "bidirectional motion"): essentially, instead of specifying movements from one span with respect to another, it specifies the motion from both spans with respect to a common reference position, in order to enable bidirectional decoding. Some of such embodiments represent motion by using one or more motion matrixes (e.g., as opposed to the conventional methods of using motion vectors indicating only translation movements, i.e., offsets). The use of motion matrixes (i.e., encoding more than two parameters in order to represent a specific motion) is a novel and key characteristic of such non-limiting methods, enabling estimation and compensation of more sophisticated movements like zoom, rotations, perspective changes, etc. A motion matrix is at times collapsed into a simple offset vector in embodiments where a translation movement is considered sufficient (for example due to known sampling constraints or to complexity constraints). In other non-limiting embodiments, movement is represented by one or more motion matrixes corresponding to affine transforms, with motion compensated coordinates being calculated by using homogeneous coordinates methods. Each of the motion matrixes is assigned to a specific and arbitrarily defined portion of the signal, which we define as "motion zone". In other non-limiting embodiments, motion matrixes correspond to more generic perspective transformations, allowing describing even more complex sets of movements.

Motion matrixes (and, for embodiments that use them, motion zones) are transmitted to the decoder, and have several advantages: for instance, they can be reversed, and motion of a same motion zone across a number of sampling positions can be calculated by suitably combining (e.g., multiplying) the motion matrixes corresponding to each temporal step. Having said that, motion matrixes and motion zones are just one of many non-limiting embodiments of motion estimation and compensation, and methods described herein can suitably work with substantially any type of motion estimation and compensation method.

Figure 2A:
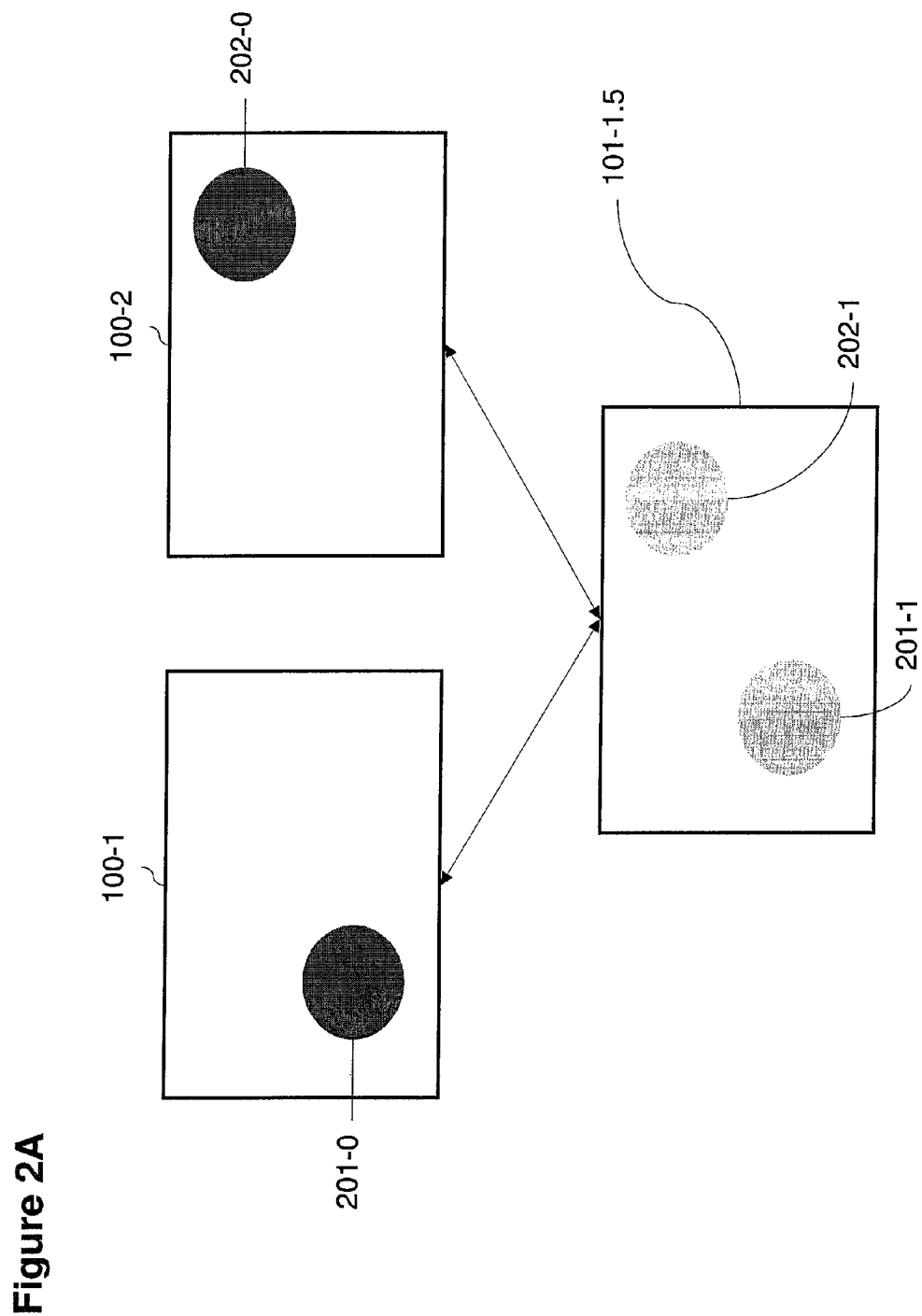

FIG. 2A illustrates the effect of applying no motion compensation (or, equivalently, motion compensating by means of a constant identity function), and consequently also of applying no "framing"

Span 100-1, sampled at t=1, and span 100-2, sampled at t=2, are merged into span 101-1.5, sampled at t=(1+2)/2=1.5. The fact that the sampling position of downblended span 101-1.5 is the average of the original sampling positions of the spans 100-1 and 100-2 is evident from the illustration. A solid circular object 201-0 is moving from the bottom left of the image (span 100-1, sampling position 1) to the top right of the image (object 202-0 of span 100-2, sampling position 2). A linear downsampling by a factor of 2 (e.g., a trilinear downblending) of spans 100-1 and 100-2 produces span 101-1.5, wherein horizontal and vertical dimensions are halved and the solid circular object appears as partially transparent and visible in both span positions: essentially, by looking at this span, an observer is looking at the entire motion of the object between sampling positions 1 and 2, essentially being positioned (from a temporal point of view) in between the two extremes. This simple three-dimensional (i.e., space-time) downsampling approach is used in a non-limiting embodiment wherein the speed of visible objects is below a predetermined threshold (i.e., temporal correlation is extremely high) and in conditions wherein a degree of motion blur in reconstructed renditions is acceptable. A non-limiting practical example is a video of a slow-moving scene shot at very high resolution and 1,000 frames per second.

In other embodiments, motion estimation and compensation is useful in order to perform N-dimensional downsampling.

When motion compensation is performed, spatial downsampling and temporal downsampling ("blending") can be performed either separately, or jointly, with several possible combinations. In a non-limiting example embodiment, spans are motion compensated and then three-dimensional downsampling is applied. In another non-limiting embodiment, spatial downsampling is performed, followed by motion compensation and lastly by temporal downsampling. In another non-limiting embodiment, spatial downsampling is combined with motion compensation, and followed by temporal downsampling.

Figure 2B:
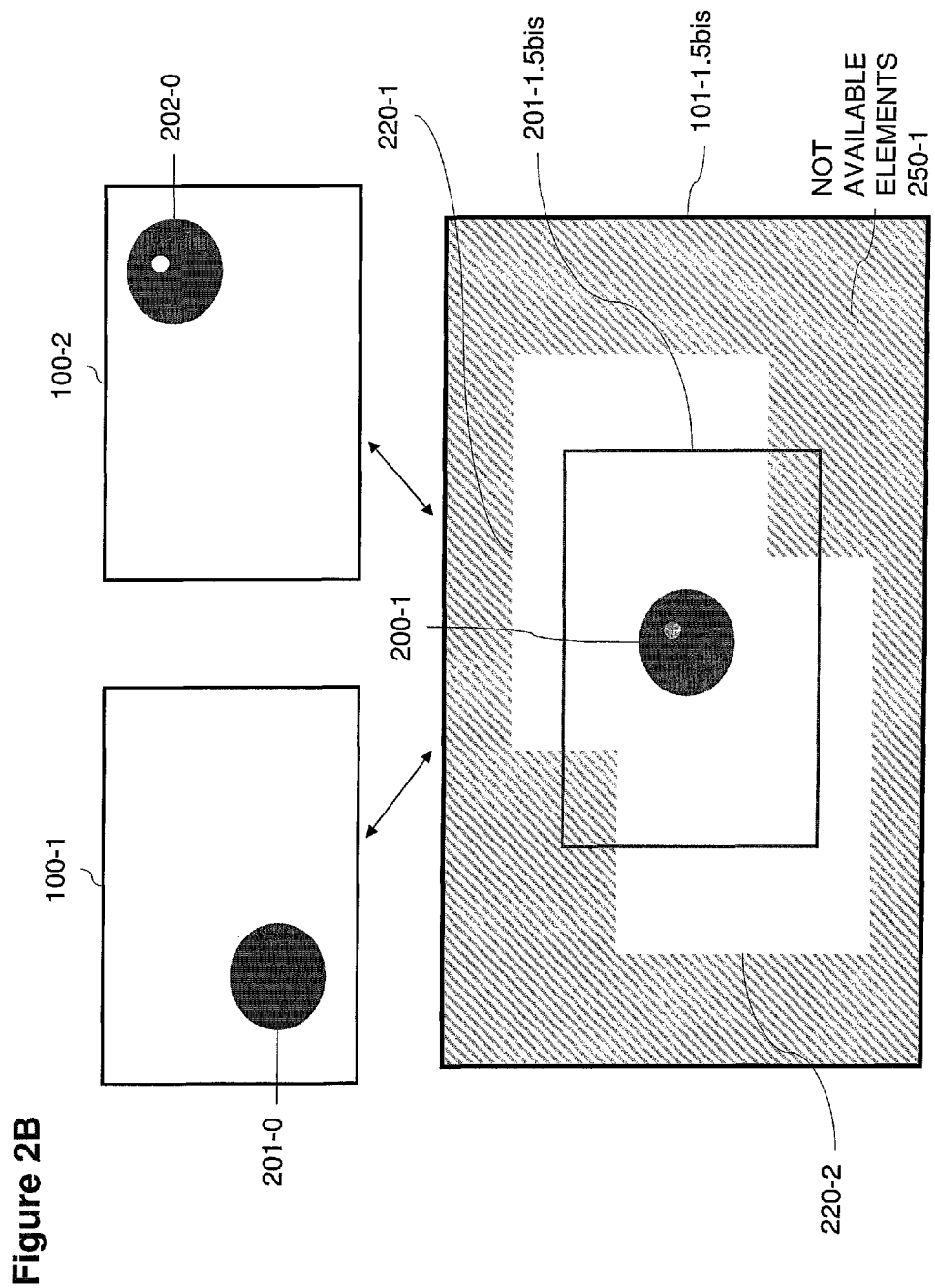

FIG. 2B is an example diagram illustrating a non-limiting example of balanced motion compensation.

A non-limiting example embodiment determines the motion of objects and estimates their positions at a span time intermediate with respect to the sampling positions of the two original spans. In order to maintain symmetry, motion compensation is performed in a balanced way, so as reposition the two spans in a highly correlated intermediate position (essentially corresponding to sampling a position which is in the middle position—i.e., sampling position 1.5—with respect to position 1 and position 2 of the two original spans) before "merging" them together with the temporal downsampling operation.

In this simple case, the object is moving with a simple translational motion (i.e., an offset). The descriptive information on movement for the object to be used in the two motion compensation operations is thus characterized by a single vector, since the other vector is calculated as the "complement vector".

The benefit of such balanced approach is to avoid any choice of a reference image and/or of a preferential direction for movements. Motion information structured in this way can be used to estimate the movement of the object in whichever time direction the playback is moving, essentially enabling bidirectional playback (a feature never offered so far by encoding techniques based on motion estimation and compensation).

In order to suitably perform motion compensation operations, a destination plane of elements 201-1.5bis is produced, corresponding to the image that would be sent to a display device if the downsampled span 101-1.5bis had to be displayed. At the same time, it is clear from FIG. 2B that span 101-1.5bis benefits from the allocation of a plane of elements larger than just the destination plane 201-1.5bis, in order to include also elements that, despite being outside of the destination plane, could be useful (in particular after additional and/or inverse motion compensation operations) in order to generate predictions for spans 100-1 and 100-2, as well as during additional downsampling operations.

Due to lack of literature, we created the new term "framing" to define the additional rows and columns of span 101-1.5bis with respect to destination plane 201-1.5bis.

Span 101-1.5bis is thus the combination of planes 220-1 (representing span 100-1 in its shifted position) and 220-2 (representing span 100-2 in its shifted position). As it is evident from FIG. 2B, span 101-1.5bis contains plane elements having very different levels of importance. Elements belonging to areas 220-1 and 220-2 are "valid" plane elements, containing relevant information. All the other elements (illustrated in the diagram by the areas with diagonal lines) are null elements, or "Not Available" elements (250-1). They are not transmitted to the decoder (in a compression-oriented embodiment), and the decoder knows precisely the position and the size of areas 220-1 and 220-2, with the same precision as motion information is known. In this example, "Not Available" elements are not to be averaged with elements that have a "valid" value. In all of the operations (either during downsampling or during upsampling) that involve a weighted average of a set of elements that include "Not Available" elements, "Not Available" elements are eliminated from the weighted average, and the weights for the remaining elements are normalized so as their sum is equal to 1 (in the illustrated non-limiting embodiment, this is achieved by adding a same constant to all of the remaining weights).

Elements that have a value but are outside of the destination plane 201-1.5bis would not be shown if the span had to be displayed, but are still useful: e.g., to support upsampling operations during the decoding process, as well as to support further downsampling operations during the encoding process.

In the non-limiting preferred embodiment, the amount of framing relatively to the size of the destination plane increases at every successively lower LOQ, corresponding to the fact that spans of a lower LOQ are the results of a higher number of motion-compensated spans (i.e., encompass a larger amount of time), and thus must allow for a higher degree of movement.

Figure 2C:
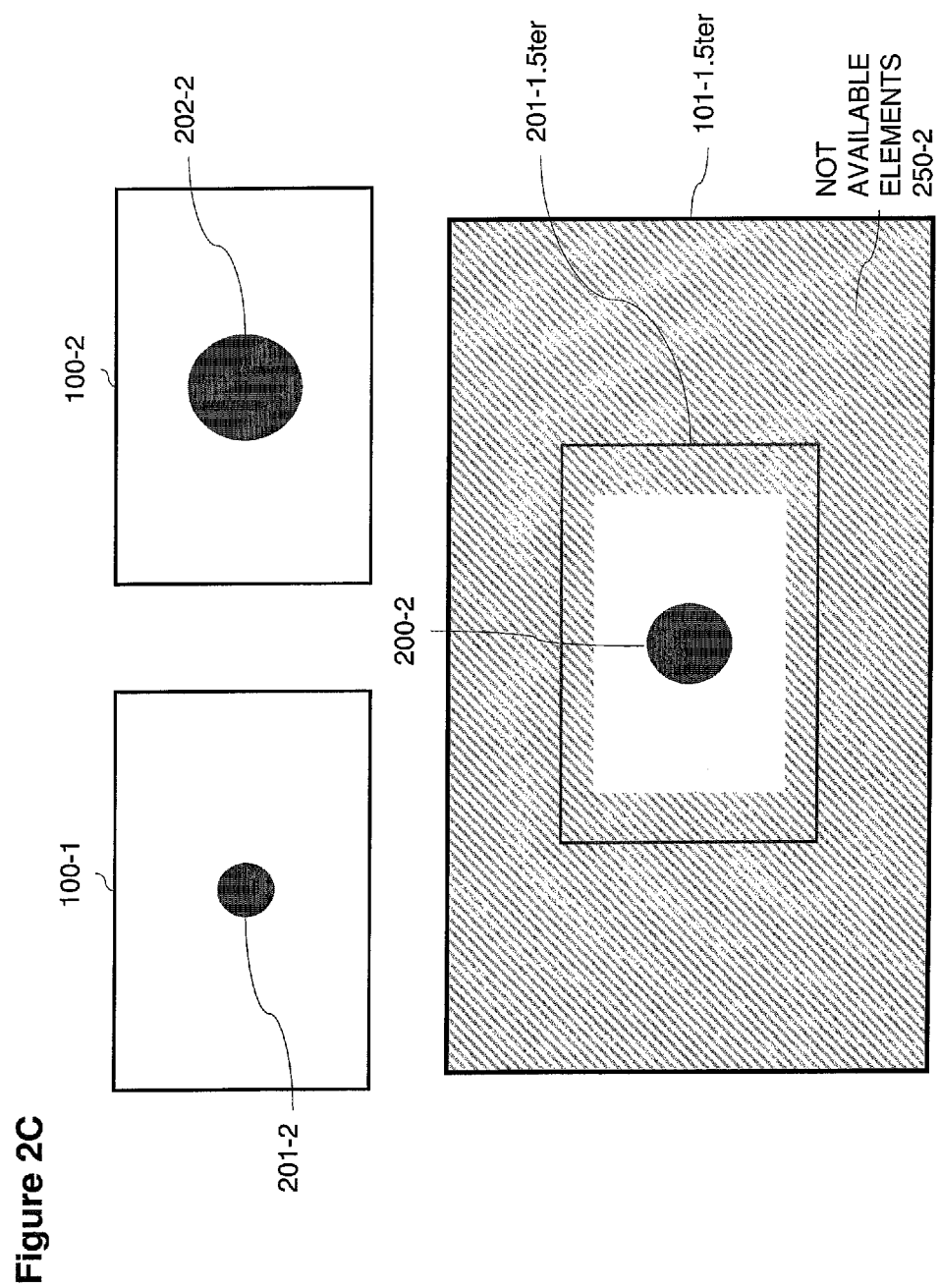

FIG. 2C illustrates one more example case of temporal downsampling with balanced motion compensation, this time introducing a more sophisticated type of movement (specifically, a scale transformation, i.e. a zoom). The previous case illustrated motion information including offset information (which is the information typically represented by state of the art motion estimation and compensation methods). Non-limiting embodiments illustrated herein leverage balanced motion estimation and compensation methods while at the same time representing also more sophisticated types of motion, including without limitation offsets, rotations, zoom/divergence, perspective changes, etc. In particular, the non-limiting embodiment illustrated herein represents movement with an affine (or "ZRO") motion matrix, identified by four ZRO parameters (one parameter for Zoom, one parameter for Rotation and two parameters for Offset).

Similarly to what we described in FIG. 2B, also in FIG. 2C the resulting downsampled span in centered at sampling position 1.5.

Both FIG. 2B and FIG. 2C, despite showing the benefits of balanced motion compensation, also show quite clearly the limits of centering downsampled spans at intermediate (i.e., potentially non integer) sampling positions. Although it is theoretically elegant to center a downsampled span in between its corresponding spans at the higher level of quality, fractional sampling positions generate problems whereby it becomes necessary to display the signal at a level of quality lower than the topmost LOQ. First of all, dynamically switching from the topmost level of quality (with its original sample rate) to a lower level of quality (with fractionary sample rates), would engender perceived "judders" and "stutters" in the motion of objects. Secondly, as it is evident from FIG. 2B and FIG. 2C, the destination plane of the resulting span (i.e., the image to display if the span had to be displayed) would be in an intermediate position between the two original spans, and consequently it would feature visible "Not Available" areas, very likely unpleasant to watch at least as much as the judders mentioned above. A non-limiting embodiment solves such problems by applying symmetric temporal downsampling only on groups with an odd number of spans (so that the intermediate sampling position is an integer sampling position, and the destination plane is centered on the intermediate span of said odd group of spans). Another non-limiting embodiment that solves such problems while still allowing to downsample even numbers of spans is illustrated by FIG. 2D.

FIG. 2D illustrates—for the same source signal as in FIG. 2B—a non-limiting example embodiment of "balanced non-symmetric motion compensation", achieving all of the benefits of balanced motion compensation without the above mentioned limitations of intermediate (symmetric) sampling positions.

Spans 100-1 and 100-2 are still motion compensated according to invertible motion transforms (in the specific non-limiting embodiment, suitable ZRO motion matrixes for each relevant motion zone), but this time with respect to a sampling position equal to 1, instead of 1.5. It is thus still true that motion compensation information for span 100-1 is directly computable from motion compensation information for span 100-2, or vice versa: motion compensation is indeed still "balanced", i.e., bidirectional.

At the same time, downsampled span 101-1 is characterized by a destination plane 201-1 that is essentially the same as span 100-1 (with the possible addition of some information coming from span 100-2 but positioned consistently with span 100-1). As a consequence, if span 101-1 had to be displayed, there would not be any "Not Available" areas, and also in terms of sample rate, despite a certain "blending" effect, there would not be perceived judders in the movements of objects.

Figure 3A:
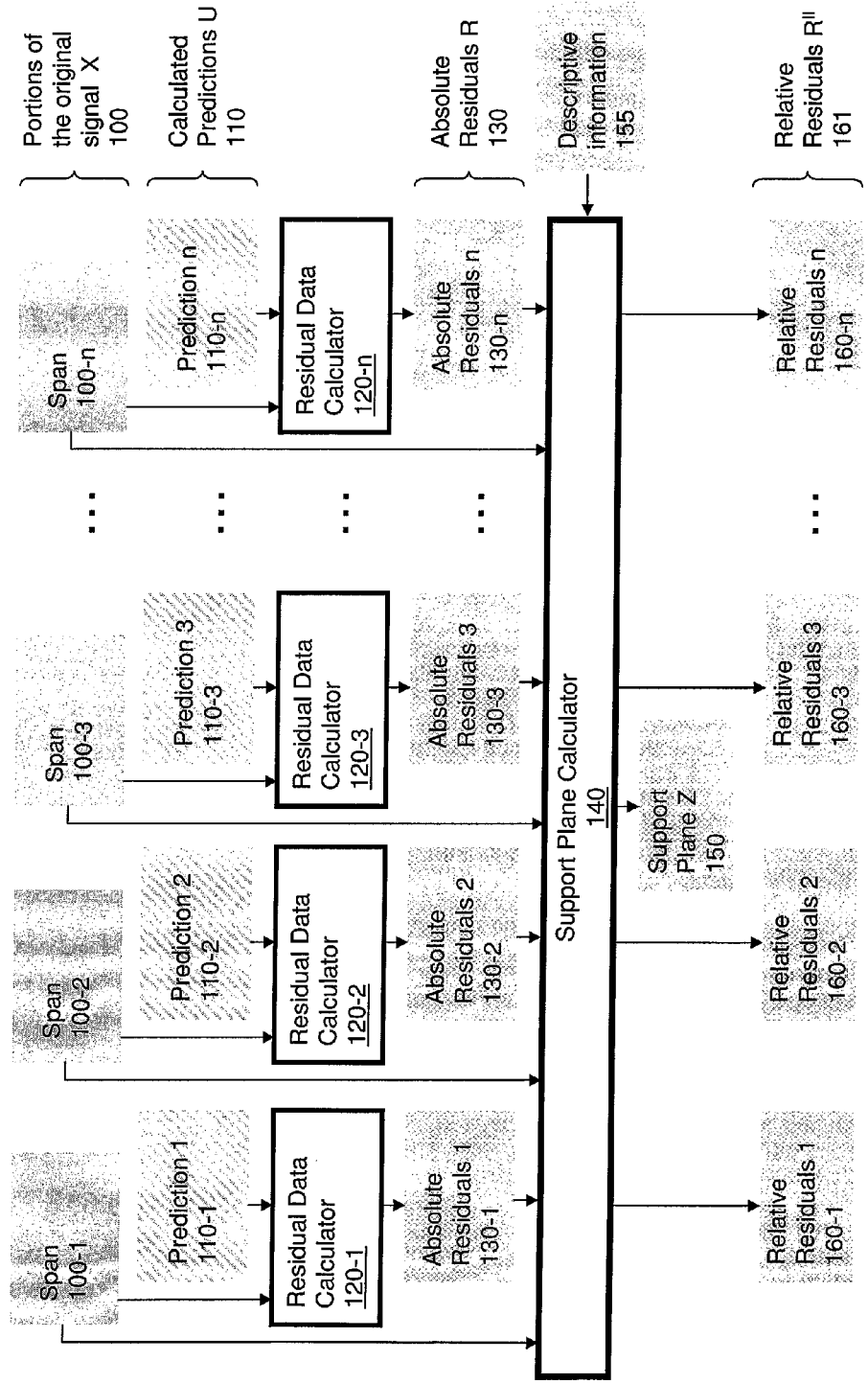
FIGS. 3A and 3B are example diagrams illustrating encoding based on support information.

FIG. 3A is an example diagram illustrating a non-limiting embodiment implementing multi-predictive encoding of residual data, with separation of time-correlated residual information into a "Support Plane" Z according to embodiments herein.

The diagram shows an original signal consisting of a sequence of spans 100-1, 100-2, . . . , 100-$n$ at a given level of quality. Through suitable methods, the encoder generates a corresponding sequence of predictions U 110-1, 110-2, . . . , 100-$n$ at the same level of quality. The encoder then calculates suitable sets of absolute residuals R 130-1, . . . , 130-$n$, by processing the results obtained by comparing each span 100-$t$ with its corresponding prediction U 110-$t$. For instance, Residual Data Calculator 120-1 receives as input span 100-1 and corresponding prediction U 110-1, generating absolute residuals R 130-1 based on the difference between span 100-1 and prediction U 110-1. In a similar way, the encoder generates sets of absolute residuals R 130-2, . . . , 130-$n$ corresponding to the remaining spans of the sequence.

Signal processor 140, also called Support Plane Calculator, is configured to process sets of absolute residuals R 130-1, . . . , 130-$n$ and generate a set of elements 150 called support plane Z, which summarizes, in this embodiment, time-correlated residual information.

In the non-limiting example embodiment illustrated in FIG. 3A, Support Plane Calculator 140 also receives Descriptive Information 155, comprising information on motion across the sequence of spans.

Generation of Support Plane Z 150 is performed by first computing a weighted average S of motion compensated renditions of each set of absolute residuals R 130-$t$, all motion compensation operations being calculated with respect to a same sampling position (i.e., in this non-limiting embodiment, the first integer sampling position lower or equal to the average of all sampling positions of the spans of the sequence). The formula to calculate S is expressed by the following equation:

$$S = \sum_{i=1}^{n} w_i \cdot MC(R(i))$$

In a simple non-limiting embodiment, all weights are equal to 1/n (i.e., simple mathematical average). In another non-limiting embodiment, S is calculated as the statistical mode of MC(R(i)), so as to reduce the influence of "outlier residuals" on the weighted average.

In order to allow for a suitable weighted average across several different sampling positions (i.e., minimizing loss of information), motion compensation operations generate motion-compensated sets of elements with more rows and columns than the input sets of residuals ("framing"). In addition, motion compensation operations assign a default value (e.g., "Not Available" value) to elements of the motion-compensated sets of elements that, based on input (e.g., a specific set of absolute residuals R) and on motion information, cannot be assigned any suitable value.

Elements with the default value are not considered in the corresponding weighted average operation used to calculate S, and weights of the remaining elements are normalized so as to make their sum equal to 1. In the non-limiting reference embodiment, this normalization to 1 is achieved by summing a same constant to all of the weights of the remaining elements. In other embodiments, such normalization is achieved by multiplying all weights for a same constant.

The encoder then generates the reconstruction data that will be sent to the decoder in order to allow the reconstruction of the support element, and simulates the decoding of said reconstruction data, reconstructing a rendition of Support Plane Z 150:

$$Z=\text{Dec}(\text{Enc}(S))=\hat{S}$$

The encoder then calculates sets of Relative Residuals $R^H$ (i.e., sets of elements 160-1, . . . , 160-$n$), by calculating for each given set the difference between the corresponding set of absolute residuals R and a motion-compensated rendition of support element Z ("reference residuals") with respect to the sampling position of said given set:

$$R^H=R-\text{MC}(Z)$$

Lastly, the encoder generates sets of reconstruction data corresponding to sets of Relative Residuals $R^H$ and simulates the operations performed by a decoder in order to reconstruct a rendition Y of the sequence of spans. In particular, for each given span X(t) 100-$t$, the encoder generates a reconstructed rendition Y(t) by combining prediction U(t) 110-$t$, a motion-compensated rendition of Support Plane Z 150 with respect to sampling position t and the corresponding set of decoded Relative Residuals $R^H$(t) 160-$t$:

$$Y=U+\text{MC}(Z)+\text{Dec}(\text{Enc}(R^H))=U+\text{MC}(Z)+\hat{R}^H=U+\hat{R}$$

For instance, in order to simulate the reconstruction of a rendition Y(1) for span 100-1, the encoder combines Prediction U 110-1, Relative Residuals $R^H$ 160-1 and a motion-compensated rendition of Support Plane Z 150 calculated relatively to sampling position t=1. At the decoder side, a decoder will perform those same operations, receiving encoded data allowing to generate Prediction U 110-1, encoded data corresponding to motion information, encoded data corresponding to Support Plane Z 150 and encoded data corresponding to Relative Residuals $R^H$ 160-1.

We call the set of elements Z 150 a "Support Plane" for a given sequence of spans at a given level of quality because it "supports" the reconstruction of absolute residuals R. Essentially, it also supports the reduction of information entropy (e.g., of the encoded amount in bits) of reconstruction data necessary to reconstruct said sequence, by exploiting the time correlation of absolute residuals. By concentrating time-correlated absolute residual data in a single "superset of residuals" (i.e., intuitively, by avoiding to repeat a same residual information multiple times for subsequent spans, while at the same time avoiding to predict each plane of residuals from a previous one), the support plane maximizes the number of relative residuals that after quantization are substantially equal to zero, consequently reducing a metric corresponding to the overall information entropy of residual data.

We also defined the approach as "multipredictive encoding" method, because the reconstructed rendition for a given span is obtained by combining relative residuals with two predictions: a prediction for the span (the first prediction, which is generated with any suitable method) and a prediction for absolute residuals (the second prediction, which is generated by motion-compensating the support plane).

As explained above, conventional methods (e.g. in the case of video signals, MPEG-based technologies, VP8, etc.) that exploit time correlation by encoding/decoding the differences vs. a precedent or subsequent sample (hence generating a "temporal cascade" of samples encoded with respect to one another, with accumulation of errors over time and essentially mono-directional reconstruction/playback). The methods described herein of "temporal downsampling" and "temporal aggregation"—including without limitation all of the methods illustrated so far—consist of encoding/decoding temporally blended information (subsampled in the case of tiered temporal hierarchies, at the same resolution or even at higher resolutions in the case of support planes) that serve as common predictors and substantially summarize correlated information of a plurality of spans, allowing (1) to leverage time correlation across longer sequences of spans (due to absence of accumulation of errors), (2) to perform bidirectional reconstruction/playback and (3) to perform also random access reconstruction of any span in a sequence. As a non-limiting example, a decision to heavily quantize the relative residuals that allow to reconstruct a given span (i.e., a decision that creates significant loss of information and/or artefacts in one span) has no impact on the other spans at the same LOQ that are reconstructed based on a same support plane and on a same set of predictors at a lower LOQ. Also, decoding can be performed in reverse temporal order (e.g., smooth reverse playing of a video, as opposed to current methods of just skipping from an I-frame to a previous I-frame), since reconstruction of any one span does not require the availability of a reconstructed rendition of a previous span in the temporal order.

Additional Non-Limiting Example Embodiments

The example of support plane calculation illustrated in FIG. 3 should be intended as non-limiting.

In other non-limiting embodiments, the encoder calculates the Support Plane Z 150 by adapting weights of the weighted average so as to minimize a metric of information entropy for Relative Residuals $R^H$ 160 and Support Plane Z 150. In one of such embodiment, the encoder selects the weights of the weighted average used to generate Support Plane Z 150 so as to maximize the number of Relative Residuals $R^H$ 160 that are substantially equal to zero (especially after a suitable quantization process). In another of such embodiments, the encoder adjusts the values of Support Plane Z 150 according to an iterative optimization method, so as to minimize a metric of information entropy for Relative Residuals $R^H$ 160 and Support Plane Z 150, while maintaining a metric of quality for rendition Y above a threshold.

In other non-limiting embodiments, the encoder processes sets of absolute residuals R 130 before calculating Support Plane Z 150. In one of such embodiment, absolute residuals R 130 corresponding to different spans are suitably equalized, so as to enhance time correlation of residual data in cases such as a change of lighting conditions in a substantially same scene. The encoder also generates suitable sets of descriptive information, in order to provide a decoder with appropriate information for proper processing of the Support Plane Z 150 before combining it with the corresponding set of Relative Residuals $R^H$ 160.

In other non-limiting embodiments, absolute residuals R 130 are processed by means of suitable transforms (e.g., selected from a list including without limitation decomposition transforms, Hadamard transforms, DCT transforms, wavelet transforms, etc.).

In other non-limiting embodiments, both the Support Plane Z and Relative Residuals $R^H$ are transformed by means of suitable operations, selected from a list that includes without limitation directional decomposition (e.g., selecting subsets of elements and encoding parameters corresponding to their directional tilts and to a difference between their average and a predicted average), temporal decomposition (e.g., selecting subsets of elements along time and encoding their temporal average and temporal tilt(s)), non-linear quantization schemes, Hadamard transforms, DCT transforms, FFT transforms, wavelet transforms, etc. In some of these non-limiting embodiments, transformed residuals for a span are encoded and decoded based at least in part on a rendition of the span at a lower level of quality, based on multiscale transform methods described in other patent applications of the same authors.

In other non-limiting embodiments, Support Plane Calculator 140 calculates Support Plane Z 150 by processing a weighted average of the original spans 100-1, . . . , 100-n (suitably motion compensated), instead of a weighted average of the motion-compensated renditions of the corresponding sets of residuals 130-1, . . . , 130-n. The method is substantially similar, although by computing the Support Plane Z 150 based on original spans, the support plane comprises different information, hence producing different results. In one of such embodiments, the following mathematical formulas describe the operations performed at the encoder and the reconstruction process performed at the decoder:

$$S = \sum_{i=1}^{n} w_i \cdot MC(X(i))$$

$$Z = Dec(Enc(S)) = \hat{S}$$

$$R^{II} = R - (MC(Z) - U)$$

$$Y = MC(Z) + Dec(Enc(R^{II})) = MC(Z) + \hat{R}^{II} = U + \hat{R}$$

In other non-limiting embodiments, Support Plane Z 150 has a higher level of quality (e.g., a higher resolution) than the sets of absolute residuals R 130-1, . . . , 130-n that it supports. Since in such embodiments Support Plane Z 150 results from motion compensated renditions of multiple spans representing substantially the same objects in different positions (including sub-pixel positions, in the case of pictures), by increasing the level of quality of Support Plane Z 150, the encoder allows Support Plane Z 150 to store common residual information with sub-element precision, essentially maximizing an amount of time correlated information stored in Support Plane Z 150.

In other non-limiting embodiments, the encoder defines for each span 100-1, 100-2, . . . , 100-n suitable portions (e.g., areas of the image) where Support Plane Z 150 is not processed in order to generate absolute residuals R 130. In one of such embodiments, the encoder identifies for one or more given spans portions of the image where residual information is not correlated with residual information of other neighboring spans (e.g., in the example case of a video signal, because for instance those portions correspond to objects that were visible only for the time duration of said given span). Consequently, the encoder generates descriptive information corresponding to said portions of the span. When generating Support Plane Z 150, the contents of said portions are not processed, so as to avoid "diluting" support element information with non-time-correlated information. At the same time, when reconstructing sets of absolute residuals R 130-1, . . . , 130-n, subsets of Relative Residuals $R^H$ 160-1, . . . , 160-n corresponding to said portions will directly be processed to generate absolute residuals R 130, without first being combined with the corresponding elements of a motion-compensated rendition of Support Plane Z 150. At a decoder side (or within a simulated decoder during the encoding process), a decoder will receive for a given span 100-1 descriptive information on portions where Support Plane Z 150 should not be leveraged in order to support the reconstruction of absolute residuals R 130. As a consequence, the decoder will reconstruct absolute residuals R 130 according to two different approaches:

for portions where Support Plane Z 150 must be applied:

$$\hat{R} = MC(Z) + Dec(Enc(R^H)) = MC(Z)\hat{R}^H;$$

for said portions where Support Plane Z 150 must not be applied:

$$\hat{R} = Dec(Enc(R^H)) = \hat{R}^H.$$

In other non-limiting embodiments, the sequence of spans 100-1, 100-2, . . . , 100-n is partitioned into a plurality of subsequences ("lots") and the encoder generates a Support Plane Z for each of said lots. Absolute residuals for spans of a given lot are reconstructed by a decoder (or by a simulated decoder within the encoding process) based at least in part on the information contained in the Support Plane Z of said given lot. In particular, a given set of absolute residuals for a given span of a given lot is generated by combining a set of Relative Residuals with a motion-compensated rendition of the Support Plane Z of said given lot (wherein motion compensation is performed with reference to the sampling position of said given span).

In other non-limiting embodiments, absolute residuals R for spans of a given lot L1 are reconstructed by a decoder based at least in part on a plurality of Support Planes $Z_{L1}, \ldots, Z_{Ln}$, including support plane $Z_{L1}$ for said given lot and support plane $Z_{Ln}$ for one or more neighboring lots. In one of such embodiments, a given set of absolute residuals R for a given span of a given lot is generated by combining a set of Relative Residuals $R^H$ with a weighted average of the motion-compensated rendition of the support plane Z of said given lot and the motion-compensated rendition of the support plane Z of a neighboring lot, wherein both motion compensation operations are performed relatively to the sampling position of said given span. In other embodiments, even more than two support planes Z support the reconstruction of specific sets of absolute residuals R. Leveraging support planes Z of neighboring lots—despite potentially increasing encoding delay since the encoder requires processing multiple lots before being able to finalize encoded data for a lot—allows such embodiments to reduce potential abrupt discontinuities between spans belonging to different lots.

In other non-limiting embodiments, absolute residuals R for spans of a given lot L1 are reconstructed by a decoder based on the Support Plane $Z_{L1}$ of said given lot, and a plurality of Support Planes $Z_{L1}, \ldots, Z_{Ln}$, of two or more neighboring lots are encoded based on a Support Plane $Z^H$ at a yet higher level of aggregation. Each given Support Planes $Z_{L1}, \ldots, Z_{Ln}$ is reconstructed by combining a motion-compensated rendition of Support Plane $Z^H$ (wherein motion compensation is performed with reference to the sampling position of each given Support Plane) with a corresponding set of relative residuals. In some of such non-limiting embodiments, the encoder generates a tiered hierarchy of level of aggregations for Support Planes, wherein also higher-order support planes are encoded based on additional higher-order support planes at a yet higher level of aggregation. In a non-limiting embodiment, lot size is equal to two spans, and the encoder aggregates support planes up to a given level of aggregation based on computational resources available and on maximum encoding delay.

In other non-limiting embodiments, Support Plane Z 150 is generated without performing motion compensation operations. Consequently, at a decoder absolute residuals R 130 are generated by just combining Relative Residuals $R^H$ 160 with Support Plane Z 150.

In other non-limiting embodiments, Support Plane Calculator 140—aside from generating Support Plane Z 150 and sets of Relative Residuals $R^H$ 160-1, ..., 160-n—also generates sets of descriptive information (i.e., meta-data) corresponding to one or more of the sets of Relative Residuals $R^H$. During reconstruction operations for a given set of absolute residuals R, a decoder (or a simulated decoder within the encoding process) processes Support Plane Z 150 and the corresponding set of Relative Residuals $R^H$ according to operations specified by a corresponding set of descriptive information. In one of such embodiments, said descriptive information include without limitation multiplicative parameters to apply to motion-compensated support element information (so as, for instance, to easily account for changes of lighting in a substantially same scene).

In a non-limiting embodiment, a multipredictive encoding method leveraging Support Planes Z is leveraged to directly encode a sequence of images, i.e. assuming predictions U all equal to zero.

In other non-limiting embodiments, a multipredictive encoding method is used in the context of a signal encoded with a tiered temporal hierarchy method. In one of such embodiments, the encoder generates a support element $Z_L^K$ for the spans of each LOQ K of each lot L of a signal; support planes of different lots of a same LOQ K are encoded in a tiered hierarchy of levels of aggregation of support planes. In such embodiment, at each level of quality the supporting plane $Z_L^K$ conveys the time-correlated information of the lot in a single set of elements (i.e., in a single two-dimensional plane for each lot). Spans of a given LOQ K are reconstructed based on suitable predictor spans of a lower LOQ (K−1) (upsampled in either space or time or both by leveraging suitable operations and scale factors), on the support plane $Z_L^K$ for LOQ K, on descriptive information on motion and on suitable sets of Relative Residual data $R^H$. The support plane essentially conveys the time correlated information of residual data of a given lot in a single set of elements, allowing a decoder to generate suitable predictions for the absolute residual data allowing reconstructing the spans of a given LOQ. Correlation of absolute residuals across lots is effectively leveraged by encoding support planes of neighboring lots in a tiered hierarchy of levels of aggregation.

To better clarify with a simple non-limiting example the advantage in computing and transmitting a support plane for residual data, it is sufficient to consider the case of a lot of spans that represents a video clip of a still image (i.e., all spans are identical). At any Level of Quality, the support plane fully conveys the information that is necessary to reconstruct all of the spans of the lot. No further relative residuals would be needed to be transmitted in order to decode and reconstruct all of the spans (i.e., 100% of relative residuals would be equal to zero, which suitable entropy encoders can encode with very limited amounts of information). It is of course an extreme example case, but it is easy to understand the benefits of encoding/decoding absolute residuals based on support element information when the lot is belonging to a slow motion scene, or when large portions of a scene are static, or when motion compensation information can recreate for motion-compensated absolute residuals a level of correlation akin to a slow motion/static scene.

In some non-limiting embodiments, a decoder is configured to receive relative residual data corresponding to only specific spatial portions of a signal (e.g., "tiles"), thus reconstructing a rendition of the signal at the given LOQ only for said given portions, effectively implementing a zoom functionality. In other words, in such non-limiting embodiments the decoder receives reconstruction data corresponding only to specific spatial portions ("tiles") of the reconstructed sets of absolute residuals that would be necessary to reconstruct the whole signal at the given LOQ. Consequently, the decoder reconstructs only a sequence of portions of the sets of absolute residuals, performing operations that comprise the following: processing a first set of reconstruction data, generating a support plane; processing a second set of reconstruction data, producing a sequence of relative residual sub-planes (e.g., such as tiles of relative residuals), each of said relative residual sub-planes corresponding to a tile of a plane of absolute residuals in the sequence of planes of absolute residuals; combining each of said relative residual sub-planes with a corresponding set of reference values generated based at least in part on said support plane, producing a sequence of tiles of absolute residuals.

In another non-limiting embodiment, a decoder (and the simulated decoder within an encoder)—instead of generating absolute residuals for the spans of a given LOQ based on a single support plane—generates absolute residuals based on a weighted average of motion-compensated renditions of neighbouring support planes (i.e., support planes of neighbouring lots).

In other non-limiting embodiments, one or more support planes Z are encoded/decoded for specific portions of a tiered hierarchy (e.g., for a subsequence of spans smaller than the corresponding lot at the corresponding level of quality).

In a non-limiting embodiment, support planes are generated by the encoder according to the specific characteristic of the signal and to compression requirements (by means of non-limiting example, it is up to the encoder to skip support plane computation when time-related characteristics of the signal are such that the transmission of a support plane would not bring benefits).

In a non-limiting embodiment, also the tiered hierarchy of support planes $Z_L^K$ of a given lot L is encoded according to a tiered hierarchical method. In such embodiment, for all of the levels of quality in which a given lot consists of a single span, support plane Z coincides with absolute residuals R for that span. Support plane Z is encoded according to a two-dimensional tiered hierarchy, based on a rendition of the support plane at a lower level of quality. At the bottom level, assuming that the embodiment applies a quantization function Q(•) to residual data, support plane Z is simply the dequantized rendition of the quantization of S, or mathematically:

$$Z_L^B = DQ(Q(S^B)) = \hat{S}^B$$

For the following (higher) levels of quality, a decoder (as well as a simulated decoder within the encoder) processes the rendition of Z at the lower level of quality to generate—through suitable upsampling operations—a prediction V:

$$V_L^K = g(Z_L^{K-1})$$

$$V_L^B = 0$$

For every level of quality, the encoder generates a rendition of the "ideal" (e.g., pre-quantization and pre-transformations) support plane S, in this simple non-limiting embodiment by means of a simple arithmetic average of motion-compensated renditions of sets of absolute residuals of the spans of the lot (each motion compensation operation being performed with reference to the sampling position selected for support element S):

$$S_L^K = \frac{1}{N}\sum_N MC(R_L^K)$$

Support plane Residuals $R^I$ for that given LOQ are then calculated as the difference between S and its prediction V:

$$R^I = S - V$$

As a consequence, the rendition of support element Z reconstructed at a decoder (as well as at a simulated decoder within the encoder) is:

$$Z = V + DQ(Q(R^I)) = V + \hat{R}^I$$

The remaining operations performed by the encoder are substantially similar to the ones already described for other non-limiting embodiments. The encoder calculates relative residuals $R^{II}$ based on R and Z:

$$R^{II} = R - MC(Z)$$

A decoder (as well as a simulated decoder within the encoder) can thus finally reconstruct rendition of signal Y:

$$Y = U + MC(V + DQ(Q(R^I))) + DQ(Q(R^{II})) = U + MC(V + \hat{R}^I) + \hat{R}^{II} = U + MC(Z) + \hat{R}^{II}$$

In a non-limiting embodiment, the support plane for a lot is a tiered hierarchy of planes centered in a lot (i.e., with a sampling position—leveraged for motion compensation operations—equal to the average of the sampling positions of the topmost spans of a lot).

In another non-limiting embodiment, the support plane is a tiered hierarchy of planes with the integer sampling position of the highest level of quality (e.g., LOQ #0) that is lower than or equal to the average of the sampling positions of the spans of the lot at the highest level of quality. In this way, the supporting chain plane is always centered in a sampling position consistent with the original sample rate of the signal, simplifying motion compensation operations (as described when illustrating balanced motion compensation, sampling rate judders, framing and "Not Available" elements).

Aside from supporting the reconstruction of a signal, a support plane encoded with a tiered hierarchical method is indeed a sub product in its own (i.e., a self-sufficient tiered hierarchy, which can be reconstructed independently of the rest of the signal). This is exploited by several non-limiting embodiments. For instance, in a non-limiting embodiment a decoder can limit its processing to just decoding the support plane reconstruction data for a lot at a given LOQ, and display—for the time duration of the corresponding lot—an image based on the support plane. Example applications of such embodiment are the cases of very low bandwidth connections, or of decoders with small amount of resources (e.g., like memory or computational power), or even of situations in which a fast and approximate rendering of the signal is required (e.g., accelerated navigation, fast forward or fast rewind play back, etc.), since a support element essentially conveys average information on the lot of the signal at a given level of quality.

In other non-limiting embodiments, the encoder computes support planes by processing previously encoded and transmitted spans instead of by leveraging on a current lot and/or subsequent lots. This approach has the advantage that the same spans used at the encoder side to compute a support plane are already available at the decoder side, so there is no need to transmit support plane reconstruction data to the decoder. Also, the approach is useful in low-latency conditions (e.g., without limitation, video conferencing applications), when the encoder cannot wait for the availability of a full lot of spans before starting the encoding process.

In other non-limiting embodiments, the support plane is calculated by processing a moving average of spans, and in principle does not require any information on the support plane to be transmitted to the decoder (although in another non-limiting embodiment such information is nonetheless periodically transmitted in order to guarantee alignment between the information available at encoder and decoder side). As non-limiting example, a support plane calculated as a moving average is useful in real-time low-latency applications such as video-conferencing, where it is not possible to introduce long delays (e.g., by using long lots), but still time correlation is extremely high. In such embodiments, the decoder calculates and updates the support plane for each LOQ as the spans of the signal are decoded and reconstructed. In a non-limiting embodiment, a simple moving average scheme is adopted. In another non-limiting embodiment, the information coming from different spans is averaged by leveraging an exponential decay weighting system. In yet another non-limiting embodiment, a precision-based weighting approach is used, based on the methods described in patent application 13/352,944 of the same authors, where essentially the encoder assigns and transmits to the decoder a precision value for each span (e.g., corresponding to statistical precision, or inverse variance, of the span), and the decoder produces two buffers: a buffer $Z^{old}$, containing the rendition of the supporting chain for the previous sampling position for which the supporting chain was computed, and a buffer $p^{old}$, containing for each corresponding element of $Z^{old}$ the precision of the respective value. At any T=t, defining as $Z^{new}$ the "contribution" to the supporting chain of the span at sampling position t (e.g., its corresponding set of absolute residuals R), the new values in the buffers are calculated as follows, wherein letters in small caps represent specific elements at given coordinates (x, y) of the corresponding plane in big caps:

$$z_{x,y,t} = \beta \cdot MC_{x,y}(p^{old}) \cdot MC_{x,y}(z^{old}) + \beta \cdot p_t^{new} \cdot z_{x,y,t}^{new}$$

$$\beta \cdot p_t^{new} + \beta \cdot MC_{x,y}(p^{old}) = 1$$

$$p_{x,y,t+1}^{old} = a \cdot p_{x,y,t}^{old} + b \cdot p_t^{new}$$

$$z_{x,y,t+1}^{old} = z_{x,y,t}$$

Motion compensation operations are calculated relatively to the sampling position of the new supporting chain that is being calculated.

$MC_{x,y}(\bullet)$ identifies the element with coordinates (x, y) of plane of elements $MC(\bullet)$.

β, a and b are suitable parameters. In one example embodiment, a=b=1.

In order to account for discontinuities in time correlation, a non-limiting embodiment adds the operation described below, which "resets" to zero the value of $p^{old}$ in a coordinate (x, y) when the difference between a value of the latest given span and the corresponding motion-compensated value contained in the buffer $z^{old}$ is higher than a suitable threshold:

If Abs $(z_{x,y,t}^{new} - MC_{x,y}(z^{old}))$>Threshold, then:

$$p_{x,y,t+1}^{old} = p_t^{new}$$

$$z_{x,y,t} = z_{x,y,t}^{new}$$

As already mentioned, leveraging a support plane along the time dimension should be intended as just a non-limiting example for applications of common predictor methods (or "multi-predictive encoding" methods). The approach of aggregating the information of several spans (into a predictor hyperplane) and encoding/decoding residuals with respect to a prediction generated by processing such aggregate information can be applied also to other dimensions of a signal (i.e., not necessarily time), and potentially also to more than one of the dimensions of a same signal. When applied to the time dimension, it is customary to adopt embodiments that use some form of motion estimation and motion compensation, as previously described. However, also for other dimensions and other types of signal a support predictor method can be implemented with forms of compensation processing aimed at "realigning" spans before aggregating them into a support plane (thus "distilling" their correlated information). A non-limiting embodiment, for instance, adopts a support predictor method across different channels of a multi-channel audio signal. Such embodiment encodes and decodes multichannel audio signals according to a tiered hierarchical method, wherein spans for each channel are represented as sets of elements (by way of non-limiting example, an average amplitude value and an average pitch value for the span), and residual data for corresponding spans of the different audio channels are encoded according to a set of support element residual data, "motion compensating" (i.e., applying operations essentially corresponding to realigning correlated spans) support element residual data across channels according to suitable descriptive information (hence accounting for different time positions of a same sound in different channels—essentially based on the 3D position of the sound source vs. the microphone).

Another non-limiting embodiment encodes and decodes vast volumetric data, by applying multi-predictive methods similar to the ones that were illustrated for the time dimension of video signals to one or more of the dimensions of a volumetric signal.

Another non-limiting embodiment encodes and decodes volumetric video, by applying methods similar to the ones that were illustrated for sequences of two-dimensional spans to sequences of three-dimensional spans (i.e., support plane Z is a three-dimensional hyperplane of elements).

As previously stated, it is clear from the described non-limiting embodiments that novel methods of encoding/decoding based on one or more support predictor have multiple advantages. First of all, support planes allow reducing the information entropy of residual data. When leveraged for time-based signals, support planes along the time dimension are particularly useful, especially whereby the encoder appropriately performs lot cutting, scene cutting and (if present) motion estimation/compensation. Support planes are also very useful when they are applied within the encoding/decoding loop of a tiered hierarchical method.

In general, the higher the correlation of the sequence of spans, the higher are the benefits provided by a support plane in predicting absolute residuals.

Figure 3B:
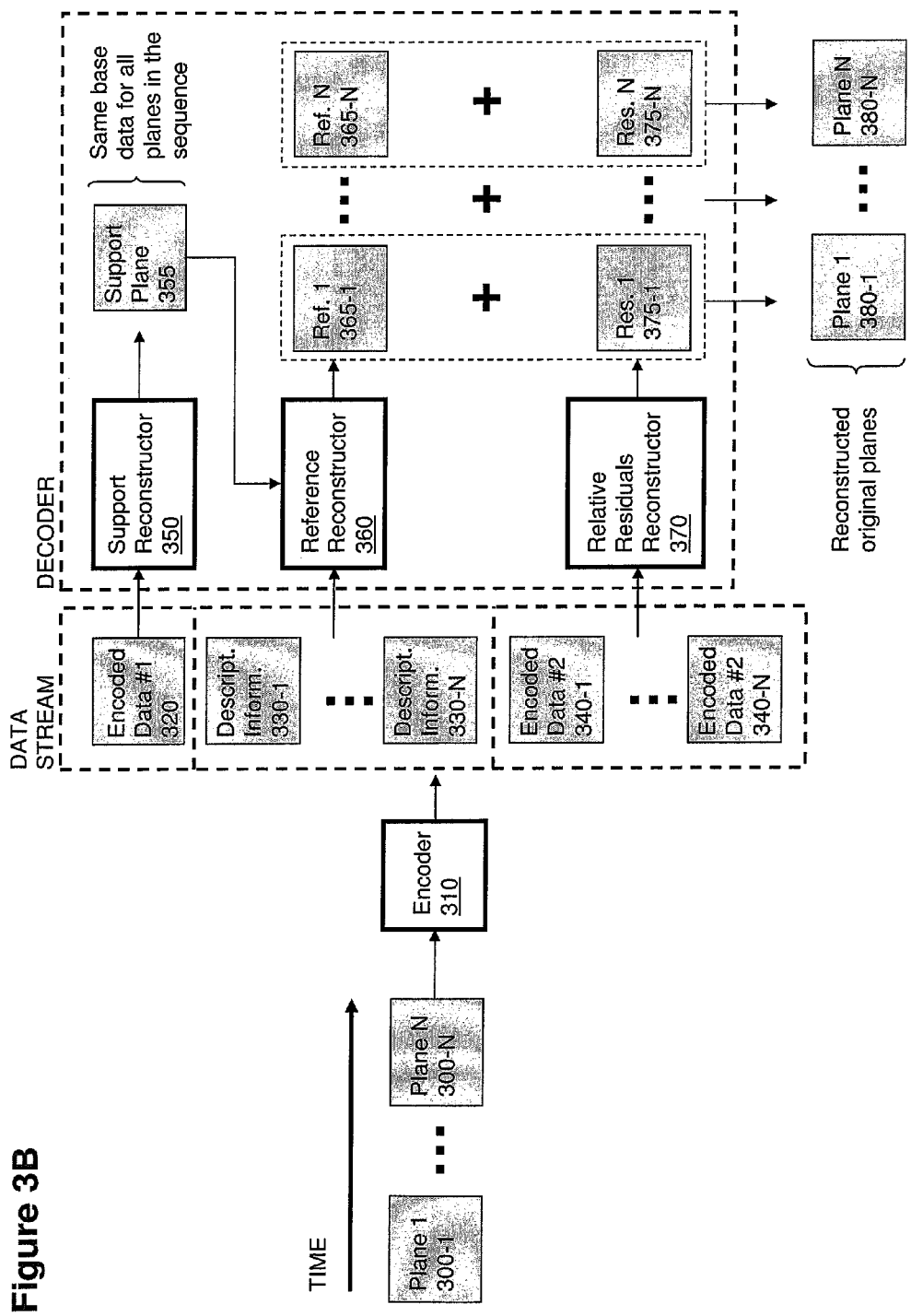

FIG. 3B is an example diagram illustrating a non-limiting embodiment implementing encoding a sequence of multi-dimensional planes of elements based on support element information.

Planes 300-1, . . . , 300-N are processed by encoder 310, which produces a stream of encoded data. In particular, said stream of encoded data comprises Encoded Data #1 320, sets of Descriptive Information 330-1, . . . , 330-N and sets of Encoded Data #2 340-1, . . . , 340-N.

Encoded Data #1 320 is received and processed by Support Reconstructor 350, which produces Support Plane 355.

Support Plane 355 is leveraged by the decoder as a baseline to reconstruct suitable renditions corresponding to original planes 300-1, . . . , 300-N. In particular, Support Plane 355 is processed by Reference Reconstructor 360, which produces Reference planes 365-1, . . . , 365-N, each obtained by processing Support Plane 355 based on a corresponding set of Descriptive Information 330-i. In a non-limiting embodiment, image processing operations to obtain each of the Reference planes 365-i comprise performing motion compensation operations on Support Plane 355 based on motion information corresponding to set of Descriptive Information 330-i.

Relative Residuals Reconstructor 370 receives and processes sets of Encoded Data #2 340-1, . . . , 340-N, producing sets of Relative Residuals 375-1, . . . , 375-N.

The decoder then produces reconstructed planes 380-1, . . . , 380-N by combining Reference planes 365-1, . . . , 365-N with Relative Residual planes 375-1, . . . , 375-N.

Figure 4A:
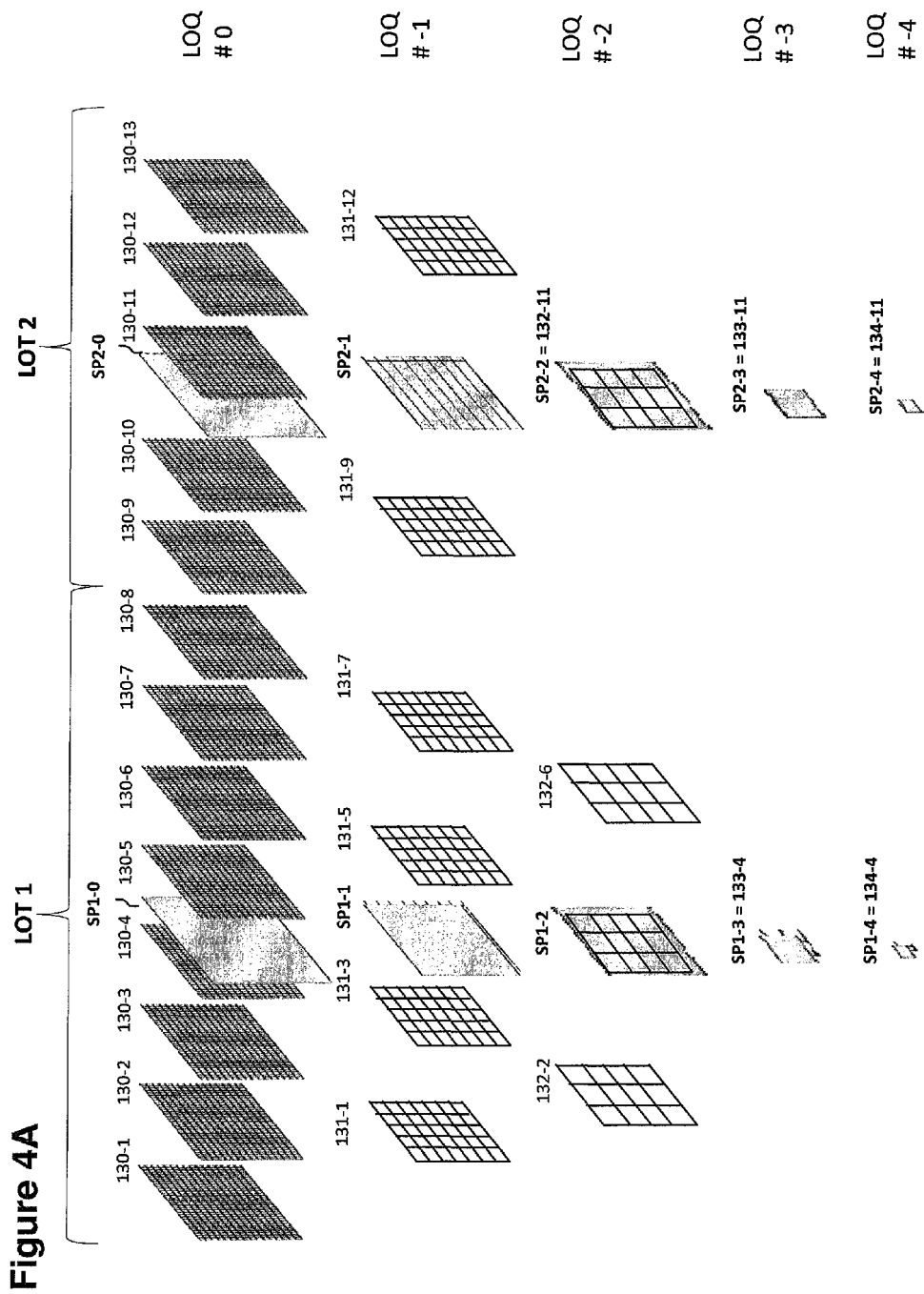
FIGS. 4A, 4B and 4C are example diagrams of the processing of a sequence of images.

FIG. 4A is an example diagram illustrating a non-limiting example embodiment of three-dimensional time-based signal encoded in a tiered temporal hierarchy with multipredictive encoding, and in particular by also leveraging supporting planes in order to encode residual data. The example input signal is the same as the one described in FIG. 1E, which for all practical purposes we can think of as a video signal consisting of a sequence of two-dimensional frames.

The graphical representation is different from the one adopted in FIG. 1E (in particular, it does not represent the different time durations and sampling positions of each of the spans), since FIG. 4A shows the sets of absolute residuals R corresponding to each of the spans (as opposed to the spans themselves) and the support planes for each of the lots at each of the shown LOQs. FIG. 4A illustrates how the amount of residual data for spans at different levels of quality has increasingly lower spatial resolutions (i.e., amounts of elements), and—for the LOQs and the lots in which framing is applied to the support plane—the rendition of a given support plane at a given level of quality has a higher amount of elements than sets of absolute residuals corresponding to a span of the same level of quality supported by said support plane.

In this non-limiting embodiment, a support plane for a lot is centered at the integer sampling position of LOQ #0 that is immediately lower than or equal to the average of the sampling positions of the spans of the lot at LOQ #0. In particular, the chain of support planes SP1 for lot 1 is centered at sampling position t=4, while the chain of support planes SP2 for lot 2 is centered at sampling position t=11.

For the specific example case, reconstructing absolute residuals for a lot up to LOQ #-3 is equivalent for both lots to just reconstructing the supporting chain, i.e., set of absolute residuals 134-4 coincides with Support Plane SP1–4, set of absolute residuals 133-4 coincides with Support Plane SP1–3, etc. On the contrary, the support plane has its own distinct identity for levels of quality where a lot is represented by more than one span. For instance, for LOQ #-2 of lot 1, support plane SP1–2 is different from sets of absolute residuals R 102-2 and 102-6.

Encoding and decoding operations work according to methods illustrated above. A signal processor configured as an encoder ("the encoder") receives a rendition of a signal (e.g., a sequence of two-dimensional spans at constant sample rate, wherein each of the spans is characterized by a given sampling position and a given duration) at an original level of quality ("LOQ #0"). The encoder starts by processing the signal and generating motion information. Based at least in part on said motion information, the encoder identifies a suitable sequence of spans to be encoded independently of previous and subsequent sequences (i.e., a "Batch"); the encoder, based at least in part on suitable encoding parameters, also divides the batch into one or more "lots" of spans. More specifically, as illustrated in FIG. 4A, the encoder identifies a Batch of 13 spans and divides it into a lot 1, consisting of 8 spans, and a lot 2, consisting of 5 spans.

Within each lot, the encoder starts performing suitable downsampling and/or blending and/or downblending operations (also including motion compensation operations in order to suitably account for motion across spans), generating lower levels of quality for the signal. When spans of a lower level of quality are the result of the combination of motion-compensated spans at a higher level of quality (as opposed to just a spatial downsampling of a span at a higher level of quality), the encoder introduces a degree of "framing" by adding additional rows and columns to the spans of the lower level of quality, beyond the actual image ("destination plane") that would be shown whereby the signal had to be displayed at that level of quality. For the sake of readability, the actual spans of the signal are not shown in FIG. 4A.

When one of the dimensions of a downsampled rendition of a lot reaches a resolution of 1 element, downsampling for subsequent lower tiers proceeds by downsampling only along the remaining dimensions. For instance, at LOQ #-2 lot 2 reaches a time resolution equal to 1 element (i.e., the entire lot is represented by only one span), hence downsampling of lot 2 from LOQ #-2 to LOQ #-3 proceeds by downsampling only along spatial dimensions (which typically have a much higher resolution).

The downsampling process within each lot continues until a bottom level of quality is reached. In the non-limiting example of FIG. 4, the bottom LOQ is LOQ #-4.

Once the encoder generated the bottom LOQ #-4, the encoder generates sets of absolute residuals 134-4 and 135-11 for the bottom level (in this simple non-limiting embodiment, by quantizing the elements of the two spans of the bottom level); at LOQ #-4, said sets of absolute residuals 134-4 and 135-11 also coincide, respectively with support planes SP1–4 and SP2–4 for lot 1 and lot 2 at LOQ #-4. As a consequence, at LOQ #-4 Support Plane Residuals $R^I$ coincide with absolute residuals R, and Relative Residuals $R^{II}$ are all equal to zero.

The encoder then starts simulating the operations performed at a decoder side, performing suitable upsampling operations and generating predicted spans for LOQ #-3. In this non-limiting embodiment, the encoder leverages temporal upsampling operations with kernels including two elements per dimension up until LOQ #-1 and four elements per dimension from LOQ #-1 to LOQ #0. As already mentioned before, this is due to the fact that at lower LOQs elements are more distant both in time and space, so correlation among elements is likely to be relatively local (e.g., it brings limited benefits, and sometimes it is even counterproductive, to "ask for contributions" to uncorrelated spans).

By comparing predicted spans with the downsampled spans of the tiered hierarchy generated via downsampling, the encoder generates sets of absolute residuals 133-4 and 133-11, which again coincides with the two support planes SP1–3 and SP2–3 at LOQ #-3.

The encoder, based on reconstructed renditions for LOQ #-3, proceeds by generating predicted spans for LOQ #-2. By comparing predicted spans with the downsampled spans of the tiered hierarchy generated via downsampling, the encoder generates sets of absolute residuals 132-2, 132-6 and 132-11. At LOQ #-2, lot 1 consists of two spans, so the support plane no longer coincides with any set of absolute residuals, but it is effectively a set of support elements to be used for predicting the two sets of absolute residuals 132-2 and 132-6. The encoder thus proceeds with calculating support plane SP1–2, first of all by calculating its "ideal" (i.e., pre-encoding and reconstruction) rendition S:

$$S_1^2 = \frac{1}{2}(MC(132\text{-}2) + MC(132\text{-}6))$$

wherein motion compensation operations are performed relatively to the sampling position of support plane SP1–2, i.e., t=4.

Since in this non-limiting embodiment support planes are also encoded according to a tiered hierarchical method, the encoder then proceeds to generating reconstruction data for the support plane, starting from calculating, by applying suitable upsampling operations to support plane SP1–3 at LOQ #-3, predicted support plane V. The encoder then calculates Support Plane Residuals $R^I$:

$$R^I = S - V$$

As a consequence, the encoder (simulating the operations that will be performed at a decoder) reconstructs the rendition of Support Plane SP1–2 (mathematically described as "Z"):

$$Z = V + DQ(Q(R^I)) = V + \hat{R}^I$$

The encoder is now able to generate sets of relative residuals for the two spans of LOQ #-2 of lot 1 (not shown in the figure), by calculating the difference between sets of absolute residuals R 132-2 and 132-6 and motion-compensated renditions (with respect to the sampling position of each corresponding span) of Support Plane SP1–2.

The encoder proceeds in a similar way up to the highest LOQ, generating all of the necessary reconstruction data (e.g., in this non-limiting example case, Support Plane Residuals, Relative Residuals and descriptive information for each LOQ of each lot).

At a decoder side, a signal processor configured as a decoder essentially performs the same operations simulated at the encoder side in order to generate reconstruction data. The decoder starts by receiving a data stream and decoding synch marker metadata in order to identify, also based on suitable decoding parameters, the sequence of spans to be reconstructed. Starting from the lowest LOQ, the decoder reconstructs predictions for the spans of a higher LOQ, reconstructs support plane data, reconstructs absolute residual data by suitably combining support plane data with relative residual data, and consequently reconstructs renditions for spans of the higher LOQ.

Once reconstructed a suitable LOQ, the signal processor presents the reconstructed signal to a user, for instance by transmitting it to a playback device. Depending on the reconstruction data that has been received and/or on real-time decoding constraints and/or on other constraints (e.g., minimizing computing power consumption, minimizing electrical power consumption, minimizing absorbed bandwidth, maximizing playback speed, etc.) and/or responding to specific input parameters, the decoder can also stop the decoding at different LOQs for different portions of the signal.

Once again, the illustrated embodiment should be considered as non-limiting, and people skilled in the art can easily infer how to combine all of the non-limiting embodiments and methods discussed so far with the example embodiment illustrated in FIG. 4A.

In other non-limiting embodiments, the support plane for a given LOQ of a given lot is calculated not by performing a weighted average along time of motion compensated absolute residuals, but by performing a weighted average along time of the actual motion compensated spans. Absolute residuals for a given span can thus be obtained by combining the corresponding Relative Residuals with the differences between the predicted span for the given span and a motion compensated rendition of the support plane; having said that, these embodiments don't require the decoder to produce absolute residuals, because the decoder can generate a rendition of the signal at the given LOQ by just combining the motion compensated support plane with relative residuals. In such embodiments, a support plane for a given LOQ actually represents all of the correlated information of the lot (as opposed to just the correlated residual data). These non-limiting embodiments are especially useful in absence of a tiered hierarchy of LOQs.

In other non-limiting embodiments, support plane information of neighboring lots is suitably leveraged (e.g., by computing a weighted average of the motion compensated renditions of the support planes) in order to generate predictions for the absolute residuals of spans.

In other non-limiting embodiments, support planes of neighboring lots are encoded in a tiered hierarchy of levels of aggregation.

Figure 4B:
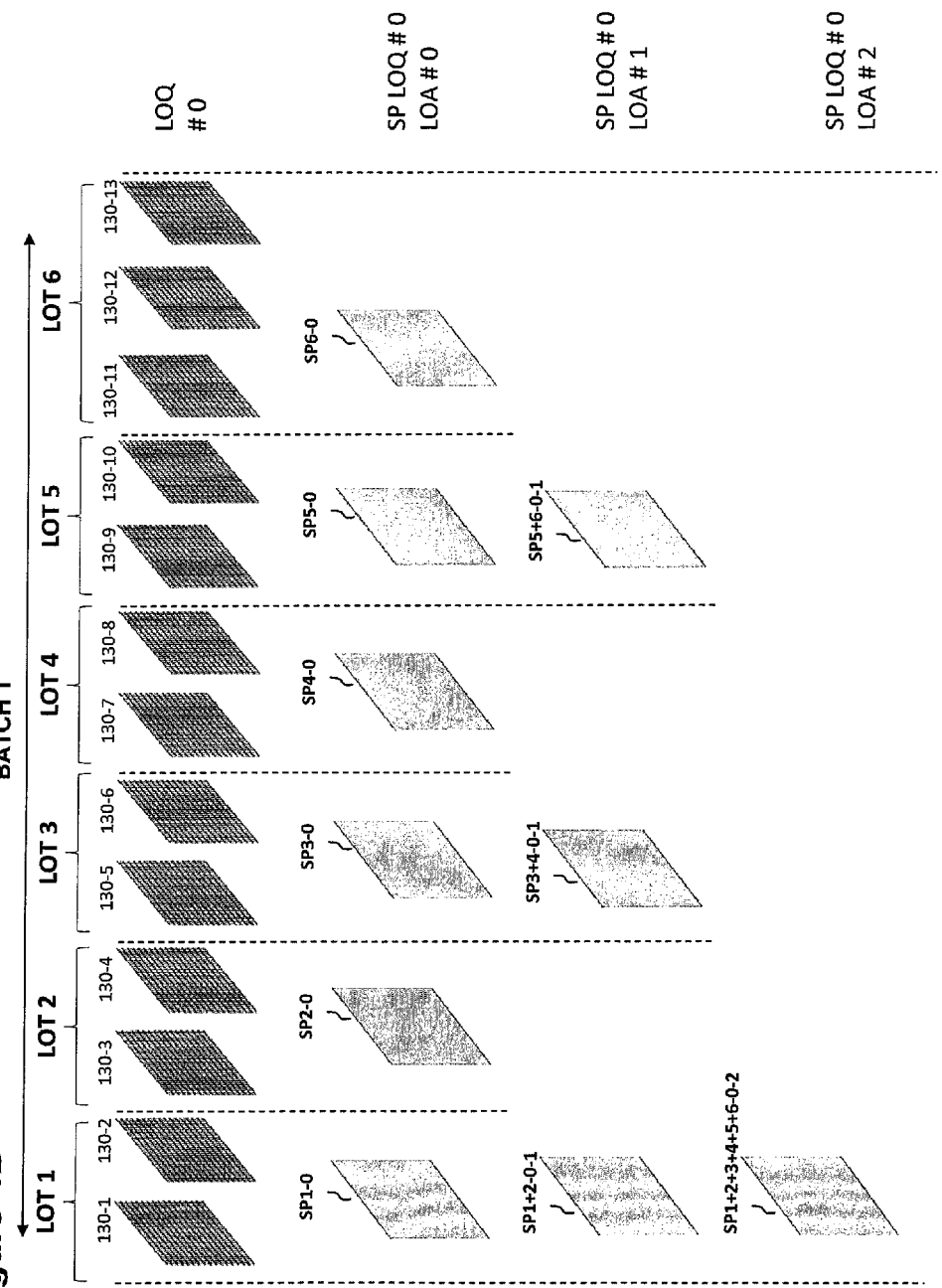
Figure 4C:
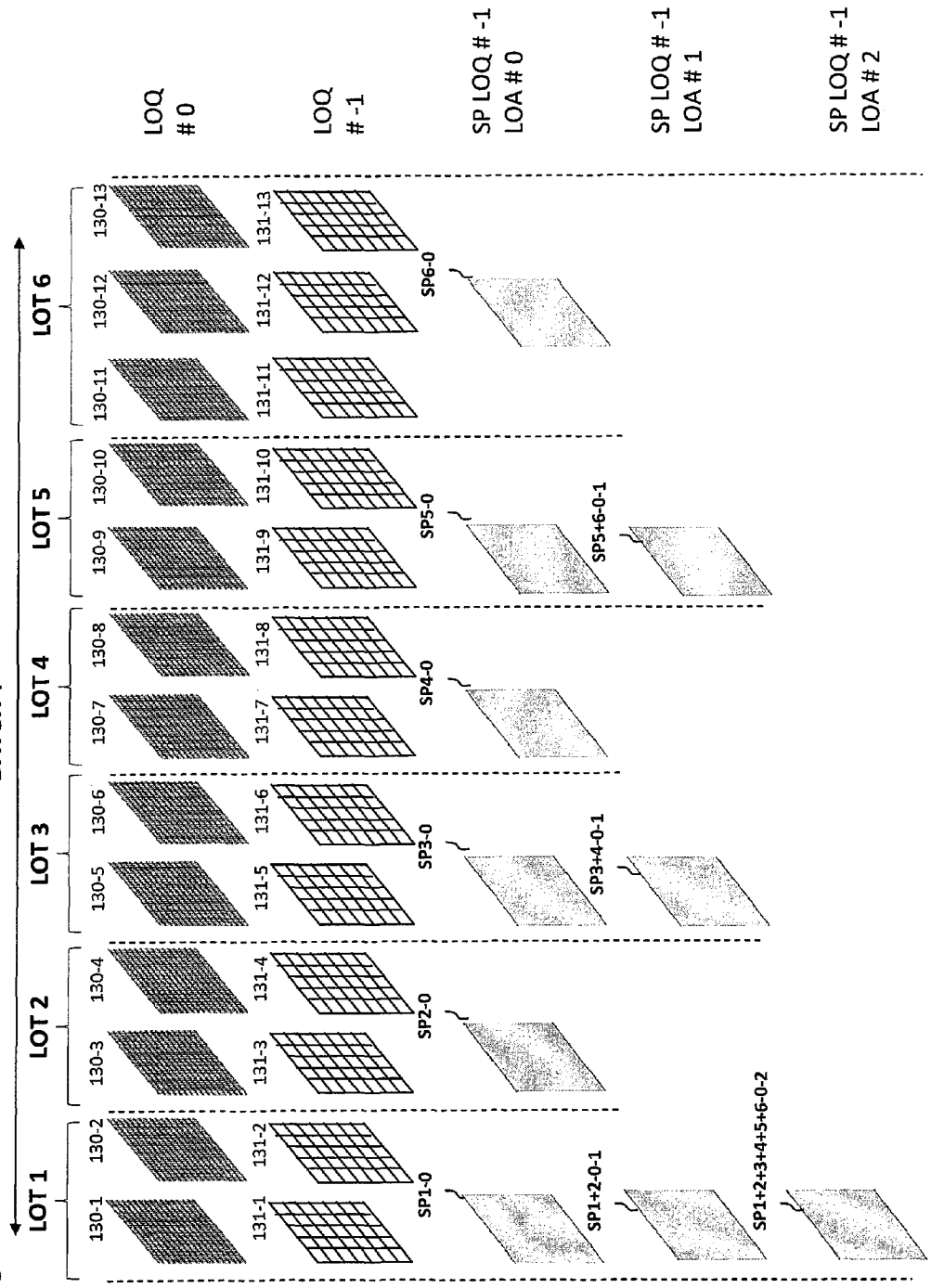

FIG. 4B and FIG. 4C are example diagrams illustrating a non-limiting example embodiment of support planes for absolute residuals of a given LOQ, wherein said support planes are encoded in a tiered hierarchy of levels of aggregation. The example input signal is the same as the one described in FIG. 4A, which for all practical purposes we can think of as a video signal consisting of a sequence of two-dimensional frames (our spans, for the purpose of the method). However, the division of the batch of the signal in lots is different, and also the downsampling operations used to obtain LOQ #-1 based on LOQ #0 are different. In particular, as illustrated in FIG. 4C, differently from the non-limiting embodiments illustrated in FIG. 1E and FIG. 4A, in this non-limiting embodiment LOQ #-1 is obtained via simple spatial downsampling, i.e., maintaining the same sample rate as LOQ #0. A similar configuration is preferred wherein the sample rate of the topmost LOQ is relatively low, in order to avoid excessive drops in the quality of the rendition at LOQ #-1.

Like in FIG. 4A, FIG. 4B graphically shows the sets of absolute residuals R corresponding to each of the spans (as opposed to showing the spans themselves) and the support planes for each of the lots. FIG. 4B only shows the topmost LOQ #0 of the signal, for readability purposes, while FIG. 4C shows what happens with the support planes of the next lower LOQ #-1. As already mentioned, in this specific non-limiting embodiment, the next lower LOQ of the signal, shown in FIG. 4C, has the same sample rate as the topmost LOQ, but lower spatial resolution.

Similarly to what shown in FIG. 4A, each of the support planes SP1-0, SP2-0, . . . , SP6-0 supports the reconstruction of the sets of absolute residuals of the corresponding lot. Differently from what shown in FIG. 4A, however, instead of reconstructing SPi-0 based on a corresponding support plane of the same lot at a lower level of quality, this non-limiting embodiment encodes and decodes support planes based on a specific tiered hierarchy of levels of aggregation produced for LOQ #0 (i.e., without performing spatial downsampling, but only motion-compensated temporal blending).

In particular, a signal processor configured as an encoder produces sets of absolute residuals R 130-1, . . . , 130-13 for each of the spans at LOQ #0 and generates support planes SP1-0, SP2-0, . . . , SP6-0, wherein each plane is obtained by combining suitably motion-compensated renditions of the sets of absolute residuals of the corresponding lot. In this simplified non-limiting embodiment, lots are chosen to be made of maximum three spans, and the sampling position of a support plane is equal to the sampling position of the first span of each given lot. Support planes SP1-0, . . . , SP6-0 are said to be support planes for LOQ #0 at level of aggregation (LOA) #0.

The encoder then proceeds to encode support planes SP1-0 and SP2-0 according to a higher-order support plane SP1+3-0-1 at a higher level of aggregation (LOA #1). In particular, the encoder produces SP1+3-0-1 by combining suitably motion-compensated renditions of SP1-0 and SP2-0, according to the sampling position of SP1+3-0-1 (in this embodiment set to the sampling position of SP1-0, i.e., the lower of the sampling positions of the planes that are combined into the higher-order support plane). The encoder generates Support Plane Residuals $R^{I*}$ (not shown in the figure) for each of the support planes SP1-0 and SP2-0 based on a difference between said planes and a motion-compensated rendition of support plane SP1+3-0-1, according to the following formula:

$$R^{I*}=S-\mathrm{MC}(SP1+2-0-1)$$

$$Z=\mathrm{MC}(SP1+2-0-1)+DQ(Q(R^{I*}))=\mathrm{MC}(SP1+2-0-1)+\hat{R}^{I*}$$

Wherein S represents a support plane (i.e., either SP1-0 or SP2-0) as initially calculated by the encoder and Z represents the reconstructed rendition of said support plane at a decoder side (simulated by the encoder in order to suitably generate residual data, based on what the decoder is able to reconstruct).

According to the same methods, the encoder produces higher-order support planes SP3+4-0-1 and SP5+6-0-1, as well as the sets of Support Plane Residuals $R^{I*}$ (one set per each support plane) that are necessary to reconstruct support planes SP3-0 and SP4-0 based on higher-order support plane SP3+4-0-1, and support planes SP5-0 and SP6-0 based on higher-order support plane SP5+6-0-1.

In another non-limiting embodiment, the encoder encodes also higher-order support planes at LOA #1 according to one or more yet-higher-order support planes at LOA #2 (e.g., higher-order support plane SP1+2+3+4+5+6-0-2 shown in FIG. 4B). In these embodiments, the encoder produces support planes up to the highest level of aggregation before starting to produce sets of Support Plane Residuals $R^{I*}$ (simulating the reconstruction process at a decoder side by starting from the highest level of aggregation).

At a decoder side, the decoder reconstructs support planes at LOA #0 (i.e., the support planes necessary in order to reconstruct sets of absolute residuals) by receiving and decoding reconstruction data corresponding to higher-order support planes for the batch of lots at the highest level of aggregation. The decoder then reconstructs predictions for support planes at the next lower level of aggregation, and adjusts said predictions based on received sets of Support Plane Residuals $R^{I*}$. The decoder reconstructs the tiered hierarchy of support planes up to (or better, down to) the lowest level of aggregation.

As illustrated in FIG. 4C, every LOQ of a given batch of the signal has its own tiered hierarchy of levels of aggregation of support planes. In this non-limiting embodiment, the tiered hierarchy of support planes of a given LOQ is independent of the tiered hierarchies of support planes of other LOQs of the signal.

Figure 5:
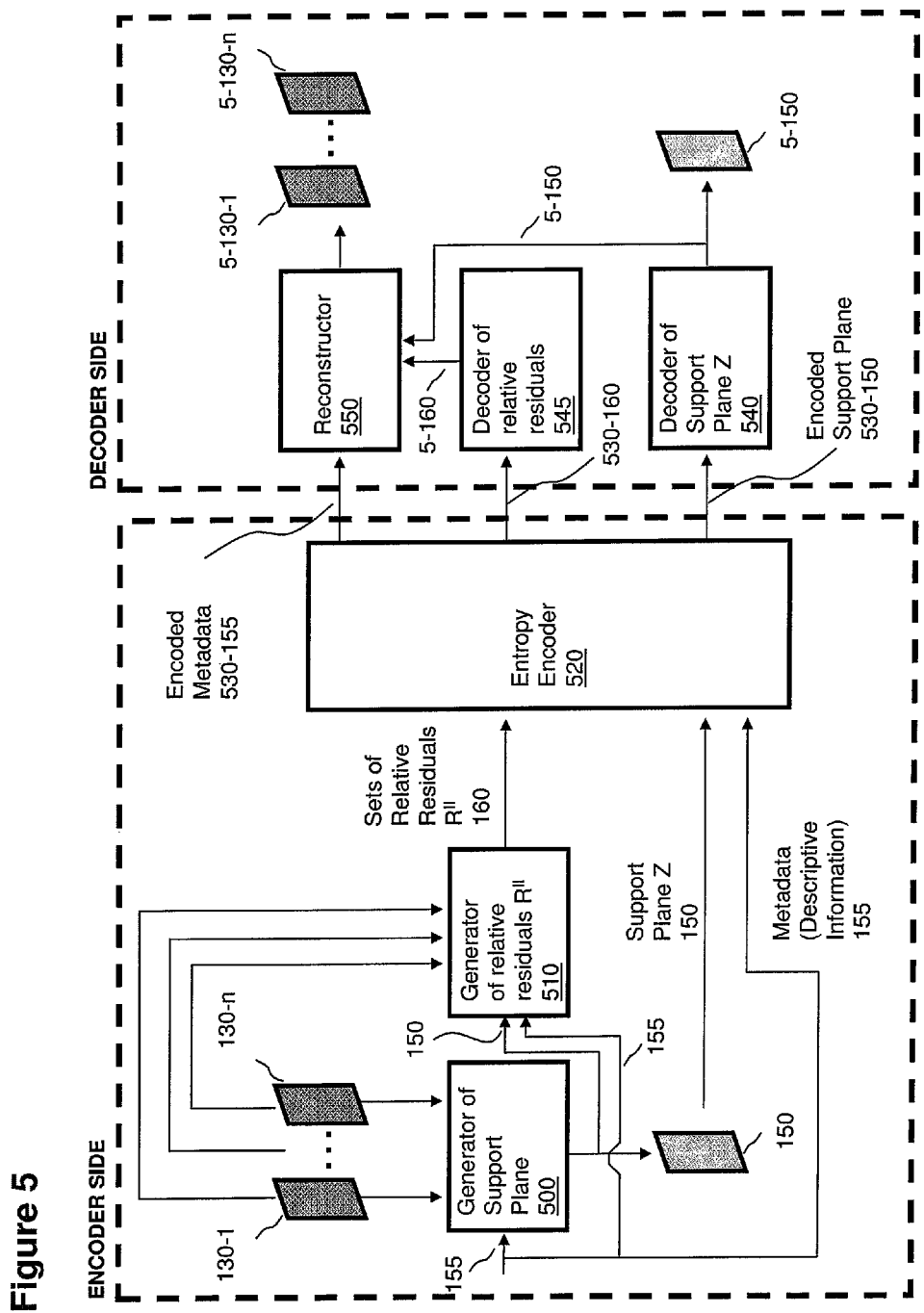
FIG. 5 is an example diagram illustrating the structure of an encoder and of decoder.

FIG. 5 further illustrates a non-limiting embodiment of encoding and decoding of planes 130-1, . . . , 130-n based on a support plane Z 150.

The embodiment works according to methods similar to the ones already detailed in other sections of this application. Generator of Support Plane 500 processes input planes 130-1, . . . , 130-n based at least in part on Descriptive Information 155, producing Support Plane Z 150. Generator of Relative Residuals 510 processes input planes 130-1, . . . , 130-n, Descriptive Information 155 and Support Plane Z 150, producing sets of relative residuals $R^{II}$ 160 (wherein each of said sets corresponds to a specific input plane 130-i). Entropy Encoder 520 processes Descriptive Information 155, Support Plane Z 150 and sets of relative residuals $R^{II}$ 160, producing, respectively, encoded data 530-155, 530-150 and 530-160.

Decoder of Support Plane 540 processes encoded data 530-150, producing reconstructed Support Plane 5-150.

Decoder of Relative Residuals 545 processes encoded data 530-160, producing sets of reconstructed relative residuals 5-160, each of said sets corresponding to a reconstructed rendition of a specific input plane 130-i.

Reconstructor 550 processes reconstructed Support Plane 5-150 and reconstructed relative residuals 5-160, producing reconstructed planes 5-130-1, . . . , 5-130-n.

Figure 6:
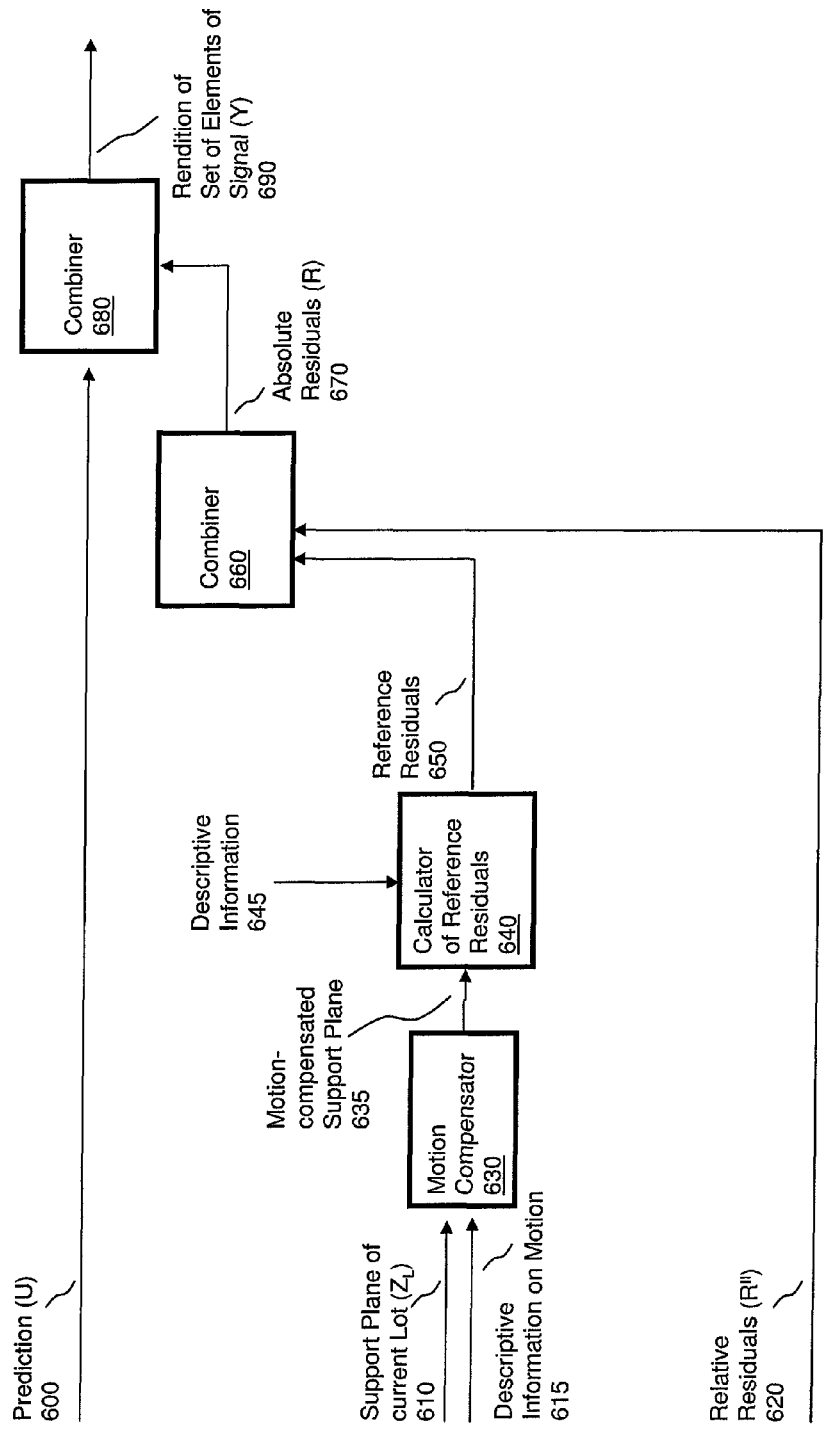
FIG. 6 is an example diagram illustrating decoding based on support element information.

FIG. 6 further illustrates a non-limiting embodiment of decoding of sets of elements of a signal based on absolute residuals reconstructed by means of a support plane.

Motion Compensator 630 receives and processes Support Plane 610 and Descriptive Information on Motion 615, producing Motion-compensated Support Plane 635. Motion-compensated Support Plane 635 is processed by Calculator of Reference Residuals 640 with Descriptive Information 645, producing the plane of Reference Residuals 650.

Reference Residuals 650 are combined with Relative Residuals 620 by Combiner 660, producing Absolute Residuals 670.

Absolute Residuals 670 are combined with Prediction 600 by Combiner 680, producing Rendition Y 690.

Figure 7A:
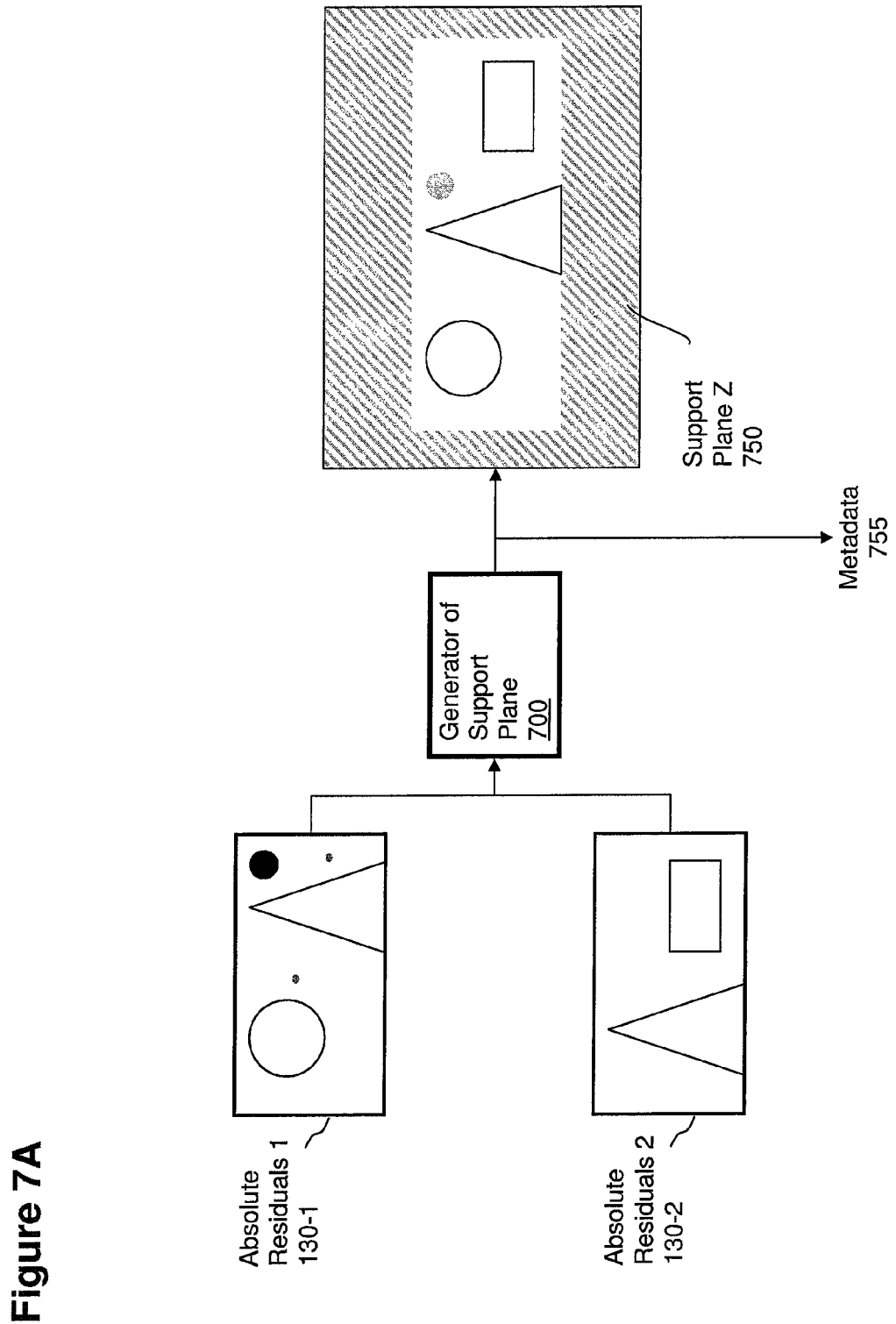

FIGS. 7A and 7B further illustrate a non-limiting embodiment of encoding and decoding of sets of absolute residuals based on a support plane.

In a signal processor configured as an encoder, planes of Absolute Residuals 130-1 and 130-2 are processed by Generator of Support Plane 700, producing Support Plane Z 750 and Metadata 755.

A signal processor configured as a decoder receives Support Plane Z 750, Metadata on motion 755-1 and Relative Residuals 760-1. Calculator of Reference Residuals 710 processes Support Plane Z 750 based on Metadata on motion 755-1, producing the plane of Reference Residuals 740-1. Combiner 720 then combines Reference Residuals 740-1 with Relative Residuals 760-1, producing Rendition of Absolute Residuals 1 730-1 (i.e., a reconstructed rendition corresponding to the encoded plane of Absolute Residuals 130-1).

In one embodiment, encoder processor hardware 1120 (in FIGS. 11 and 12) applies one or more operations to the set of support values in support plane 1130 to produce a set of reference values such as reference residuals 740-1, the one or more operations selected from the group consisting of: i) resampling calculations, ii) motion-compensation operations, and iii) equalization operations.

Figure 8:
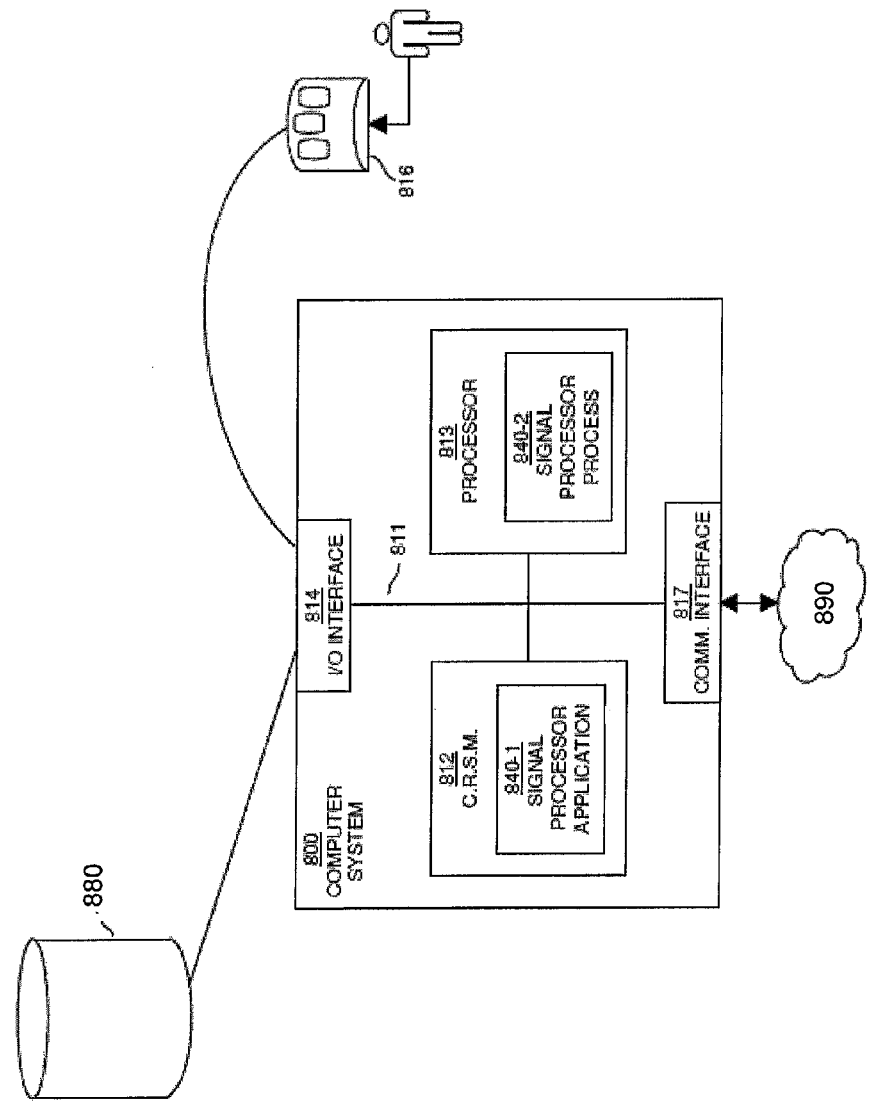
FIG. 8 shows a block diagram of a computer system that provides data processing according to embodiments described herein.

FIG. 8 is a block diagram of a computer system 800 that provides computer processing according to embodiments herein.

Computer system 800 can be or at least include a computerized device such as a personal computer, processing circuitry, television, playback device, encoding device, workstation, portable computing device, mobile phone, tablet, console, set top box, network terminal, processing device, network device, operating as a switch, router, server, client, etc.

Note that the following discussion provides a basic embodiment indicating how to carry out functionality associated with a signal processor as previously discussed. However, it should be noted that the actual configuration for carrying out the operations as described herein can vary depending on a respective application.

As shown, computer system 800 of the present example comprises a communication bus 811, which provides communication with a computer readable storage media 812 such as a non-transitory computer-readable storage medium, etc., in which digital information can be stored and retrieved.

Computer system 800 can further comprise a processor 813, an I/O interface 814, and a communications interface 817.

In one embodiment, I/O interface 814 provides connectivity to repository 880, and if present, to a screen display, audio speakers, peripheral devices 816 such as a keyboard, a computer mouse, etc.

As briefly mentioned above, the computer readable storage media 812 can be any suitable device and/or hardware such as memory, optical storage, solid state storage, hard drive, floppy disk, etc. In one embodiment, the storage media 812 is a non-transitory storage media (i.e., non-carrier wave media) configured to store instructions associated with a signal processor application 840-1. The instructions are executed by a respective resource such as the processor 813 in order to perform any of the operations as discussed herein.

The communications interface 817 enables computer system 800 to communicate over a network 890 in order to retrieve information from remote sources and communicate with other computers, switches, clients, servers, etc. The I/O interface 814 also enables processor 813 to retrieve or attempt retrieval of stored information from repository 880.

As shown, the computer readable storage media 812 can be encoded with signal processor application 840-1 executed by processor 813 as a process 840-2.

Note that the computer system 800 can be embodied to include a computer readable storage media 812 for storing data and/or logic instructions.

The code associated with the signal processor application 840-1 can implement the functionalities of the signal processors illustrated herein and/or other resources necessary to implement the invention discussed herein.

During operation of one embodiment, processor 813 accesses computer readable storage media 812 via the communication bus 811 in order to launch, run, execute, interpret or otherwise perform the instructions of signal processor application 840-1 stored in computer readable storage media 812. Execution of the signal processor application 840-1 produces processing functionality in processor 813. In other words, the signal processor process 840-2 associated with processor 813 represents one or more aspects of executing signal processor application 840-1 within or upon the processor 813 in the computer system 800.

Those skilled in the art will understand that the computer system 800 can include other processes and/or software and hardware components, such as an operating system or other software that controls allocation and use of hardware processing resources to execute signal processor application 840-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, smartphone, tablet, video game console, handheld video game device, a peripheral device such as a switch, modem, router, or, in general, any type of computing or electronic device.

Functionality supported by the different resources will now be discussed via flowcharts in FIGS. 9-10. Note that the steps in the flowcharts below can be executed in any suitable order.

Figure 9:
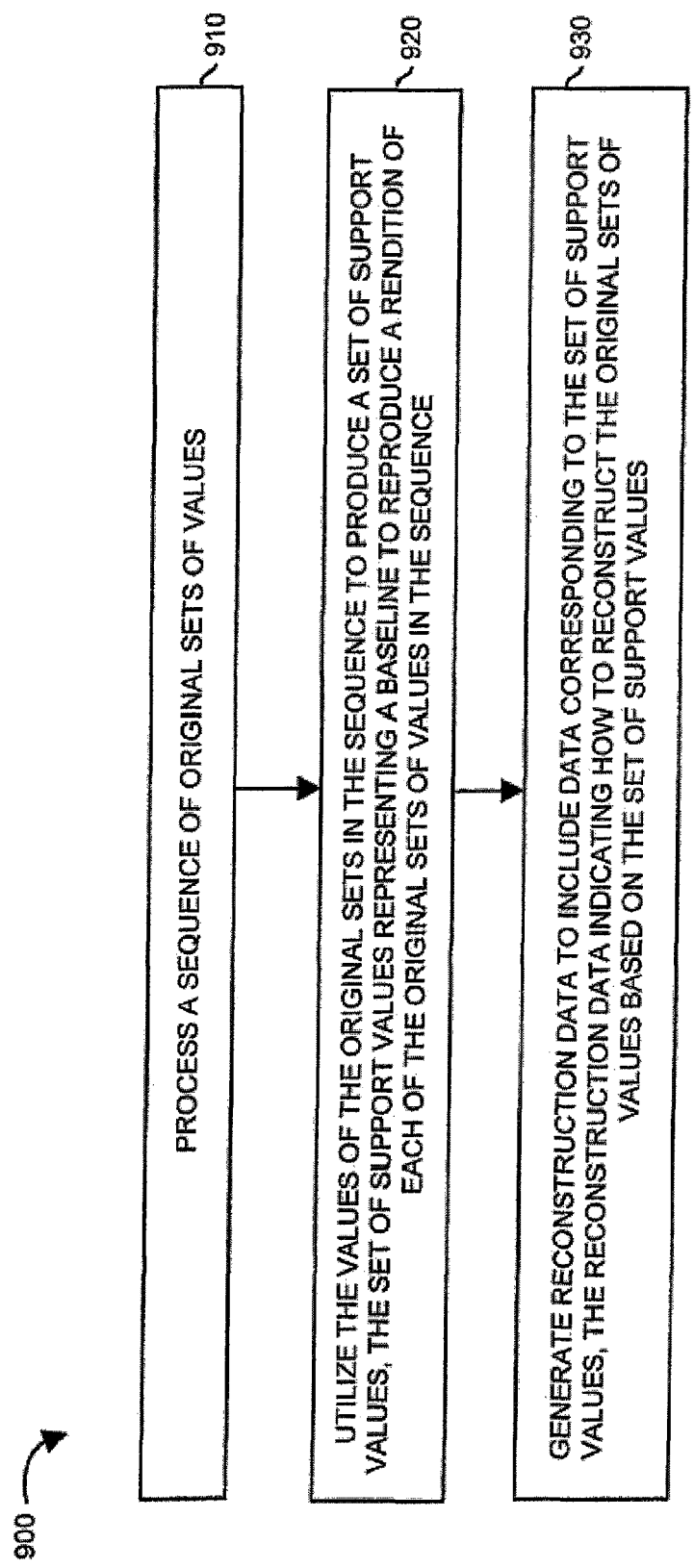
FIGS. 9 and 10 show flow diagrams illustrating processing of support values.

FIG. 9 is a flowchart 900 illustrating an example method according to embodiments illustrated herein. Note that there will be some overlap with respect to concepts as discussed above.

In processing block 910, computer processor hardware processes a sequence of original sets of values (such as, without limitation, a sequence of residual planes).

In processing block 920, computer processor hardware utilizes the values of the original sets in the sequence to produce a set of support values (such as, without limitation, a support plane), the set of support values representing a baseline to reproduce a rendition of each of the original sets of values in the sequence.

In processing block 930, computer processor hardware generates reconstruction data to include data corresponding to the set of support values, the reconstruction data indicating how to reconstruct the original sets of values based on the set of support values.

Figure 10:
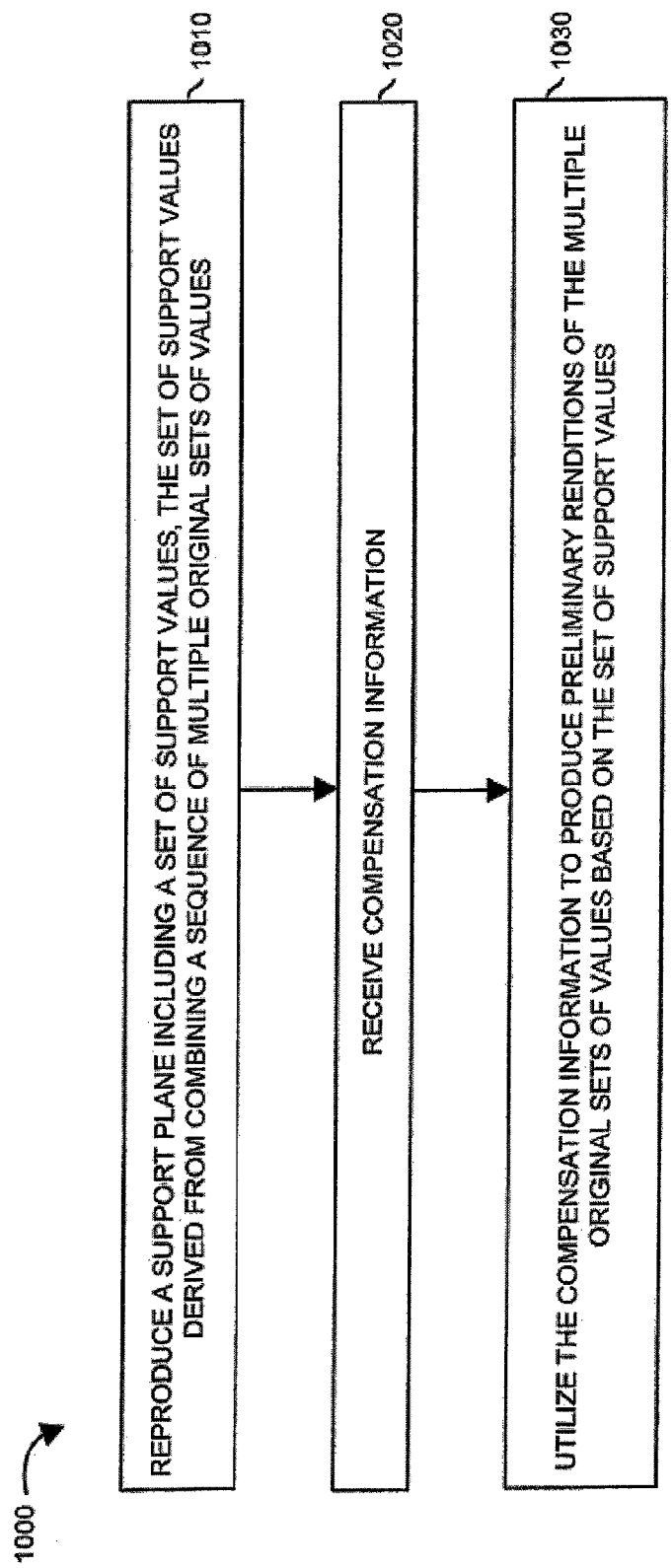

FIG. 10 is a flowchart 1000 illustrating an example method according to embodiments. Note that there will be some overlap with respect to concepts as discussed above.

In processing block 1010, computer processor hardware reproduces a support plane including a set of support values, the set of support values derived from combining a sequence of multiple original sets of values.

In processing block 1020, computer processor hardware receives compensation information.

In processing block 1030, computer processor hardware utilizes the compensation information to produce preliminary renditions of the multiple original sets of values based on the set of support values.

Figure 11:
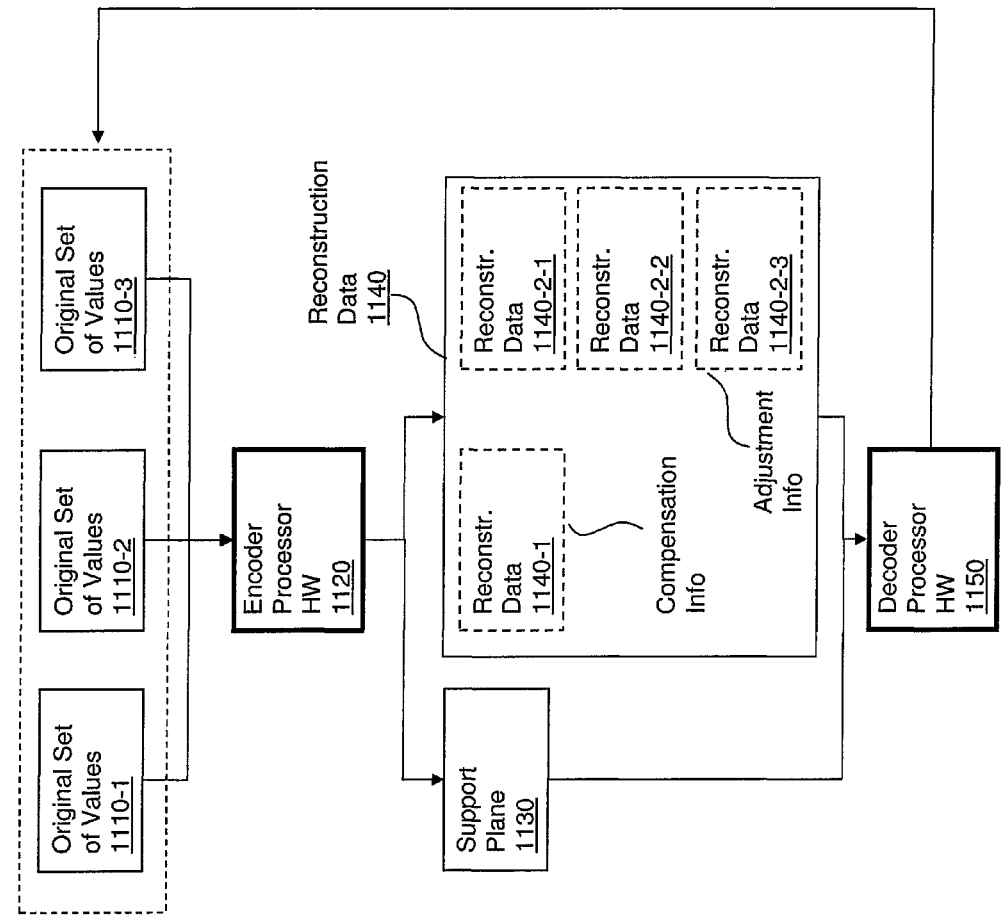
FIG. 11 is an example diagram illustrating encoding and decoding of a sequence of original sets of values.

FIG. 11 is an example diagram illustrating of a processing system according to embodiments herein. The following embodiment is an example of processing as discussed above.

In view of the above embodiments, the encoder processor hardware 1120 combines the element settings of the multiple original planes of display elements to produce the encoded data including support plane 1130 and reconstruction data 1140. For example, encoder processor hardware 1120 processes the sequence of original sets of values 1110-1, 1110-2, 1110-3, etc. The encoder processor hardware 1120 utilizes the sequence of original set of values 1110 to produce a support plane 1130 including a corresponding set of support values. The set of support values represents a baseline to reproduce a rendition of each of the original sets of values 1110 in the sequence. In one embodiment, the encoder processor hardware 1120 generates reconstruction data 1140 to include data corresponding to the set of support values 1110. The reconstruction data such as support plane 1130 and reconstruction data 1140 as produced by encoder processor hardware 1120 indicates how to reconstruct the original sets of values 1110 based on the set of support values in support plane 1130. Without limitation, reconstruction data 1140 can include subsets of reconstruction data comprising compensation information (such as subset of reconstruction data 1140-1), adjustment information to substantially reconstruct each of the original sets of values, etc.

In one embodiment, for each respective original set of values 1110-$i$ in the sequence, the encoder processor hardware 1120 produces a corresponding portion of the reconstruction data (such as a subset of reconstruction data 1140-2-$i$) based on the respective original set of values and the set of support values. As an example, the encoder processor hardware 1120 produces reconstruction data indicates how to use the support plane 1130 as a basis to reproduce each of the original sets of values 1110.

For example, in one embodiment, the encoder processor hardware derives a preliminary rendition of a given original set of values (such as original set of values 1110-1) in the sequence based at least in part on the set of support values in support plane 1130. The encoder processor hardware 1120 produces the reconstruction data 1140 to include a set of residual values for original set of values 1110-1. The set of residual values in reconstruction data 1140 represents differences between the given original set of values 1110-1 and the preliminary rendition of the given original set of values. The encoder processor hardware stores the set of residual values as part of the reconstruction data associated with original set of value 1110-1. In one embodiment, the residual values associated with original set of value 1110-1 represents adjustment values indicating how to modify the preliminary rendition of original set of value 1110-1 to produce a final rendition of the given original set of values.

By way of a non-limiting example, the encoder processor hardware can be configured to produce compensation information (such as, without limitation, motion compensation information and/or equalization information) indicating how to derive the preliminary rendition of the given original set of values 1110-1 based on support plane 1130 such as a set of support values. The encoder processor hardware 1120 can be configured to store the compensation information as part of the reconstruction data 1140.

As shown, the decoder processing hardware 1120 can be configured to process the support plane 1130 and reconstruction data 1140 to reproduce renditions of the original sets of values 1110-1. As discussed herein, the original set of values 1110 can represent a plane of display elements such as an image, or image data, or residual data pertaining to the reconstruction of an image. As discussed herein, such plane is intended with the broader meaning of "hyperplane", i.e., can have one, two, three or more dimensions.

In yet further example embodiments, each of the original sets of values 1110 (or plane of elements) represents a group of adjustment values (each element can be an adjustment value) to apply to a preliminary rendition of a signal at a first level of quality to reproduce a target rendition of the signal. The preliminary rendition of the signal at the first level of quality can be produced based at least in part on processing a rendition of the signal at a second level of quality. The second level of quality can be lower than the first level of quality. Additional details of upsampling a signal and applying residual data to refine the upsampled signal at different levels of quality is discussed in related applications as incorporated herein by reference.

As previously discussed, in one embodiment, the set of support values in support plane 1130 can represents a different sized region of display elements than a region represented by each of the original sets of values in the sequence. In other words, the support plane represents a larger region of coverage than a coverage associated with each of the original sets of values.

Figure 12:
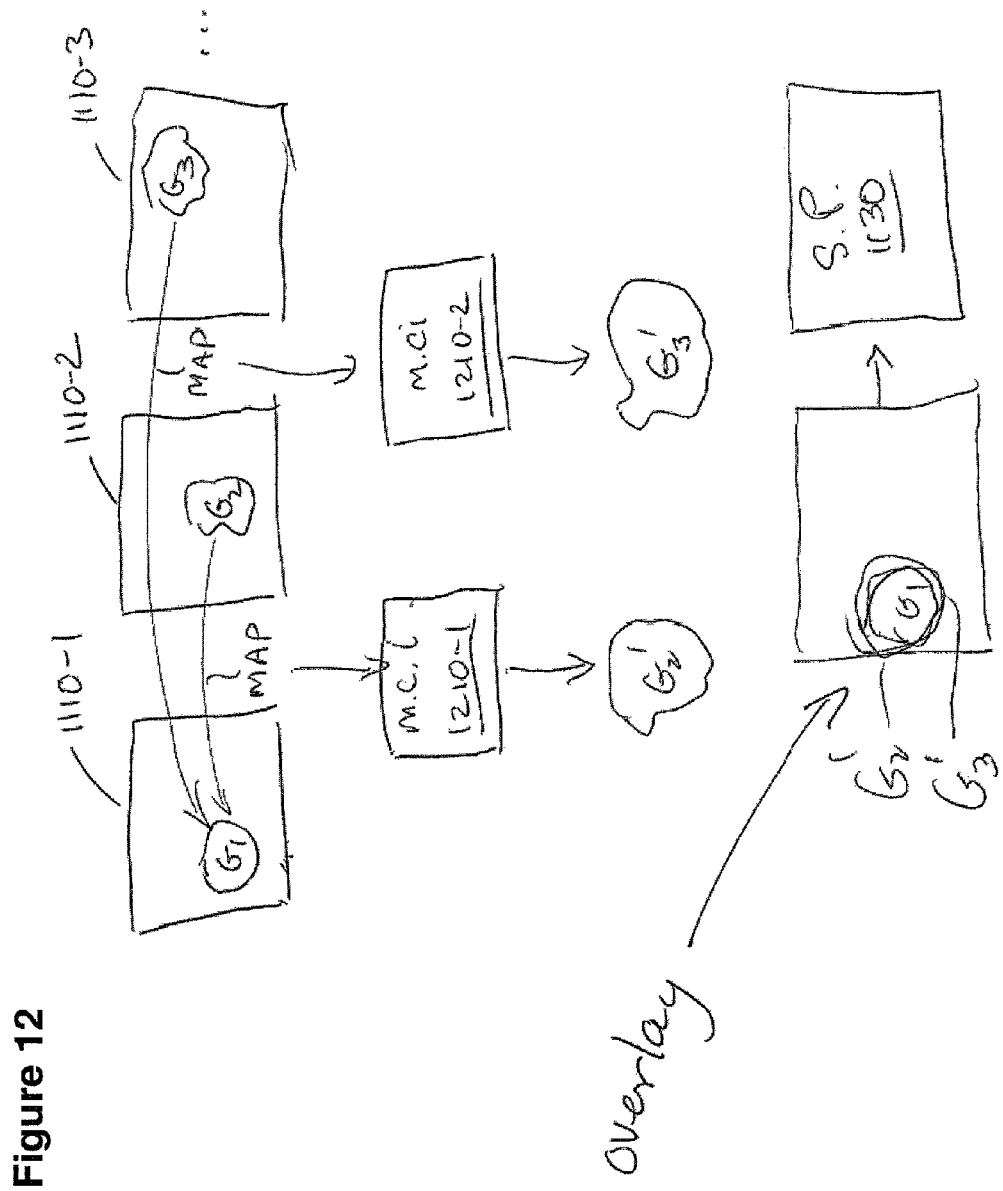
FIG. 12 is an example diagram illustrating encoding based on support plane information.

FIG. 12 is an example diagram illustrating generation and use of a support plane and reconstruction data according to embodiments herein.

In one non-limiting example embodiment, the encoder processor hardware 1120 produces the set of support values in the support plane 1130. For example, in one embodiment, the encoder processor hardware 1120 analyzes setting information associated with the sequence of original sets of values 1110 (collectively, original set of values 1110-1, set of values 1110-2, set of values 1110-3, . . . ). Assume in this example that the encoder processor hardware 1120 identifies a first group of elements G1 in original set of values 1110-1. The group of elements G1 can be display information associated with a moving object. Each of the original sets of values 1110 can be defined based on a common coordinate system as the original sets of values can represent display element information associated with multiple display elements on a display screen (i.e., with a given location within the given original set of values).

As shown, the group of elements present in the original set of values 1110-1 is associated with a first location in the first original set of values 1110-1. In addition to identifying the first group G1 of elements in set of values 1110-1, the encoder processor hardware 1120 identifies a group of elements G2. The second group of elements G2 is associated with a rendition of the object present in the second original set of values 1110-2. The second group of elements G2 is associated with a second location (e.g., location in original sets of values 1110-2. In one embodiment, the encoder processor hardware 1120 detects that the display elements in G1 and display elements in G2 are related. The encoder processor hardware 1120 maps the second group of elements G2 to the first group of elements G1. In accordance with further embodiments, the encoder processor hardware 1120 generating motion compensation information 1210-1 mapping the second group of elements G2 to the first group of elements G1. As mentioned, mapping can include producing a set of coefficients or matrix 755-1. In one embodiment, the motion compensation information 1210-1 may approximate how to produce a rendition of G2 with respect to G1 in the original set of values 1110-1.

In one embodiment, the encoder processor hardware 1120 utilizes the motion compensation information 1210-1 to produce a rendition G2' (of the second group of elements G2) as an overlay with respect to the first group of elements G1 in original set of values 1110-1. The encoder processor hardware 1120 utilizes a combination of the first group of elements G1 and the rendition G2' of the second group of elements to derive settings for a corresponding portion of the set of support values in support plane 1130. Accordingly, the support plane 1130 can be derived based on settings associated with group G1 and G2.

In accordance with further embodiments, the encoder processor hardware 1120 can be configured to produce the support plane based on any number of suitable original sets of values. In this example, assume that the encoder processor hardware 1120 produces the support plane 1130 based on groups of elements G1, G2, and G3. In such an instance, the encoder processor hardware 1120 identifies a third group of elements G3 related to G1 and G2. The third group of elements G3 present in a third original set of values 1110-3 is present at a third location. The encoder processor hardware 1120 maps the third group of elements to the first group of elements G1 in original set of values 1110-1. The encoder processor hardware 1120 generates second motion compensation information 1210-2 mapping the third group of elements G2 to the first group of elements G1. The encoder processor hardware 1120 utilizes the second motion compensation information 1210-2 to produce a rendition G3' of the third group of elements G3 as an overlay with respect to the first group of elements G1. In one embodiment, the motion compensation information 1210-2 may approximate how to produce a rendition G3' (of group G3) with respect to group G1.

Subsequent to mapping and overlaying renditions G2' and G3' with respect to the group G1 in original set of values 1110-1, the encoder processor hardware 1120 utilizes a combination of the first group of elements G1, the rendition of the second group of elements G2', and the rendition of the third group of elements G3' to derive settings for a corresponding portion of the set of support values in support plane 1130. The portion will serve as a basis to reproduce each of the groupings G1, G2, and G3 when reproducing the original sets of values 1110-1, 1110-2, and 1110-3.

As discussed herein, the encoder processor hardware 1120 can execute any suitable operations such as i) weighted average, ii) arithmetic mean, iii) median, and iv) mode to generate the support plane 1130.

In accordance with further embodiments, in response to detecting that a difference between an element setting in the rendition of the second group of elements G2 and a corresponding element in the first group of elements G1 is greater than a threshold value, the encoder processor hardware 1120 assigns a default value to a corresponding element in the support plane 1130. This process can be repeated such that multiple element in the support plane 1130 are assigned a default value.

Generation of motion compensation information mapping the second group G2 of elements to the first group of elements G1 can include execution of at least one operation selected from the group consisting of: i) resampling calculations, ii) motion-compensation operations, and iii) equalization operations.

In one embodiment, settings for the first group of elements G2 in the first original set of values 1110-1 is substantially equal to settings of corresponding elements at the same coordinates in the set of support values support plane 1130. Sine the object associated with G2 may have moved from one plane to the next, the settings for the second group of elements G2 in the second original set of values 1110-2 can be substantially different than settings of corresponding elements at the same coordinates in the set of support values of support plane 1130. Recall that group G2 maps to a different location in original set of values 1110-1 to leverage use of data that is already used to reproduce group G1. The similarity of settings associated with elements in G1, G2, and G3 makes the leveraging possible.

In accordance with yet further embodiments, the encoder processor hardware 1120 can be configured to produce a plane of motion compensation settings for the second original set of values 1110-2. The plane of motion compensation settings 1210-1 can indicate that a first group of elements G1 resides in a motion zone in which settings of elements in the first group G1 are derivable at least in part based on the settings of support values in support plane 1130. The amount of motion can be small if the support plane includes a rendition of the groupings G1, G2, and G3 in the location of G1 in original set of values 1110-1.

The encoder processor hardware 1120 can be configured to produce a portion of the plane of motion compensation settings 1210-1 for the second original set of values 111-2 to a default setting. The portion can reside outside a so-called motion zone. The default setting can indicate that a corresponding second group of elements G2 in the second original set of values 1110-2 is not to be derived from the set of support values in support plane 1130.

Note that the support plane 1130 can be used to determine settings of elements in original sets of values not found in the sequence used to create the support plane 1130. For example, the decoder processing hardware 1150 can be configured to utilize the set of support values in support plane 1130 as a baseline to reconstruct an original set of values that is not included in the sequence.

In accordance with yet further embodiments, the encoder processor hardware 1120 can be configured to produce a second portion of the reconstruction data to include residual reconstruction data corresponding to one of the original sets of values in the sequence. The encoder processor hardware 1120 generates sync-marking information to indicate a location of the second portion in the reconstruction data. The markings can indicate boundaries such as a being and end location of the residual reconstruction data for a respective image. If desired, for security purposes, the residual reconstruction data can be encrypted.

The encoder processor hardware 1120 can be configured to generate a portion of the reconstruction data 1140 to indicate compensation operations to perform on the set of support values in support plane 1130 in order to produce preliminary renditions of the set of original set of values 1110.

In still further embodiments, the encoder processor hardware 1120 can be configured to process a set of residual values based at least in part on a rendition of a signal at a lower level of quality. The encoder processor hardware 1120 processes a portion of residual values in the set of residual values, the portion of residual values corresponding to adjustments to be made to a first rendition of the signal at a first level of quality. The encoder processor hardware 1120 can be configured to produce a set of transformed residual values. The transformed residuals can be based at least in part on the portion of residual values and on a rendition of the signal at a second level of quality, the second level of quality lower than the first level of quality.

In yet further embodiments, the set of residual values for a respective original set of values can be is encoded into distinct subsets. In such an instance, the encoder processor hardware 1120 processes the set of residual values to produce a plurality of subsets of residual values. The encoder processor hardware 1120 then individually encodes each subset (such as a tile) of residual values, producing corresponding subsets of reconstruction data that can each be decoded independently of the other subsets in the plurality of subsets.

In accordance with further embodiments, the sequence of original sets of values 1110 can be a first sequence of multiple sequences of original sets of values. The encoder processor hardware 1120 can be configured to processes at least the first sequence of original sets of values and a second sequence of original sets of values. In such an embodiment, the encoder processor hardware 1120 processes the first sequence of original sets of values 1110 and utilizes the values of the multiple sets in the first sequence to produce a first set of support values. The first set of support values is a baseline to substantially reproduce each of the original sets of values in the first sequence.

The encoder processor hardware 1120 processes a second sequence of original sets of values and utilize the values of the multiple sets in the first sequence to produce a second set of support values in support plane 1130. The second set of support values is a baseline to substantially reproduce each of the original sets of values in the second sequence. The encoder processor hardware 1120 processes any additional nth sequence (n can be zero meaning there are no additional sequences) of sets of absolute values. The encoder processor hardware 1120 utilizes the values of the multiple sets in the sequence to produce an nth set of support values. The nth set of support values being a baseline to substantially reproduce each of the original sets of values in the nth sequence. The encoder processor hardware 1120 processes the generated sets of support values and utilizes the values of the multiple sets of support values to produce a higher-order set of support values, the higher-order set of support values being a baseline to substantially reproduce each of the generated sets of support values. The encoder processor hardware 1120 further generates higher-order support reconstruction data corresponding to the higher-order set of support values. The encoder processor hardware 1120 also can be configured to generate support reconstruction data corresponding to each of the sets of support values.

In yet further embodiments, the set of support values in support plane 1130 can be encoded according to a tiered hierarchy of levels of quality as previously discussed. In such an instance, the encoder processor hardware 1120 processes a rendition of the set of support values at a lower level of quality; produces, based at least in part on the rendition of the set of support values at the lower level of quality, a preliminary rendition of the set of support values; produces a set of support plane residual values, the support plane residual values corresponding to differences between the set of support values and the preliminary rendition of the set of support values; and produces support plane reconstruction data corresponding to the support plane residual values.

Referring again to FIG. 12, the decoder processing hardware 1150 can be configured to reproduce a support plane 1130 including a set of support values. As previously discussed, the set of support values for the support plane 1130 can be derived by encoder processor hardware 1120 that combines a sequence of multiple original sets of values. The encoder processor hardware 1120 receives compensation information from reconstruction data 1140. The decoder processing hardware 1150 utilizes the compensation information to produce preliminary renditions of the multiple original sets of values based on the set of support values.

Note that the following discussion also follows FIG. 7B.

As a more specific example, the decoder processing hardware 1150 can be configured to receive a first set of compensation information 1210-1 and a second set of compensation information 1210-2. The decoder processing hardware 1150 applies the first compensation information 1210-1 to the set of values in support plane 1130 to produce a preliminary rendition of a first original set of values 1110-1. The decoder processing hardware 1150 applies the second compensation information 1210-2 to the set of values in support plane 1130 to produce a preliminary rendition of second original set of values 1110-2.

Recall that the motion compensation information 1210-1 may only approximate a mapping of the elements in the group G2 to corresponding elements in group G1. The motion compensation information 1210-2 may only approximate a mapping of the elements in the group G3 to corresponding elements in group G1.

In one embodiment, the decoder processing hardware 1150 receives first zone information as part of motion compensation information 1210-1. The first zone information specifies which elements (such as group G2) in the original set of values 1110-2 belong to a first zone in the original set of values 1110-2. When applying the motion compensation information 1210-1, the decoder processing hardware 1150, for each respective element in the first zone: identifies a respective location in the support plane 1130 for the respective element and derives a setting of the respective element in the first zone based on a grouping of elements in a vicinity of the respective location in the support plane 1130. Details of using motion information and corresponding matrix or set of coefficients are discussed in the related applications.

The decoder processing hardware 1150 receives second zone information. The second zone information is received as part of the compensation information 1210-2. The second zone information specifies which elements in the original set of values 1210-2 belong to a second zone. The second zone is present in the original set of values 1210-2. The decoder processing hardware 1150 applies the second compensation information as follows, for each corresponding element in the second zone: the decoder processing hardware 1150 identifies a corresponding location in the support plane 1130 and derives a setting of the corresponding element in the second zone based on a grouping of elements in a vicinity of the corresponding location (for the corresponding element) in the support plane 1130. As mentioned, details of using motion information and corresponding matrix or set of coefficients are discussed in the related applications.

Based on application of motion compensation information 1210, the decoder processing hardware 1150 produces a preliminary rendition of the original set of values 1210-1 using the derived settings of the respective elements. The decoder processing hardware 1150 produces a preliminary rendition of the original set of values using the derived settings of the corresponding elements.

The decoder processing hardware 1150 receives residual reconstruction data specifying first adjustments. The decoder processing hardware 1150 applies the first adjustments to the preliminary rendition of the first original set of values. The decoder processing hardware 1150 applies the first adjustments to the preliminary rendition of the original set of values 1110-2 to reproduce a rendition of the original set of values 1110-2.

The decoder processing hardware 1150 receives residual reconstruction data specifying second adjustments. The decoder processing hardware 1150 applies the second adjustments to the preliminary rendition of the original set of values 1110-3. The decoder processing hardware 1150 then applies the second adjustments to the preliminary rendition of the original set of values 1110-3 to reproduce an exact or lossy rendition of the original set of values 1110-3.

In accordance with further embodiments, the decoder processing hardware 1150 can be configured to process the reconstruction data 1140 to reproduce the support plane 1130 and the set of values. This processing can include execution of at least one operation selected from a group consisting of: i) resampling calculations, ii) motion-compensation operations, iii) equalization operations. In one embodiment, the reconstruction data 1140 specifies the at least one operation to reproduce the support plane 1130 and the set of values.

As previously discussed, the motion compensation information 1210 (also part of the reconstruction data 1140) can be configured to specify operations including: offset, scaling, and rotation of a respective group of display elements with respect to the rendition of the grouping G' in the support plane 1130.

In one embodiment, the support plane 1130 includes a greater number of display elements than a number of display elements associated with each of the original set of values. In alternative embodiments, the support plane can comprise a fewer number of display elements than a number of display elements associated with each of the original sets of values 1110.

In one embodiment, each of the original set of values 1110 represents (residual data) or adjustments to apply to a preliminary rendition of a signal at a first level of quality, the preliminary rendition of the signal produced based at least in part on a rendition of the signal at a second level of quality, the second level of quality being lower than the first level of quality. As an example, one or more of the related applications incorporated herein by reference is directed to upsampling a respective signal from a lower level of quality to a higher level of quality. Residual data is applied to the upsampled signal to produce a refined signal for the level of quality. In one embodiment, each of the original set of values represents residual data that is used at a respective level of quality to refine the respective signal.

Additional Encoder Embodiments

In view of the embodiments as discussed herein, embodiments herein include embodiment 1. Embodiment 1 is a method for encoding a sequence of original sets of values, wherein the method comprises: via computer processing hardware: processing the sequence of sets of values and utilizing the values of the multiple sets in the sequence to produce a first set of support values, wherein said first set of support values are determined so as to form a baseline to substantially reproduce each of the original sets of values in the sequence; generating reconstruction data corresponding to said first set of support values.

Embodiment 2 is a method as in embodiment 1, wherein for at least one given set of values in said sequence of original sets of values the method further comprises: producing additional reconstruction data based at least in part on said given original set of values and on said first set of support values.

Embodiment 3 is a method as in embodiment 2, wherein said additional reconstruction data comprises relative residual reconstruction data, the method comprising: determining a second set of reference values based at least in part on said first set of support values; determining a third set of residual values, said third set of residual values corresponding to differences between the given set of values and said second set of reference values; determining relative residual reconstruction data corresponding to said third set of residual values; at least one of storing and transmitting to a decoder at least said relative residual reconstruction data.

Embodiment 4 is a method as in embodiment 3, wherein determining said second set of reference values comprises: processing descriptive information corresponding to said given original set of values; processing said first set of support values based on said descriptive information, producing said second set of reference values.

Embodiment 5 is method as in embodiment 2, wherein determining said first set of support values comprises: receiving descriptive information corresponding to a given set of values in the sequence of original sets of values; processing said given set of values base on said descriptive information, determining a compensated set of values; determining the first set of support values based at least in part on said compensated set of values.

Embodiment 6 is a method as in embodiment 5, wherein determining the value of at least one element of said first set of support values comprises: determining a subset of correlated elements by correlating corresponding elements belonging to two or more compensated sets of values, each of said compensated sets of values corresponding to a set of values in the sequence of original sets of values; performing a combination of the elements in said subset of correlated elements to obtain the value for said at least one element.

Embodiment 7 is a method as in embodiment 6, wherein said combination is computed by performing an operation selected from a set of operations that comprise weighted average, arithmetic mean, median, mode.

Embodiment 8 is a method as in embodiment 6, wherein if a difference between two of said correlated elements is higher than a threshold, said element of said support plane is assigned a default value.

Embodiment 9 is a method as in embodiment 4, wherein processing said first set of support values to produce said second set of reference values comprises at least one operation selected from a set of operations comprising resampling calculations, motion-compensation operations, equalization operations.

Embodiment 10 is a method as in embodiment 5, wherein processing a set of values in the sequence of original sets of values to produce a compensated set of values comprises at least one operation selected from a set of operations comprising resampling calculations, motion-compensation operations, equalization operations.

Embodiment 11 is a method as in embodiment 5, wherein, for at least one given set of values in the sequence of original sets of values, the compensated set of values corresponding to said given set of values is substantially equal to the given set of values.

Embodiment 12 is a method as in embodiment 5, wherein processing a given set of values to produce a compensated set of values comprises assigning a default value to some of the elements of the compensated set of values, and wherein said elements with default values are not utilized in generating the first set of support values.

Embodiment 13 is a method as in embodiment 1, wherein the first set of support values calculated for a sequence of original sets of values is used as a baseline to reconstruct a set of values that does not belong to said sequence of original sets of values.

Embodiment 14 is a method as in embodiment 2, wherein said additional reconstruction data is assigned synch-marking information.

Embodiment 15 is a method as in embodiment 3, wherein said first set of support values comprises a number of elements that is different from the number of elements contained in each of the sets of values in the sequence of original sets of values.

Embodiment 16 is a method as in embodiment 3, wherein each of said original sets of values corresponds to adjustments to perform to a preliminary rendition of a signal at a first level of quality, said preliminary rendition produced based at least in part on a rendition of the signal at a second level of quality, the second level of quality being lower than the first level of quality.

Embodiment 17 is a method as in embodiment 3, wherein said additional reconstruction data comprises compensation reconstruction data, the method comprising: generating data corresponding to operations to perform on the first set of support values in order to produce the second set of reference values corresponding to said given original set of values; generating compensation reconstruction data corresponding to said data.

Embodiment is a method as in embodiment 3, wherein said third set of residual values is further processed based at least in part on a rendition of the signal at a lower level of quality, the method comprising: processing residual values belonging to said third set of residual values, said residual values corresponding to adjustments to be made to a first rendition of a signal at a first level of quality; and producing a fourth set of transformed residual values, said transformed residuals being based at least in part on said residual values and on a rendition of the signal at a second level of quality, the second level of quality lower than the first level of quality.

Embodiment 19 is a method as in embodiment 3, wherein said third set of residual values is encoded into distinct subsets, the method comprising: processing said third set of residual values, producing a plurality of subsets of residual values; and individually encoding each subset of residual values, producing corresponding subsets of reconstruction data that can each be decoded independently of the other subsets in the plurality of subsets.

Embodiment 20 is a method as in embodiment 1, wherein the encoder processes at least a first sequence of original sets of values and a second sequence of original sets of values, the method comprising: processing the first sequence of original sets of values and utilizing the values of the multiple sets in the first sequence to produce a first set of support values, said first set of support values being a baseline to substantially reproduce each of the original sets of values in the first sequence; processing the second sequence of original sets of values and utilizing the values of the multiple sets in the first sequence to produce a second set of support values, said second set of support values being a baseline to substantially reproduce each of the original sets of values in the second sequence; processing any additional nth sequence of sets of absolute values and utilizing the values of the multiple sets in the sequence to produce an nth set of support values, said nth set of support values being a baseline to substantially reproduce each of the original sets of values in the nth sequence; processing the generated sets of support values and utilizing the values of the multiple sets of support values to produce a higher-order set of support values, said higher-order set of support values being a baseline to substantially reproduce each of the generated sets of support values; generating higher-order support reconstruction data corresponding to said higher-order set of support values; and generating support reconstruction data corresponding to each of said sets of support values. The value n can be set to zero.

Embodiment 21 is a method as in embodiment 1, wherein the first set of support values is encoded according to a tiered hierarchy of levels of quality, the method comprising: processing a rendition of the set of support values at a lower level of quality;

producing, based at least in part on said rendition of the set of support values at a lower level of quality, a preliminary rendition of the set of support values; producing a set of support plane residual values, said support plane residual values corresponding to differences between said set of support values and said preliminary rendition of the set of support values; producing support plane reconstruction data corresponding to said support plane residual values.

Additional Decoder Embodiments

In view of the embodiments as discussed herein, embodiments herein include embodiment 22. Embodiment 22 is a method for decoding a sequence of reconstructed sets of values, wherein the method comprises: via computer processing hardware: processing a first set of reconstruction data, producing a first set of reconstructed support values; processing a second set of reconstruction data, producing a sequence of sets of reconstructed residual values, each of said sets of reconstructed residual values corresponding to a set of values in the sequence of reconstructed sets of values; combining each of said sets of reconstructed residual values with a corresponding set of reconstructed reference values based at least in part on said first set of reconstructed support values, producing the sequence of reconstructed sets of values.

Embodiment 23 is a method as in embodiment 22, wherein producing each given set in said sequence of reconstructed sets of values comprises: producing a set of reconstructed reference values based at least in part on said first set of reconstructed support values; and combining said set of reconstructed reference values with a corresponding set of reconstructed residual values.

Embodiment 24 is a method as in embodiment 23, wherein producing said set of reconstructed reference values comprises: processing descriptive information corresponding to said given set in the sequence of reconstructed sets of values; and processing said first set of reconstructed support values based on said descriptive information, producing said set of reconstructed reference values.

Embodiment 25 is a method as in embodiment 24, wherein processing said first set of reconstructed support values to produce a set of reconstructed reference values comprises performing at least one operation selected in a set comprising resampling calculations, motion-compensation operations, equalization operations, wherein said at least one operation is based at least in part on said descriptive information.

Embodiment 26 is a method as in embodiment 25, wherein motion-compensation operations comprise selecting a portion of the support plane and applying a movement, said movement including at least one of the following types of movement: an offset, a scaling, a rotation.

Embodiment 27 is a method as in embodiment 24, wherein producing a given set of reconstructed reference values further comprises, for each given element in the given set: receiving descriptive information indicating a corresponding descriptive value for the given element; based at least in part on said descriptive value, determining a grouping of elements in the first set of support values corresponding to the given element; and determining, based at least in part on the values of the elements in the grouping, the value of the given element.

Embodiment 28 is a method as in embodiment 22, wherein said first set of reconstructed support values comprises a number of elements that is higher than the number of elements contained in each of the sets of values in the sequence of reconstructed sets of values.

Embodiment 29 is a method as in embodiment 22, wherein said first set of reconstructed support values comprises a number of elements that is lower than the number of elements contained in each of the sets of values in the sequence of reconstructed sets of values.

Embodiment 30 is a method as in embodiment 22, wherein each of said reconstructed sets of values corresponds to adjustments to perform to a preliminary rendition of a signal at a first level of quality, said preliminary rendition being produced based at least in part on a rendition of the signal at a second level of quality, the second level of quality being lower than the first level of quality.

Embodiment 31 is a method as in embodiment 30, wherein processing said second set of reconstruction data to produce a sequence of sets of reconstructed residual values comprises, for each given set of said sequence of sets of reconstructed residual values: producing a first set of transformed values; processing transformed values and a rendition of the signal at the second level of quality, the second level of quality lower than the first level of quality, determining said given set of reconstructed residual values.

Embodiment 32 is a method as in embodiment 22, wherein said first set of reconstructed support values is produced based at least in part on a set of higher-order reconstructed support values, the method comprising: processing a first set of reconstruction data, producing a set of higher-order reconstructed support values; processing a second set of reconstruction data, producing a set of adjustment values; and determining said first set of reconstructed support values by combining the set of adjustment values with a set of higher-order support plane reference values generated based at least in part on said set of higher-order reconstructed support values.

Embodiment 33 is a method as in embodiment 22, wherein a plurality of sets of reconstructed support values corresponding to distinct subsequences of reconstructed sets of values is decoded according to a same set of higher-order reconstructed support values, the method comprising, for each given set of reconstructed support values in said plurality of sets of reconstructed support values: processing a first set of data, producing a first set of higher-order reconstructed support values; processing a second set of data, producing a second set of adjustment values; processing said first set of higher-order reconstructed support values, producing a third set of reference values; and combining said second set of adjustment values with said third set of reference values, producing the given set of reconstructed support values.

Embodiment 34 is a method as in embodiment 22, wherein the first set of reconstructed support values is decoded according to a tiered hierarchy of levels of quality, the method comprising: processing a rendition of the set of reconstructed support values at a lower level of quality; producing, based at least in part on said rendition of the set of reconstructed support values at a lower level of quality, a preliminary rendition of the set of reconstructed support values; processing a set of encoded data to determine a set of adjustment values; and combining said adjustment values with said preliminary rendition of the set of reconstructed support values, producing said first set of reconstructed support values.

Embodiment 35 is a method as in embodiment 22, wherein the decoder receives reconstruction data corresponding only to specific spatial portions of the reconstructed sets of values and consequently reconstructs only a sequence of portions of the reconstructed sets of values, the method comprising: processing a first set of reconstruction data, producing a first set of reconstructed support values; processing a second set of reconstruction data, producing a sequence of sets of residual values, each of said sets of residual values corresponding to a portion of a set of values in the sequence of reconstructed sets of values; combining each of said sets of residual values with a corresponding set of reference values generated based at least in part on said first set of reconstructed support values, producing a sequence of portions of reconstructed sets of values.

Embodiment 36 is a method as in embodiment 22, wherein each of said sets of values in the sequence of reconstructed sets of values is decoded independently of the other sets in the sequence of sets.

Embodiment 37 is a method as in embodiment 23, wherein the set of reconstructed reference values corresponding to any of the sets of values in the sequence of reconstructed sets of values is determined before having determined any of the sets of values in the sequence of reconstructed sets of values.

Embodiment 38 is a method as in embodiment 22, wherein each of said sets of values in the sequence of reconstructed sets of values corresponds to an image.

Embodiment 39 is a method as in embodiment 22, wherein each of said sets of values in the sequence of reconstructed sets of values corresponds to a volumetric image.

Note again that techniques herein are well suited for encoding and decoding in hierarchical systems. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, settings, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "producing", "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via computer processor hardware, performing image-processing operations of:
processing a sequence of original sets of image values, each of the original sets representing a different video frame in the sequence;
utilizing the sequence of original sets of image values to produce a set of support values, the set of support values being a temporal combination of the original sets of image values and representing an image baseline from which to reproduce a rendition of each of the original sets of image values in the sequence; and
generating reconstruction data to include data corresponding to the set of support values, the reconstruction data indicating how to reconstruct the original sets of image values based on the set of support values;
wherein the original sets of image values includes a first image frame and a second image frame, the first image frame encoded to indicate a first object and a second object, the second image frame encoded to indicate the second object and a third object, the first object absent from the second image frame, the third object absent from the first image frame;
wherein the set of support values is a single image frame defining attributes of the first object, the second object, and the third object, the method further comprising:
producing the reconstruction data to indicate how to: i) reconstruct the first image frame including a rendition of the first object and a rendition of the second object from the set of support values, and ii) reconstruct the second image frame including a rendition of the second object and a rendition of the third object from the set of support values.

2. The method as in claim 1 further comprising:
for a given original set of image values in the sequence:
producing a first portion of the reconstruction data based on the given original set of image values and the set of support values.

3. The method as in claim 1 further comprising:
deriving a preliminary rendition of a given original set of image values in the sequence based at least in part on the set of support values;
producing a set of residual values, the set of residual values representing differences between the given original set of image values and the preliminary rendition of the given original set of image values; and
storing the set of residual values as part of the reconstruction data, the residual values representing adjustment values indicating how to modify the preliminary rendition to produce a final rendition of the given original set of image values.

4. The method as in claim 3 further comprising:
producing motion compensation information indicating how to derive the preliminary rendition of the given original set of image values based on the set of support values; and
storing the motion compensation information as part of the reconstruction data.

5. The method as in claim 1, wherein producing the set of support values comprises:
analyzing setting information associated with the sequence of original sets of image values;
identifying a first group of elements, the first group of elements present in a first original set of image values in the sequence, the first group of elements associated with a first location in the first original set of image values;
identifying a second group of elements, the second group of elements present in a second original set of image values in the sequence, the second group of elements associated with a second location in the second original set of image values in the sequence;
mapping the second group of elements to the first group of elements;
generating motion compensation information mapping the second group of elements to the first group of elements;
utilizing the motion compensation information to produce a rendition of the second group of elements as an overlay with respect to the first group of elements; and
utilizing a combination of the first group of elements and the rendition of the second group of elements to derive settings for a corresponding portion of the set of support values.

6. The method as in claim 5, wherein the motion compensation information is first motion compensation information; and
wherein producing the set of support values further comprises:
identifying a third group of elements, the third group of elements present in a third original set of image values in the sequence, the third group of elements associated with a third location in the third original set of image values;
mapping the third group of elements to the first group of elements;
generating second motion compensation information mapping the third group of elements to the first group of elements;
utilizing the second motion compensation information to produce a rendition of the third group of elements as an overlay with respect to the first group of elements; and
utilizing a combination of the first group of elements, the rendition of the second group of elements, and the rendition of the third group of elements to derive settings for a corresponding portion of the set of support values.

7. The method as in claim 6, wherein utilizing the combination to derive the settings for the corresponding portion is-includes executing an operation selected from the group consisting of:
i) weighted average,
ii) arithmetic mean,
iii) median, and
iv) mode.

8. The method as in claim 5, wherein the set of support values represents a support plane, the method further comprising:
in response to detecting that a difference between an element setting in the rendition of the second group of elements and a corresponding element in the first group of elements is greater than a threshold value, assigning a default value to a corresponding element in the support plane.

9. The method as in claim 1 further comprising:
applying operations to the set of support values to produce a set of reference values, the operations selected from the group consisting of:
i) resampling calculations,
ii) motion-compensation operations, and
iii) equalization operations.

10. The method as in claim 5, wherein settings for the first group of elements in the first original set of image values is substantially equal to settings of corresponding coordinates in the set of support values; and
wherein settings for the second group of elements in the second original set of image values is substantially different than settings of corresponding coordinates in the set of support values.

11. The method as in claim 5 further comprising:
producing a plane of motion compensation settings for the second original set of image values, the plane of motion compensation settings indicating that a first group of elements resides in a motion zone in which settings of elements in the first group are derivable at least in part based on the set of support values; and
producing a portion of the plane of motion compensation settings for the second original set of image values to a default setting, the portion residing outside the motion zone, the default setting indicating that a corresponding second group of elements in the second original set of image values is not to be derived from the set of support values.

12. The method as in claim 1, wherein the set of support values represents a first portion of the reconstruction data, the method further comprising:
producing a second portion of the reconstruction data to include residual reconstruction data corresponding to one of the original sets of image values in the sequence; and
generating synch-marking information to indicate a location of the second portion in the reconstruction data.

13. The method as in claim 1, wherein the set of support values represents a different sized region of display elements than a region represented by each of the original sets of image values.

14. The method as in claim 1, wherein each of said original sets of image values represents a group of adjustment values to apply to a preliminary rendition of a signal at a first level of quality to reproduce a target rendition of the signal, the preliminary rendition of the signal at the first level of quality produced based at least in part on processing a rendition of the signal at a second level of quality, the second level of quality being lower than the first level of quality.

15. The method as in claim 1, wherein generating the reconstruction data includes:
   generating a portion of the reconstruction data to indicate compensation operations to perform on the set of support values in order to produce preliminary renditions of the set of original set of image values.

16. The method as in claim 3 further comprising:
   processing the set of residual values based at least in part on a rendition of a signal at a lower level of quality, the method comprising:
   processing a portion of residual values in the set of residual values, the portion of residual values corresponding to adjustments to be made to a first rendition of the signal at a first level of quality; and
   producing a set of transformed residual values, the transformed residuals being based at least in part on the portion of residual values and on a rendition of the signal at a second level of quality, the second level of quality lower than the first level of quality.

17. The method as in claim 3, wherein the set of residual values is encoded into distinct subsets, the method comprising:
   processing the set of residual values to produce a plurality of subsets of residual values; and
   individually encoding each subset of residual values, producing corresponding subsets of reconstruction data that can each be decoded independently of the other subsets in the plurality of subsets.

18. The method as in claim 1, wherein the sequence is a first sequence;
   wherein encoder processor hardware processes at least the first sequence of original sets of image values and a second sequence of original sets of image values, the method comprising:
   processing the first sequence of original sets of image values and utilizing the values of the multiple sets in the first sequence to produce a first set of support values, the first set of support values being a baseline to substantially reproduce each of the original sets of image values in the first sequence;
   processing the second sequence of original sets of image values and utilizing the values of the multiple sets in the first sequence to produce a second set of support values, the second set of support values being a baseline to substantially reproduce each of the original sets of image values in the second sequence;
   processing any additional $n^{th}$ sequence of sets of absolute values and utilizing the values of the multiple sets in the sequence to produce an $n^{th}$ set of support values, said $n^{th}$ set of support values being a baseline to substantially reproduce each of the original sets of image values in the $n^{th}$ sequence;
   processing the generated sets of support values and utilizing the values of the multiple sets of support values to produce a higher-order set of support values, the higher-order set of support values being a baseline to substantially reproduce each of the generated sets of support values;
   generating higher-order support reconstruction data corresponding to the higher-order set of support values; and
   generating support reconstruction data corresponding to each of the sets of support values.

19. The method as in claim 1, wherein the set of support values is encoded according to a tiered hierarchy of levels of quality, the method comprising:
   processing a rendition of the set of support values at a lower level of quality;
   producing, based at least in part on the rendition of the set of support values at the lower level of quality, a preliminary rendition of the set of support values;
   producing a set of support plane residual values, the support plane residual values corresponding to differences between the set of support values and the preliminary rendition of the set of support values;
   producing support plane reconstruction data corresponding to the support plane residual values.

20. Computer-readable storage hardware having instructions stored thereon, the instructions, when carried out by a processing device, causing the processing device to:
   process a sequence of original sets of image values, each of the original sets representing a different video frame in the sequence;
   utilize the sequence of original sets of image values to produce a set of support values, the set of support values being a temporal combination of the original sets of image values and representing an image baseline from which to reproduce a rendition of each of the original sets of image values in the sequence; and
   generate reconstruction data to include data corresponding to the set of support values, the reconstruction data indicating how to reconstruct the original sets of image values based on the set of support values;
   wherein the original sets of image values includes a first image frame and a second image frame, the first image frame encoded to indicate a first object and a second object, the second image frame encoded to indicate the second object and a third object, the first object absent from the second image frame, the third object absent from the first image frame;
   wherein the set of support values is a single image frame defining attributes of the first object, the second object, and the third object, the processing device further operable to:
   produce the reconstruction data to indicate how to: i) reconstruct the first image frame including a rendition of the first object and a rendition of the second object from the set of support values, and ii) reconstruct the second image frame including a rendition of the second object and a rendition of the third object from the set of support values.

21. A device comprising:
   computer processor hardware;
   a storage unit that stores instructions; and
   an interconnect coupling the computer processor hardware and the storage unit, the computer processor hardware executing the instructions and performing operations of:
   processing a sequence of original sets of image values, each of the original sets representing a different video frame in the sequence;

utilizing the sequence of original sets of image values to produce a set of support values, the set of support values being a temporal combination of the original sets of image values and representing an image baseline from which to reproduce a rendition of each of the original sets of image values in the sequence; and generating reconstruction data to include data corresponding to the set of support values, the reconstruction data indicating how to reconstruct the original sets of image values based on the set of support values;

wherein the original sets of image values includes a first image frame and a second image frame, the first image frame encoded to indicate a first object and a second object, the second image frame encoded to indicate the second object and a third object, the first object absent from the second image frame, the third object absent from the first image frame;

wherein the set of support values is a single image frame defining attributes of the first object, the second object, and the third object, the computer processor hardware further performing operations of:

producing the reconstruction data to indicate how to: i) reconstruct the first image frame including a rendition of the first object and a rendition of the second object from the set of support values, and ii) reconstruct the second image frame including a rendition of the second object and a rendition of the third object from the set of support values.

22. The method as in claim 1, wherein the sequence of original sets of image values includes a first original set of image values encoded for playback at a first playback time in the sequence;

wherein the sequence of original sets of image values includes a second original set of image values encoded for playback at a second playback time in the sequence, the second original set of image values different than the first original set of image values, the method further comprising:

deriving the set of support values based on a combination of the first original set of image values and the second original set of image values.

23. The method as in claim 22, wherein deriving the set of support values includes: producing the set of support values based on combining a less-than-all portion of the first original set of image values and a less-than-all portion of the second original set of image values.

24. The method as in claim 1, wherein the sequence of original sets of image values includes a first original set of image values and a second original set of image values, the first original set of image values representing the first image frame for playback at a first time in the sequence, the second original set of image values representing the second image frame for playback at a second time in the sequence.

25. The method as in claim 1, wherein utilizing the sequence of original sets of image values to produce the set of support values includes:

applying a combination of spatial downsampling and temporal downsampling to the original sets of image values to produce the set of support values.

26. The method as in claim 25, wherein the sequence of the original sets of image values is encoded in accordance with a first resolution;

wherein the set of support values is encoded in accordance with a second resolution, the second resolution lower than the first resolution.

27. The method as in claim 1, wherein the sequence of the original sets of image values is encoded in accordance with a first resolution;

wherein the set of support values is encoded in accordance with a second resolution, the second resolution lower than the first resolution.

28. The method as in claim 27, wherein the sequence of the original sets of image values is spatially downsampled to produce the set of support values.

29. The method as in claim 1, wherein the original sets of image values includes a first original set of image values representing a first image for playback at a first time in the video and a second original set of image values representing a second image for playback at a second time in the video, the method further comprising:

spatially combining the first original set of image values and the second original set of image values to produce the set of support values.

30. The method as in claim 1 further comprising:

producing the reconstruction data to indicate how to reconstruct a first video frame and a second video frame of the sequence from the set of support values.

31. The method as in claim 1, wherein utilizing the sequence of original sets of image values to produce the set of support values includes:

downsampling a temporal combination of the original sets of values into the set of support values, the set of support values being of lower resolution than a corresponding resolution of the original sets of values.

32. The method as in claim 31 further comprising:

in addition to downsampling the temporal combination, spatially combining the original sets of values to produce the reconstruction data.

33. The method as in claim 1, wherein the reconstruction data is encoded at a lower level of quality than a respective level of quality of the first image frame and the second image frame.

34. The method as in claim 1, wherein the reconstruction data is encoded at a same level of quality as a respective level of quality of the first image frame and the second image frame.

* * * * *